(12) United States Patent
Traub et al.

(10) Patent No.: US 8,373,545 B2
(45) Date of Patent: Feb. 12, 2013

(54) EPC PROVISIONING SYSTEM USING BUSINESS RULES

(75) Inventors: Kenneth R. Traub, Lexington, MA (US); Manju James, Lexington, MA (US); Marina Yurievna Popova, Arlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 924 days.

(21) Appl. No.: 11/668,389

(22) Filed: Jan. 29, 2007

(65) Prior Publication Data

US 2007/0213999 A1 Sep. 13, 2007

Related U.S. Application Data

(60) Provisional application No. 60/763,781, filed on Jan. 31, 2006, provisional application No. 60/821,643, filed on Aug. 7, 2006, provisional application No. 60/864,759, filed on Nov. 7, 2006.

(51) Int. Cl.
*H04Q 5/22* (2006.01)
(52) U.S. Cl. ............. 340/10.5; 340/572.1; 235/375
(58) Field of Classification Search ........... 340/10.5, 340/825, 10.1, 1.1
See application file for complete search history.

(56) References Cited

U.S. PATENT DOCUMENTS

| | | | |
|---|---|---|---|
| 5,893,907 A * | 4/1999 | Ukuda | 705/35 |
| 7,003,596 B2 | 2/2006 | Hamann et al. | |
| 7,091,861 B2 | 8/2006 | Schmidtberg et al. | |
| 7,161,489 B2 | 1/2007 | Sullivan et al. | |
| 7,165,722 B2 | 1/2007 | Shafer et al. | |
| 7,201,309 B2 * | 4/2007 | Oakes et al. | 235/375 |
| 7,204,409 B2 | 4/2007 | Kumar et al. | |
| 7,245,220 B2 | 7/2007 | Haller et al. | |
| 7,273,179 B2 | 9/2007 | Anson et al. | |
| 7,278,571 B2 * | 10/2007 | Schmidtberg et al. | 235/383 |
| 7,295,522 B2 | 11/2007 | Shell et al. | |
| 7,339,476 B2 | 3/2008 | Macurek et al. | |
| 7,382,260 B2 | 6/2008 | Agarwal et al. | |
| 7,567,179 B2 | 7/2009 | Stephenson et al. | |
| 7,665,071 B1 | 2/2010 | Roles et al. | |
| 7,667,572 B2 | 2/2010 | Husak et al. | |
| 7,796,014 B2 | 9/2010 | Traub et al. | |
| 2003/0058113 A1 | 3/2003 | Neidig et al. | |
| 2003/0204609 A1 | 10/2003 | Anderson et al. | |
| 2005/0108369 A1 | 5/2005 | Sather et al. | |
| 2005/0198234 A1 | 9/2005 | Leib et al. | |
| 2006/0047789 A1 | 3/2006 | Kumar et al. | |
| 2006/0181397 A1 * | 8/2006 | Limbachiya | 340/10.51 |
| 2007/0011334 A1 | 1/2007 | Higgins et al. | |
| 2007/0046467 A1 | 3/2007 | Chakraborty et al. | |
| 2007/0080785 A1 | 4/2007 | Son et al. | |
| 2007/0094303 A1 * | 4/2007 | Zwingenberger et al. | 707/104.1 |
| 2007/0095905 A1 * | 5/2007 | Kadaba | 235/384 |
| 2007/0213999 A1 | 9/2007 | Traub et al. | |

* cited by examiner

*Primary Examiner* — Brian Zimmerman
*Assistant Examiner* — Sara Samson
(74) *Attorney, Agent, or Firm* — Fliesler Meyer LLP

(57) ABSTRACT

An EPC provisioning system comprising a EPC server can dynamically provide EPC code blocks for one product to multiple client sites. The EPC server can use business rules to determine the EPC codes for the multiple client sites.

20 Claims, 60 Drawing Sheets

Configure EdgeServers

| New | Edit | Delete |

| Name | EdgeServer URL |
|---|---|
| EdgeServer1 | http://warehouse:6060 |
| EdgeServerB | http://warehouse:6061 |
| EdgeServerC | http://warehouse:6062 |

OK

---

Edit EdgeServer

Name: EdgeServer1

Connection URL:
http://warehouse:6060

OK    Cancel

Internally, this may be appended with 1 or more service specifiers, such as "/axis/service/ALEService", or "/axis/service/TelemetryService"

---

AutoRefresh Interval

This setting controls how often certain status information is refreshed from configured EdgeServers. If the interval is greater than 0, then the application automatically refreshes the current view every interval. If the interval is 0, then the user must manually select View:Refresh in order to refresh the current view.

Automatic Refresh may be useful when monitoring RFTagAware deployments. See the User Guide for details.

Automatic Refresh Interval: 250 ms

▼ Report Specifications (1)  [New Report]
　▼ Report  [Doritos_infield]  [Delete Report]
　　▼ Report Type
　　　　◉ Count  ○ List
　　▼ Report Set
　　　　◉ Current  ○ Additions  ○ Deletions
　　▼ Behavior when Empty
　　　　○ Include in ECReport
　　　　◉ Omit from ECReport
　　　　○ Suppress ECReport
　　▼ Application Data
　　　　PRIORITY: HIGH
　　　　NOTE: This shipment should be routed through Atlanta.
　　▼ Include Filters (1)  [New Filter]
　　　　▶ Filter: SGTIN-64, *.*.*.*  [Delete Filter]
　　▼ Exclude Filters (0)  [New Filter]
　　　▼ Filter  [Delete Filter]
　　　　▶ Tag Format: [SGTIN-64 ▼]
　　　　┌ Value ──────────────────────
　　　　│　◉ Any
　　　　│　○ Specific Value: [       ]
　　　　│　○ Range: [       ] through [       ]
　　　　└────────────────────────────
　　　　┌ Company Prefix ───────────────
　　　　│　◉ Any
　　　　│　○ Specific Value: [       ]
　　　　└────────────────────────────
　　　　┌ Item Reference with Indicator ──
　　　　│　◉ Any
　　　　│　○ Specific Value: [       ]
　　　　│　○ Range: [       ] through [       ]
　　　　└────────────────────────────
　　　　┌ Serial Number ────────────────
　　　　│　◉ Any
　　　　│　○ Specific Value: [       ]
　　　　│　○ Range: [       ] through [       ]
　　　　└────────────────────────────

Annotations:
- Collapsed version of Filter entry. (see exclude filters below for expanded version) → points to Filter: SGTIN-64, *.*.*.*
- Other is also an option... presents URI input to user. → points to Tag Format
- Depending on the format selected, 3 to 4 of these subsections may be visible. See EPC global spec for details. → points to Item Reference with Indicator

| Define Pool Configurations | View Pool Configurations | View Pools |

Define Pool Configuration

Identity Type [ ▼ ]

Range   start [    ]   end [    ]

Pool Parameters

| | Name | Value |
|---|---|---|
| ☑ | Location_id | picking01 |
| ☑ | | |
| ☑ | | |

[Delete row]   [Add row]   [Delete all]

[Cancel]   [Save]

FIG. 13C

| Pool Name | Creation Date | Pool Attributes | | Checked out EPCs count | Available EPCs count | Actions |
|---|---|---|---|---|---|---|
| | | Name | Value | | | |
| Name_1 | 06-01-05 12:00 PM | location_id | picking01 | 24000000 | 45000000 | [View] |
| | | GTIN_value | | | | |
| Name_2 | | | | | | [View] |

FIG. 13D

Add EPCs

Type: urn:epc:idpat:sgtin:0037000.130604

Range:  start: 30000000  end: 40000000

[Add]  [Cancel]

FIG. 13F

Check In EPCs

Type: urn:epc:idpat:sgtin:0037000.130604

Range:  start: 10000000  end: 15000000

[Check]  [Cancel]

FIG. 13G

EPC PROVISIONING SYSTEM USING BUSINESS RULES

CLAIMS OF PRIORITY

This application claims priority to U.S. Provisional Application No. 60/763,781 entitled "RFID Edge Server Improvements" filed Jan. 31, 2006; U.S. Provisional Application No. 60/821,643 entitled "RFID Edge Server Improvement" filed Aug. 7, 2006 and U.S. Provisional Application No. 60/864,759 entitled "RFID Edge Server Improvement" filed Nov. 7, 2006 which are herein incorporated by reference.

BACKGROUND OF INVENTION

A Radio Frequency Identification (RFID) system may consist of several components: RFID tags, tag readers, edge servers, middleware, and application software.

RFID tags typically contain Integrated Circuits (ICs) and antennas to enable them to receive and respond to radio-frequency queries from an RFID transceiver. Passive tags require no internal power source, whereas active tags use a power source.

The RFID tag can include a unique electronic product code (EPC). The RFID transceiver can emit a signal activating the RFID tag which then can reply with the EPC code.

The EPCs currently can have either a 64- or 96-bit code numbering scheme, but additional versions can be supported in the future. The EPC includes sections that indicate the product and manufacturer of a given item as well as a section to uniquely identify an object. Currently, an EPC number can contain:

- A Header, identifying the length, type, structure, version and generation of EPC
- The Manager Number, which identifies the company or company entity
- Object Class, similar to a Stock Keeping Unit or (SKU)

RFID readers can typically produce very large amounts of data. The RFID data can be filtered at an RFID edge server by applications using an Application-Level Events(ALE) interface. ALE allows applications to indicate what information it wants from the raw stream of RFID reads. Through ALE, an application can specify:

- Which locations it wants to read from (where a location maps to one or more RFID readers or antennas)
- What interval of time to accumulate data (absolute time, triggered by external events such as motion detectors, etc.)
- How to filter the data (e.g., include only Acme products, exclude all item-level tags)
- How to group the results (e.g., by company, by product or each tag separately)
- Whether to report currently visible tags or just additions or deletions
- And whether to report actual EPCs or just a count of the tags that are read.

BRIEF DESCRIPTION OF THE DRAWINGS

FIGS. 13A-13G illustrate an exemplary EPC provisioning system interface.

DETAILED DESCRIPTION

Figure 1:
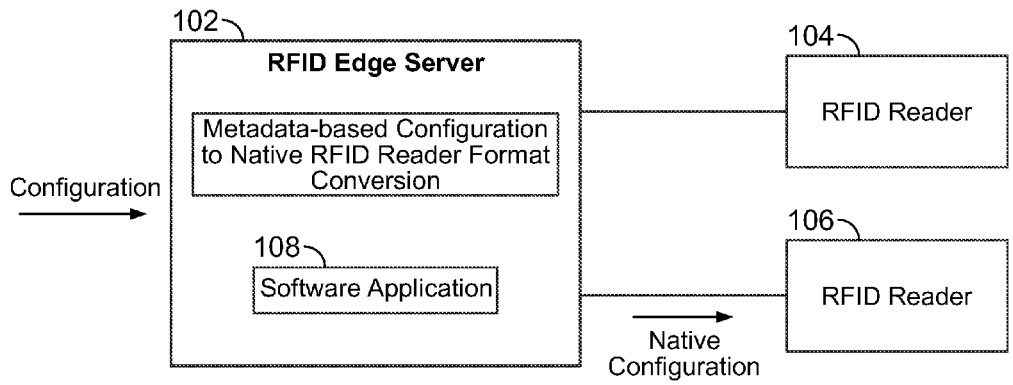
FIG. 1 illustrates the use of a RFID edge server to configure RFID readers.
Figure 2:
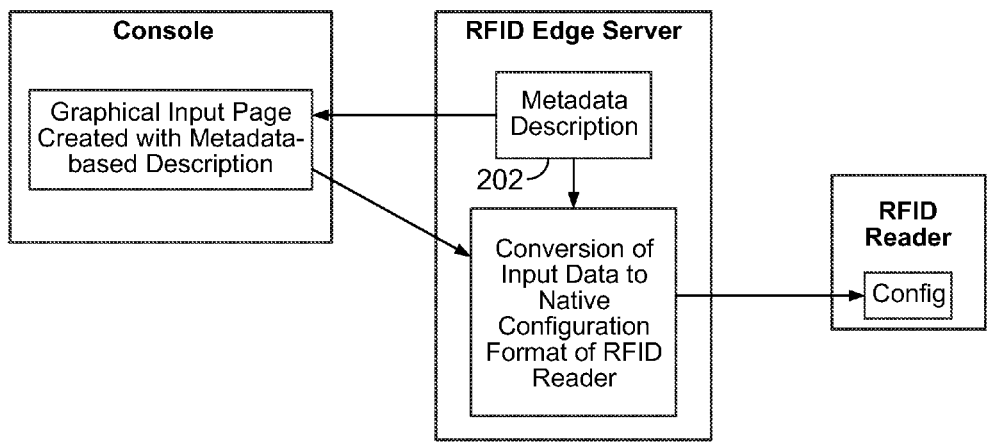
FIG. 2 illustrates the use of a metadata based description to configure RFID readers.
Figure 3:
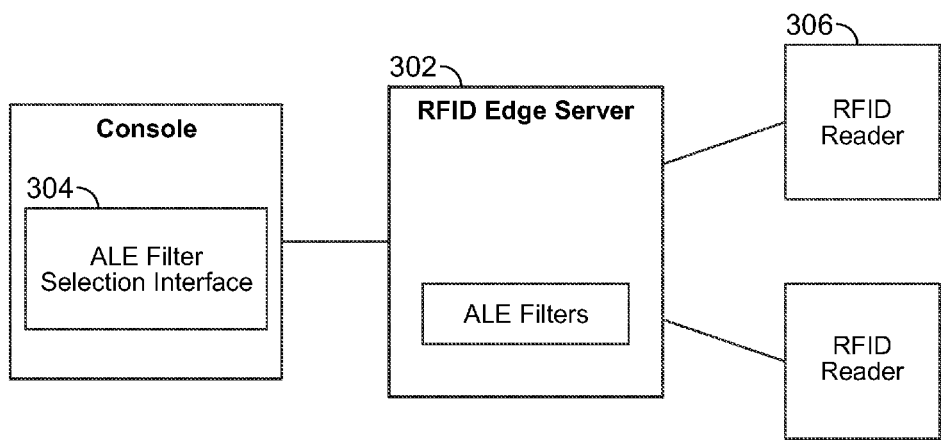
FIG. 3 illustrates the use of a graphical interface to select ALE filters.
Figures 4A, 4B:
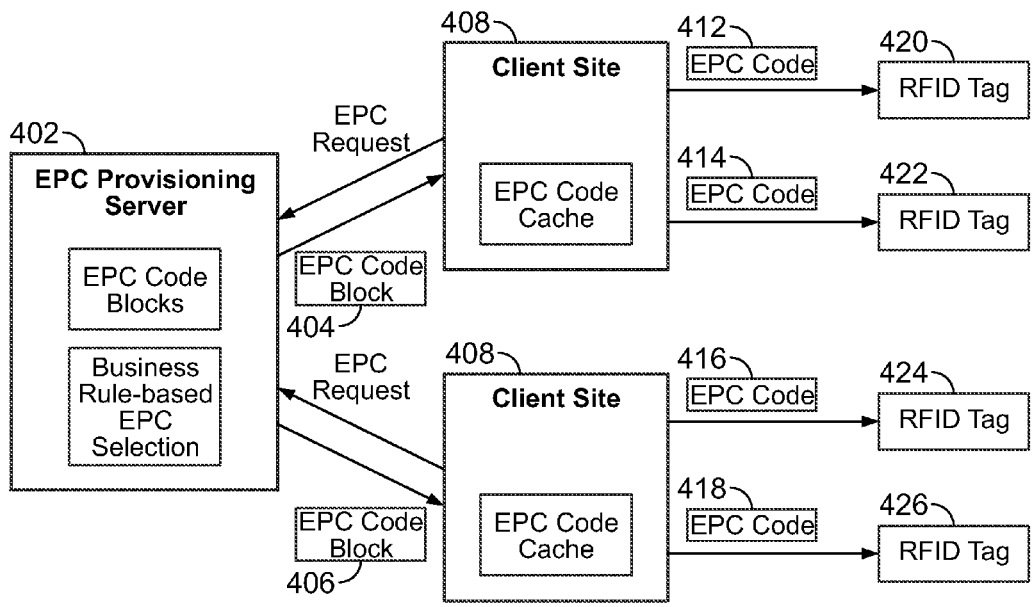
FIGS. 4A-4B illustrate a dynamic EPC providing system.

One embodiment of the present invention is an RFID edge server 102 to configure multiple associated RFID readers 106. The RFID edge server 102 receives configuration info for at least one of the associated RFID readers. The RFID edge server can update the configuration of the at least one of the associated RFID readers 106 without restarting at least one other RFID reader 104 of the associated RFID readers.

Such a dynamic configuration system allows the system to continuously run rather than being shut down temporarily for a change of configuration.

The configuration info also can be maintained as a metadata-based description at the RFID edge server. The configuration can be sent to the RFID reader 106 in a format specific to the RFID reader. The at least one of the RFID readers 106 can produce RFID data for a software application 100. The RFID edge server 102 can restart the at least one RFID reader 106 without restarting the software application 108. The at least one RFID reader 106 can be restarted in between the timed transfers of the RFID data to the RFID edge server 102. The RFID readers can be from different vendors with their own native configuration arrangements.

One embodiment of the present invention is an RFID edge server 102 to configure multiple associated RFID readers 104 and 106. The RFID edge server 102 can receive configuration info for at least one of the RFID readers 106. The at least one of the RFID readers 106 providing data for a software application 108. The RFID edge server 102 can restart the at least one RFID reader 106 without interrupting the operations of the software application 108.

One embodiment of the present invention is a computer implemented method comprising receiving configuration info for at least one associated RFID reader 106 at a RFID edge server 102 and updating the configuration of the at least one associated RFID reader 106 without restarting at least one other RFID reader associated with the RFID edge server.

One embodiment of the present invention is a computer implemented method comprising receiving at a RFID edge server 102 configuration info for at least one associated RFID reader 106. The associated RFID reader 106 providing RFID data for a software application 108 and initiating restart of the associated RFID reader 106 without interrupting the operation of the software application 108. The configuration can be sent to the RFID reader in a format specific to the RFID reader.

One embodiment of the present invention is a computer readable medium with a metadata-based description 202 of the configuration of an RFID reader, wherein an RFID edge server is adapted to interact with the metadata-based description 202 to configure the RFID reader.

The metadata-based description can include configuration parameters. The configuration parameters can include parameter name, description, type and default value. The metadata can be used to produce an interface, such as a console, to get configuration information from a user. The RFID edge server can use the interface to set configuration data. Different metadata-based descriptions can be used for different types of RFID readers. In one embodiment, the Metadata description can be used for filters, such as ALE filters, as well as for the RFID reader configuration.

One embodiment of the present invention is a computer-based method comprising receiving a metadata-based description of RFID reader and using the metadata-based description to produce an interface, such as a console page, to input a configuration for the RFID reader.

One embodiment of the present invention is a console for an RFID edge server 302, including a graphical interface 304 to receive ALE filter information such that the graphical interface 304 can be used to select the ALE filtering on the RFID edge server 302. The filters can be associated with an RFID reader 306. A list of available ALE filters can be displayed. The graphical interface 304 can allow the selection of one of the available ALE filters. The graphical interface 304 can show filters in a filter chain. The graphical interface 304 can allow the repositioning of filters in a filter chain.

One embodiment of the present invention is a computer implemented method comprising using a graphical interface 304 to select an ALE filter and using the selected ALE filter to filter RFID tag data at an RFID edge server.

One embodiment of the present invention is a computer readable medium including code to receive a selected ALE filter from a graphical interface 304 and use the selected ALE filter to filter RFID tag data at an RFID edge server 302.

A system of one embodiment comprises using an EPC server 402 to dynamically provide EPC code blocks 404 and 406 for one product to multiple client sites 408 and 410. The client sites 408 and 410 can use the EPC codes 412, 414, 416 and 418 of the EPC code block for RFID tags 402, 422, 424 and 426.

In one embodiment, the EPC server can create pools of EPC codes. The EPC codes can be created based on business policies that can be used to indicate business information in the EPC code. The RFID edge servers can obtain EPC codes from the pool, store these EPC codes into a local cache and then use these EPC codes in the construction of RFID tags, such as with an RFID tag printer. Unused RFID tags can be returned from the cache to the pool.

The client sites 408 and 410 can be, or can include, RFID edge servers. The EPC server can use business rules to assign the EPC code blocks. The EPC code blocks can be assigned so as to indicate business information such as lot number and/or location. The client sites 408 and 410 can cache EPC codes for later use. The client sites can request EPC code blocks 404 and 406.

One embodiment of the present invention is a computer implemented method comprising dynamically providing EPC code blocks 404 and 406 for one product to multiple client sites and using EPC codes of the EPC code blocks 404 and 406 for RFID tags at the client sites 408 and 410.

One embodiment of the present invention is a computer readable medium including code to dynamically provide EPC code blocks 404 and 406 for one product to multiple client sites 408 and 410; and using the EPC codes 412, 414, 416 and 418 of the EPC code blocks 404 and 406 for RFID tags 420, 422, 424 and 426 at the client sites 408 and 410.

One embodiment of the present invention is an EPC provisioning system 400 comprising an EPC server 402 adapted to dynamically provide EPC code blocks 404 and 406 for one product to multiple client sites. The EPC server 402 can use business rules to determine the EPC codes for the multiple client sites 408 and 410.

The client sites 408 and 410 can be RFID edge servers. The client sites can use the EPC codes 412, 414, 416 and 418 for RFID tags 420, 422, 424 and 426. The EPC code blocks can be assigned to as to indicate lot number. The EPC code blocks can be assigned so as to indicate location. The client sites 408 and 410 can cache EPC codes for later use. The client sites 408 and 410 can request the EPC code blocks 404 and 406.

One embodiment of the present invention is a computer implemented method using business rules to determine EPC code blocks for multiple client sites and providing the EPC code blocks to the multiple client sites.

One embodiment of the present invention is a computer readable medium including code to use business rules to determine EPC code blocks for multiple client sites and providing the EPC code blocks to multiple client sites.

DETAILS OF EXEMPLARY EMBODIMENTS

The following embodiments are merely exemplary and are not meant to limit the scope of the present invention.

A Dynamic Reader Configuration interface can be used by an Admin Console. The interface can be public facing, or for internal use by other applications, including the Admin Console and workflow applications. A centralized control server may use the interface to provision RFID Edge Servers.

In one embodiment, the dynamic reader configuration can:
1. Provide an interface to obtain plug-in Meta information.
2. Provide an interface to configure plug-in instances Clients can determine the available plug-in drivers supported by the Edge Server. For a given plug-in driver, clients can retrieve Meta information describing the plug-in and each of the associated configuration parameters. Plug-in Meta information can include the name of the plug-in, the plug-in type (e.g. Reader or Filter), the associated physical device name, and a description of the plug-in. Meta information for configuration parameters can include the parameter name, description, type, constraints, required flag, default value, and an index indicating importance relative to other parameters.

A plug-in instance can provide the connection between the Edge Server and the physical device (e.g. Matrix Reader). Clients can be able to list, get configuration details of, define, redefine and un-define plug-in instances. Creation of a plug-in instance can require the combination of a plug-in driver and configuration. The driver can provide access to the physical device, where the configuration provides the driver parameters. The presence of the physical device need not be required when defining, redefining or un-defining plug-in instances.

Dynamic Plugin configuration changes can be coordinated so that the operation of the edge server is not interrupted.

In one embodiment, the reader configuration can support updates of the reader drivers on the edge server. If a new reader driver is added to the edge server, the reader driver configuration can allow the configuration of new reader driver instances using the new driver.

Plug-in configuration changes can be persistent. The changes do not need to be reflected in the Reader configuration files.

In one embodiment, a dual mode operation can be supported with a configuration flag, such as EnableDynamicConfiguration. If set, all configuration can be read from the persisted dynamic configuration and configuration modifications can be supported through the dynamic configuration API. If the configuration parameter is not set, then the configuration information can be read from the reader configuration file, not from the persisted dynamic configuration. Also, the Dynamic Configuration will operate in a read only mode, allowing dynamic inspection of Plugin Meta and Configuration the configuration, but not supporting modification to the Plugin Configuration.

The implementation of the dynamic reader configuration can be extensible so that other types of plug-ins can be added in the future without extensive changes to the dynamic reader configuration framework (e.g. Trigger Driver, Notification Driver, and Filter Driver).

In one embodiment the following APIs can be exposed:

```
listPluginMetaInfo(pluginRole : String) : List <PluginMetaInfo>
        Returns list of PluginMetaInfo instances identifying each of the plugins supported by the
        edge server. If pluginRole is not null, return only the drivers of the given role. For
        release 1.3, the type will be limited to Reader and CompositeReader.
getPluginMeta(pluginRole: String, pluginMetaName : String) : PluginMeta
        Returns the PluginMeta instance for the pluginMeta with the specified name.
definePlugin(pluginRole : String, pluginName : String, pluginConfig : PluginConfig) : void
        Defines a new Plugin instance with the given name and configuration.
redefinePlugin(pluginRole : String, pluginName : String, pluginConfig : PluginConfig) : void
        Updates an existing Plugin instance.
undefinePlugin (pluginRole : String, pluginName : String) : void
        Undefines an existing Plugin with the specified name
getPlugin(pluginRole : String, pluginName : String) : Plugin
        Return the plugin for the given plugin name and type.
listPlugins(pluginRole : String) : List <PluginConfig>
        List all plug-in instances of the specified type. If type is null, include all plug-in types.
        For Release 1.3, only CompositeReader, Reader, Filter are supported.
listRoles( ) : List <String>
        List all known Plugin roles.
```

The Plug-in driver Meta information and plug-in instance configuration interfaces can be exposed through a web service hosted by the edge server. An XML schema can define the parameters passed in the SOAP interface.

A JAVA API can support access to the Reader Configuration API. The JAVA API can provide a wrapper around the SOAP interface and provide JAVA classes for handling the plug-in driver Meta information and configuration. The JAVA API can also be used internally within the edge server to interact with the plug-in configuration information.

The Admin Console can be a client of the Dynamic Reader Configuration interface provided by the Edge Server. The Admin Console can contain new panels to provide read write access to the reader configuration.

In one embodiment:
1. The Admin Console can query the interface to determine the extent of reader drivers, and display the results.
2. The Admin Console can query the interface to determine the configured reader drivers and display the results.
3. The Admin Console can request meta information on the configuration parameters for a particular reader. The meta information can be used to dynamically create configuration forms.
4. The Admin Console can support the specification of parameters for a driver configuration.
5. The Admin Console can define a new reader driver instance passing the plug-in driver name and the configuration.
6. The Admin Console can redefine existing reader driver instance passing the plug-in driver name and the configuration.
7. The Admin Console can un-define existing reader driver instances passing the plug-in driver name.

The Dynamic Reader Configuration design can provide an open framework for supporting dynamic configuration of plug-ins. The initial implementation can be limited to supporting two types of plug-ins: Readers and Composite Readers.

Figure 6A:
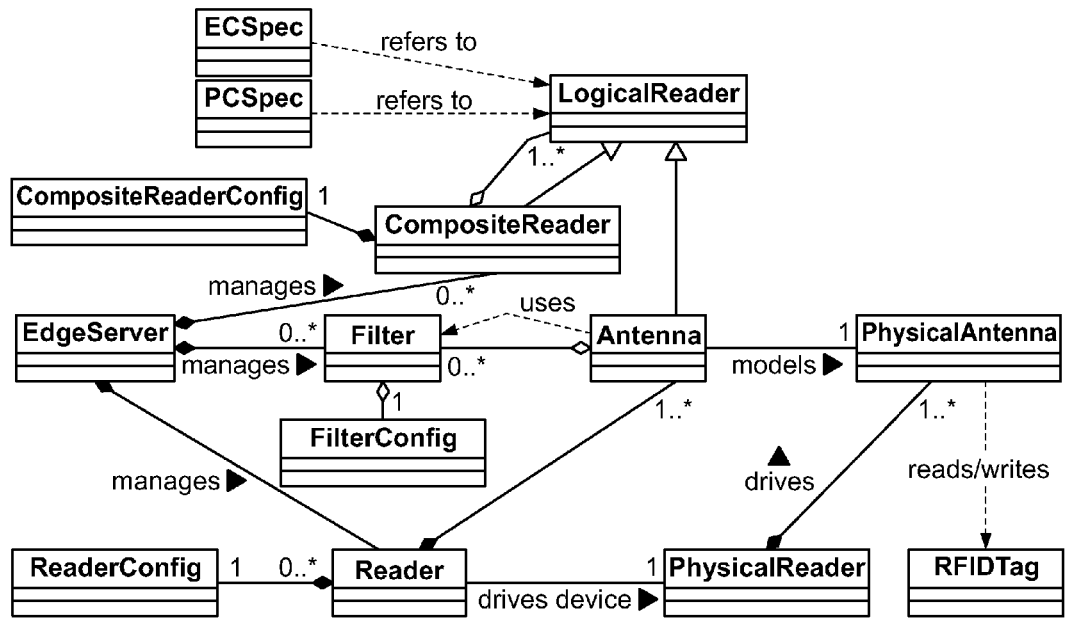
FIGS. 6A-6J illustrate an exemplary dynamic RFID reader configuration system.

The class diagram of FIG. 6A provides an overview of the Edge Server, Reader, CompositeReader, Trigger, Filter and related classes of one embodiment.

As shown in FIG. 6A a Reader can model a physical RFID reader, for example a Matrix reader. Readers can aggregate one or more antennas. An Antenna can model an individual physical antenna. The relation between Readers and Antenna can be defined as part of the Reader Configuration. The Reader Configuration can also include parameters required by the reader driver. Example configuration can include the IP address and port number used to communicate with the physical device.

The LogicalReader can be referenced by ECSpecs and PCSpecs as a source for tag read/writes. The logical reader can be an abstract base class for Antennas and Composite Readers.

The Antenna can model a physical Antenna.

A CompositeReader can aggregate a collection of Logical Readers independent of physical reader and antenna configuration.

The edge server can provide an aggregation point for the collection of CompositeReaders and Readers.

The PhysicalReader can represent an actual physical reader connected to one or more antennas.

The Physical Antenna can represent an actual physical antenna connected to a physical reader. The Antenna acts as a RFID transducer.

The Filter can used to filter tags read by the Antenna. One or more filters may be associated with an Antenna.

Figure 6B:
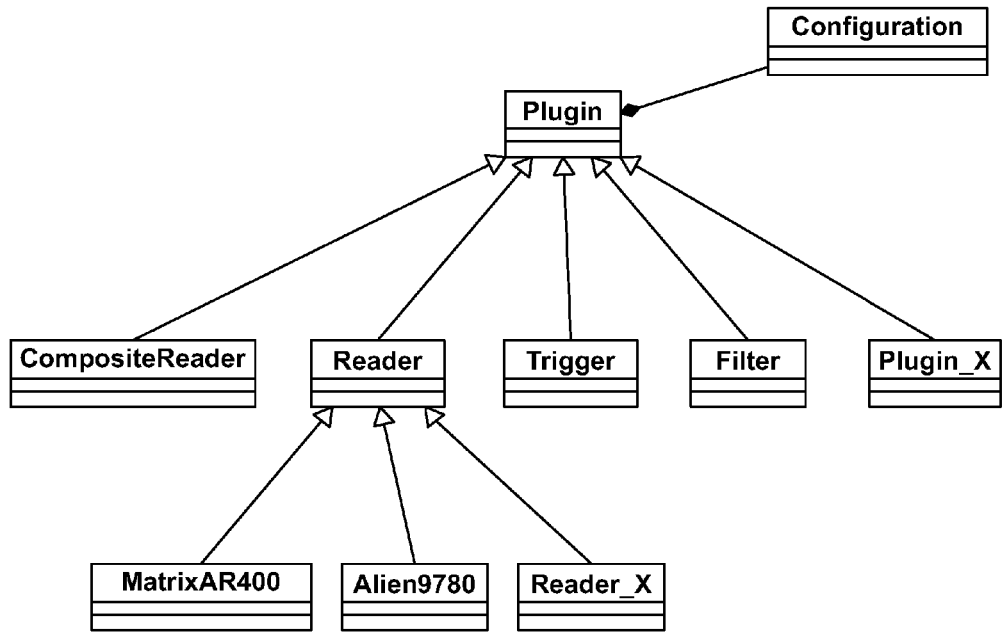

The concept of a Plugin can be used to support an extensible configuration mechanism. The Plugin can provide a base class for configurable entities within the Edge Server. The analysis model of FIG. 6B describes the resulting Plugin class hierarchy of one embodiment.

The Plugin can provide the root type for all configurable entities. The Plugin can contain a Configuration that defines the parameters (i.e. name value pairs) required for operation of the Plugin. The class Plugin_X can be a placeholder for other Plugin types to be added in the future. The class Reader_X can be a place holder for other types of readers currently supported and to be added in the future.

The design can be composed of three main components:
1. Plugin Meta
2. Plugin
3. Plugin Config API The Plugin Meta component can manage a list of Plugin Meta instances. Each Plugin Meta instance can contain meta information that describes the class that implements the Plugin and associated configuration parameters.

The Plugin component can manage Plugin instances. Plugin instances can aggregate a PluginConfig with a PluginDevice. A Plugin instance can be defined by an associated Plugin Meta instance.

The Plug-in API component can provide a SOAP interface for accessing Plug-i Meta information and configuring Plug-i instances. The Plug-in API can also provide a JAVA API that includes a java client stub for the API, and a set of JAVA classes used to model the data objects marshaled through the API.

Figure 6C:
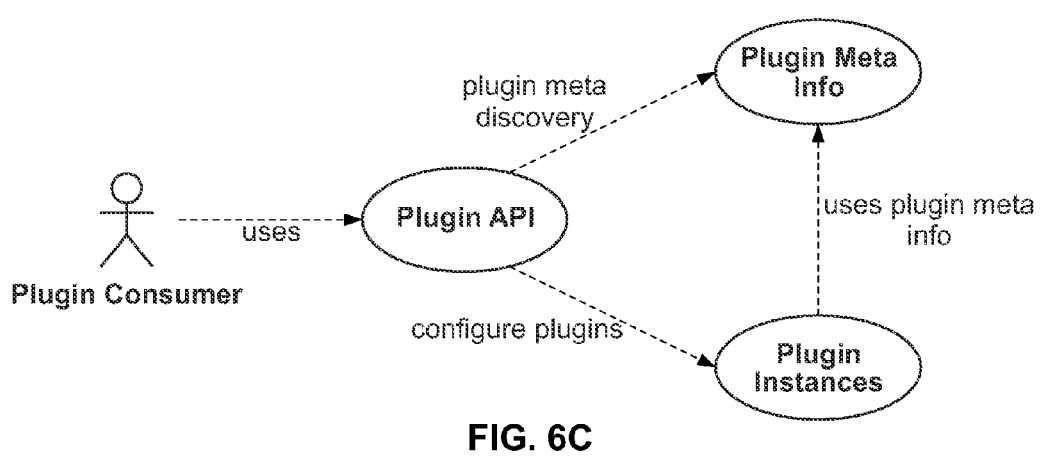

FIG. 6C shows Plugin Components such as, Plugin Instances, Plugin Meta Info, and Plugin API of one embodiment.

Figures 1, 6D:
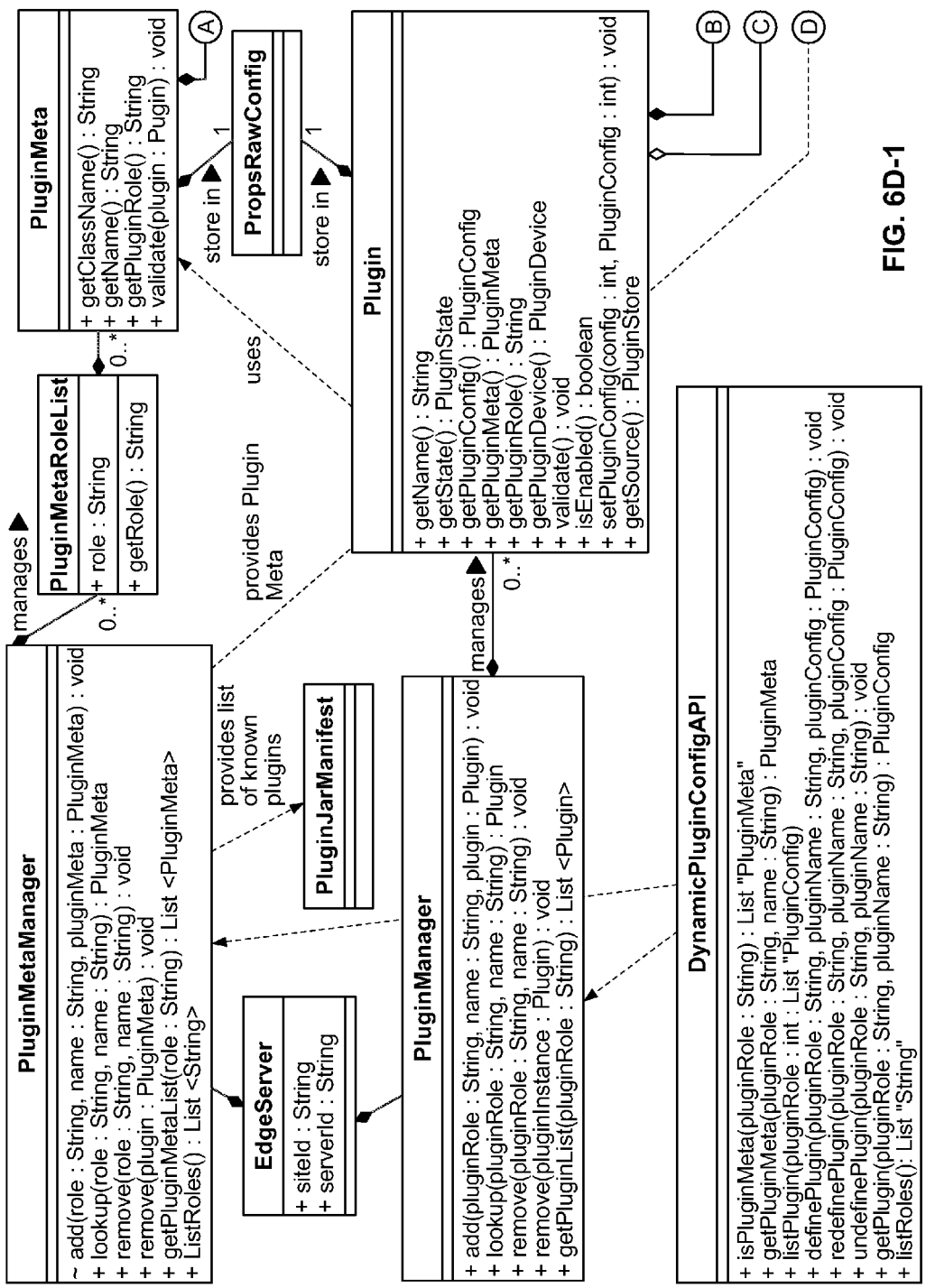
Figures 2, 6D:
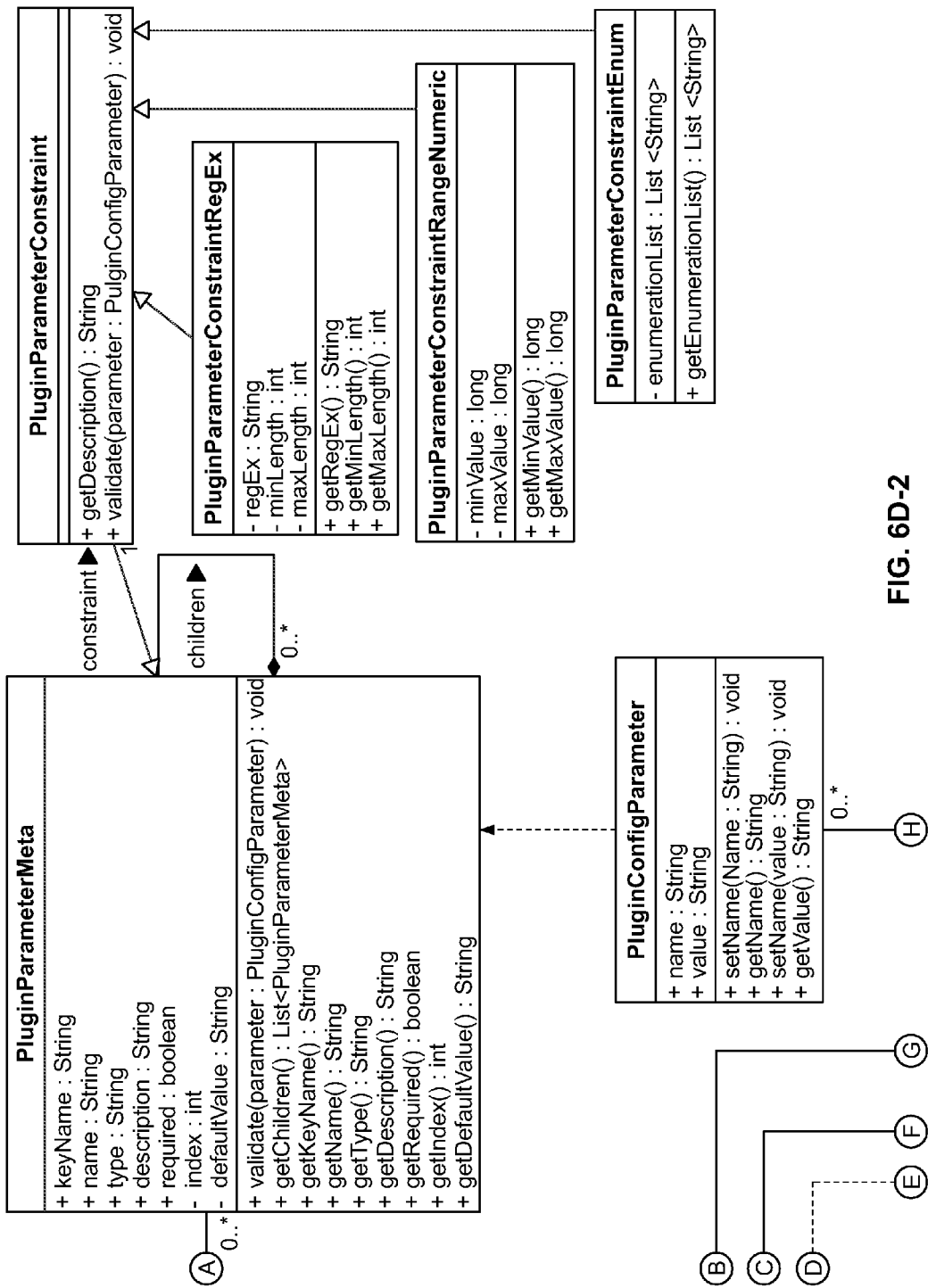
Figures 3, 6D:
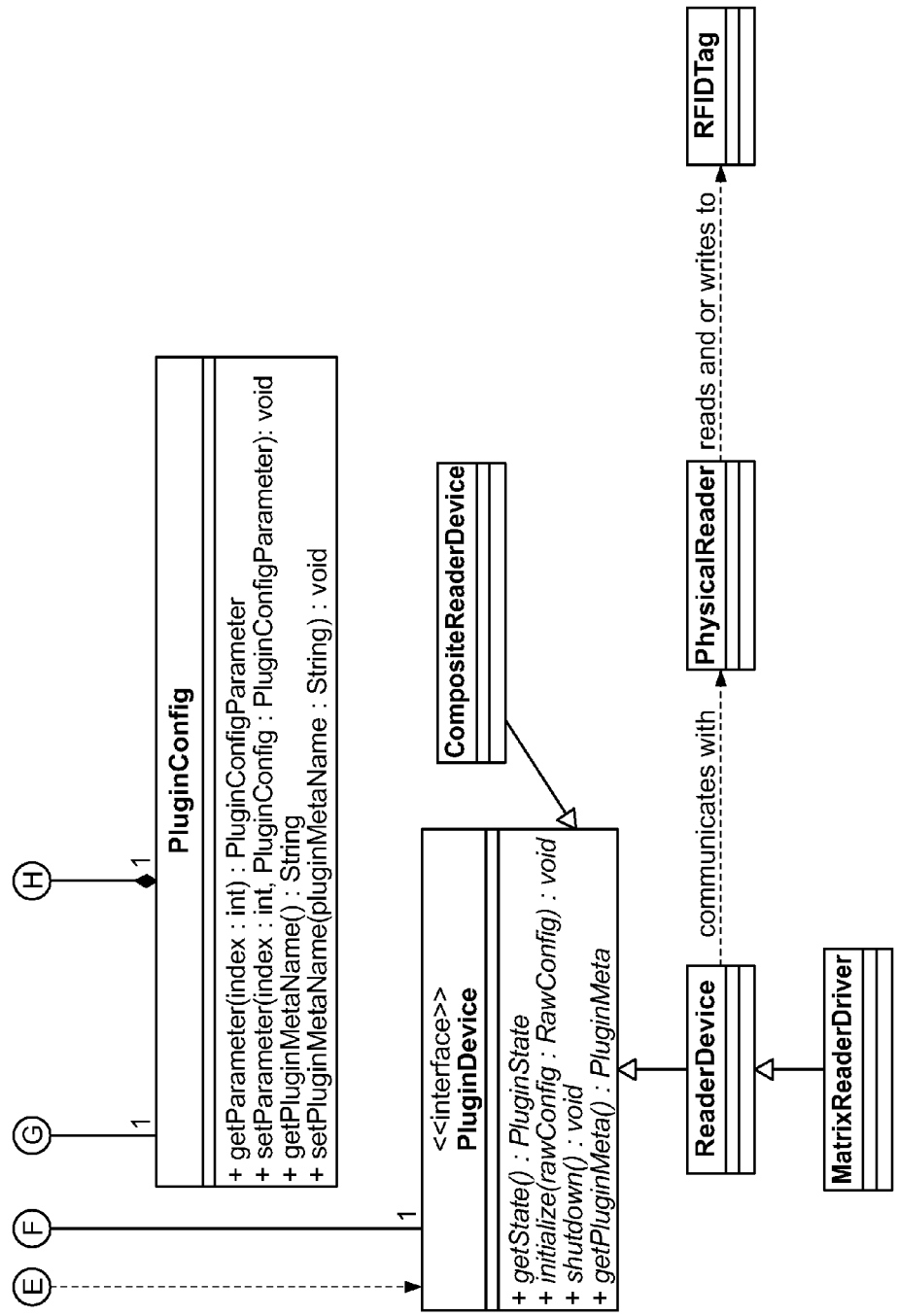

FIG. 6D shows an implementation class diagram for the Plug-in Framework of one embodiment.

Figure 6E:
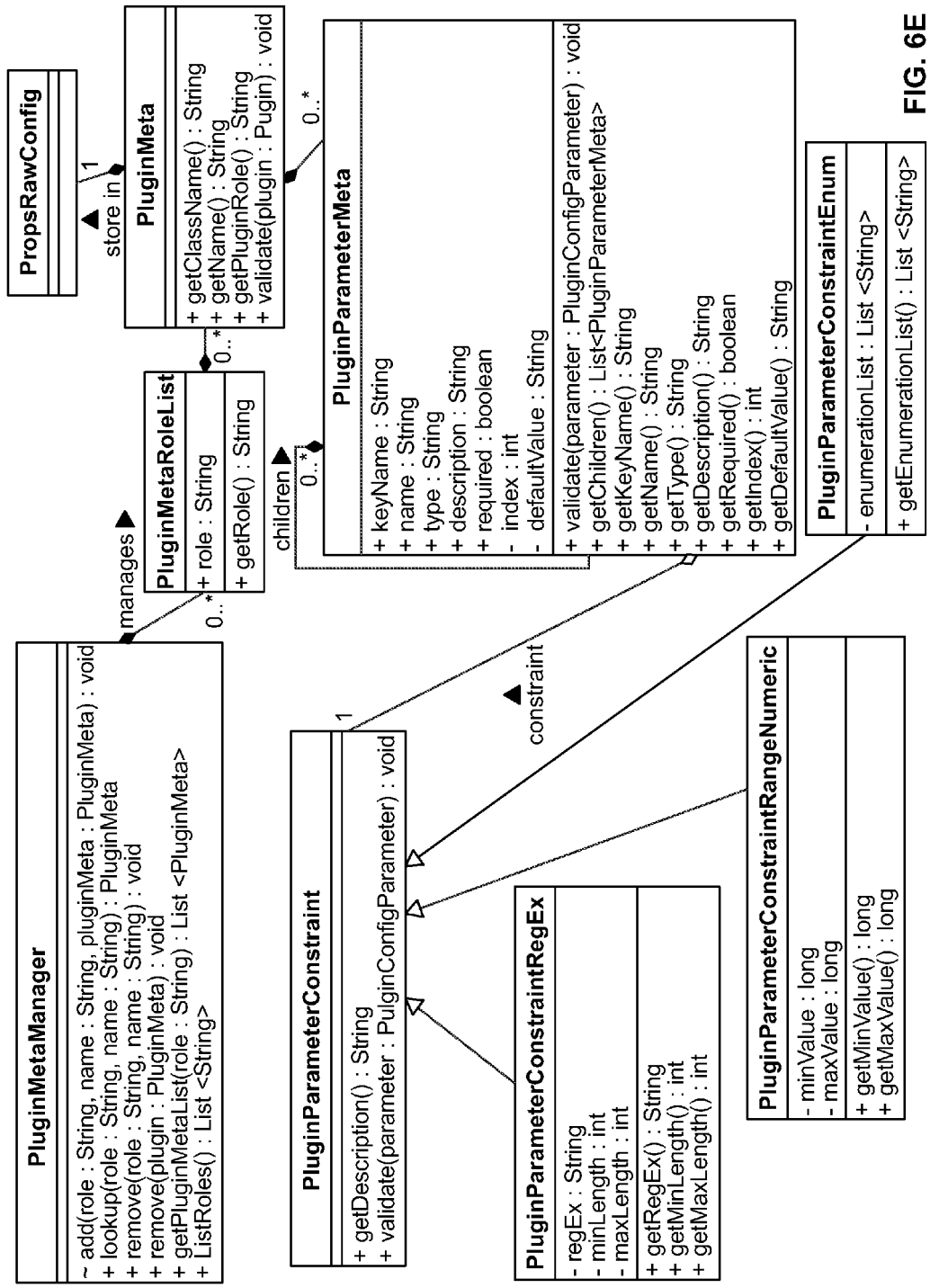

FIG. 6E shows an UML class diagram describes the Plugin Meta Component classes of one embodiment.

The PluginMetaManager can provide a container for management of PluginMeta instances. The PluginMetaManager can also manage PluginMeta Persistence.

--- add( role: String, name: String, pluginMeta : PluginMeta ) : void, throws DuplicatePluginMetaException
    Adds a new PluginMeta instance with given role and name.
    Throws DuplicatePluginMetaException if a PluginMeta instance
    already exist with the same name and type.
lookup(role: String, name: String): PluginMeta, throws PluginMetaException
    Looks up and returns the PluginMeta instance with matching role
    and name.
    Throws PluginMetaException if a matching PluginMeta instance
    is not found.
remove(role: String, name: String): void, throws PluginMetaException
    Removes the PluginMeta instance with matching role and name.
    Marks the PluginMeta instance as void. Throws a
    PluginMetaException if a matching PluginMeta instance is not
    found.
remove( plugin: PluginMeta) : void, throws PluginMetaException
    Removes the PluginMeta instance and marks the PluginMeta
    instance as void.
getPluginMetaList(role: String) : List <PluginMeta>
    Returns the extent of PluginMeta instances for the given Plugin
    Role. If the specified Plugin Role is null, the extent for all
    PluginRoles is returned.
listRoles( ) : List <String>
    Returns the list of known Plugin Roles (e.g. Composite Reader,
    Reader)

---

The PluginMeta class can describe a Plugin. The meta information can include the Plugin name, role, description, and parameters used to configure the Plugin.
Methods can include:

--- getClassName( ): String
    Returns the fully qualified class name for the class used to
    implement the plugin.
getName( ): String
    Returns the descriptive name for the Plugin (e.g. Mercury4Reader).
    This name is referenced when creating a Plugin instance.
getPluginRole( ): String
    Returns the string representation of the Plugin Role for this plugin.
    (e.g. "READER" or "COMPOSITE_READER")
validate(plugin: Plugin): void, throws PluginValidationException
    Validates the specified Plugin by validating each of the contained
    parameters. If invalid, throws PluginValidationException.

---

The PluginParameterMeta class can describe a PluginParameter. The meta information can include the PluginParameter name, type, description, required flag, and index.
Attributes can include:

--- keyName: String (non i18n)
    Provides a uniuqe name for the parameter
name: String (i18n)
    Provides a descriptive name for the parameter
type: PluginParameterType

---

Defines the type for the parameter; numeric or string. The supported types include:
NUMERIC
STRING
LIST <String>
ANTENNA
description: String (i18n)
Provides a descriptive text for associated PluginParameter.
required: Boolean
Boolean indicating whether or not the parameter is required.
index: int
Parameter index indicating ordering with respect to other parameters.
defaultValue: String (non i18n)
Default value of this plugin parameter. It may be null if there is no default.
Methods can include:
    getChildren( ): List <PluginParamameterMeta>
    Returns a list of child (i.e. contained) PluginParameterMeta instances.
    validate(pluginParameter: PluginParameter): void, throws PluginValidationException
    Validates the specified PluginParameter with the associated
    PluginParameterConstraint. If invalid, throws PluginValidationException.

The PluginParameterConstraint class can define constraints for the associated PluginParameterMeta instance. The constraint information can include a description and parameter value contstraints. This class can be abstract, concrete derived classes include PluginParameterConstraintRangeNumeric and PluginParameterConstraintRegEx.
Methods can include:

--- getDescription( ): String
    Return a descriptive text string defining the Plugin Constraint,
    for example: "[1-1000]".
validate(parameter: PluginConfigParameter): void, throws PluginValidationException
    Validates the specified PluginConfigParameter.
    If invalid, throws PluginValidationException. This method is
    defined as abstract and must be overridden by derived classes.

The PluginParameterConstraintRangeNumeric class can be derived from PluginParameterConstraint and defines a value constraint for a PluginParameter of type numeric. Attributes can include:

--- minValue : long
    The minimum allowable value for the constraint
maxValue : long
    The maximum allowable value for the constraint.

---

The PluginParameterConstraintRegEx class can be derived from PluginParameterConstraint and defines a value constraint for a PluginParameter of type String.

Attributes can include:

--- regEx : String
    Defines a regular exception for validation of a String Constraint.
minLength: int
    Return the minimum allowable length for the string.
maxLength: int
    Return the maximum allowable length for the string, or 0 if no limit.

---

The PluginParameterConstraintEnum class can be derived from PluginParameterConstraint and defines a value constraint for a PluginParameter of type List <String>. Attributes can include:
EnumerationList : List <String>
Defines a list of allowable String values.

The PropsRawConfig class can be used to persist PluginMeta instances to files.

Figure 6F:
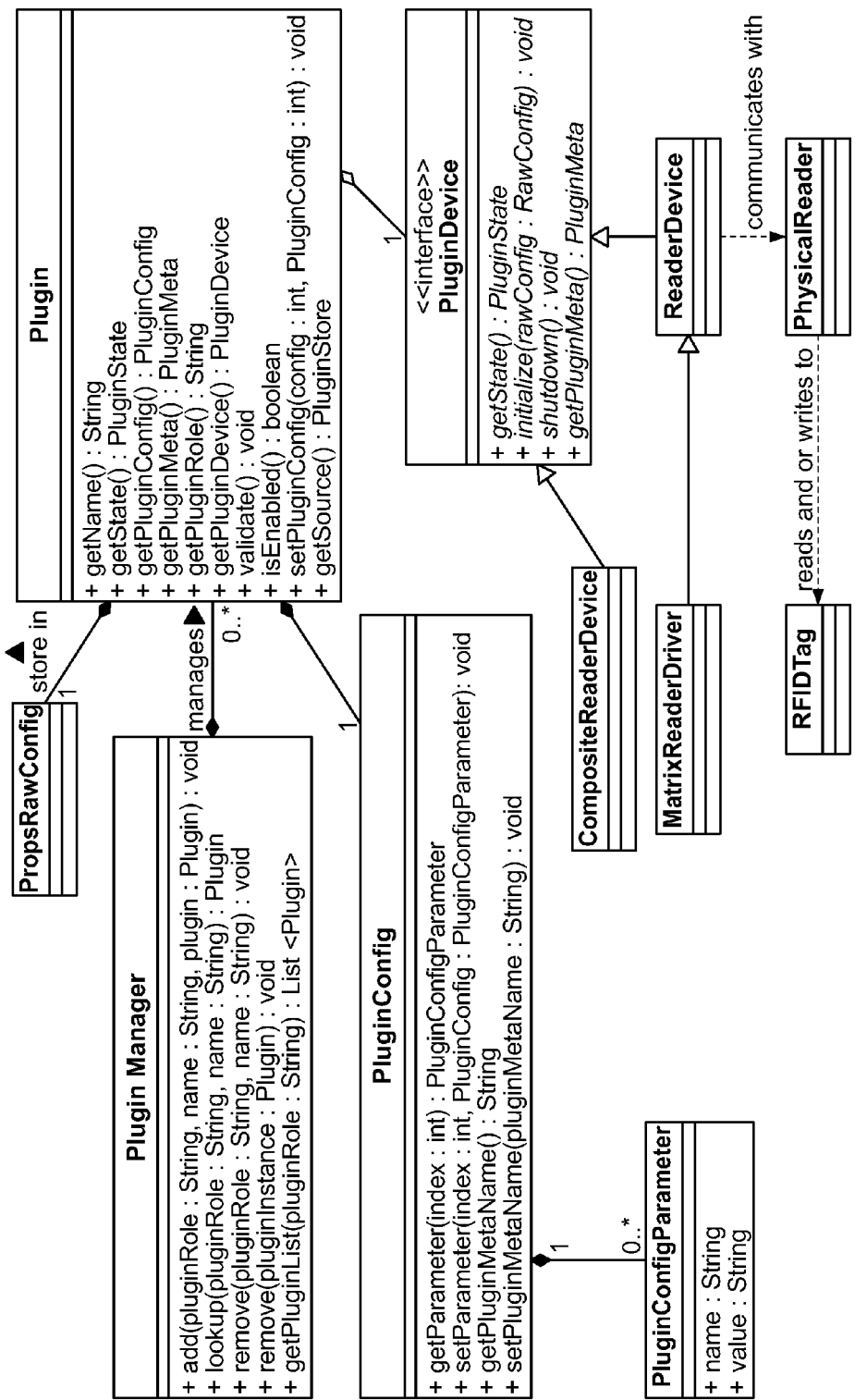

FIG. 6F shows UML class diagram that describes the Plugin Component classes of one embodiment.

Figure 6G:
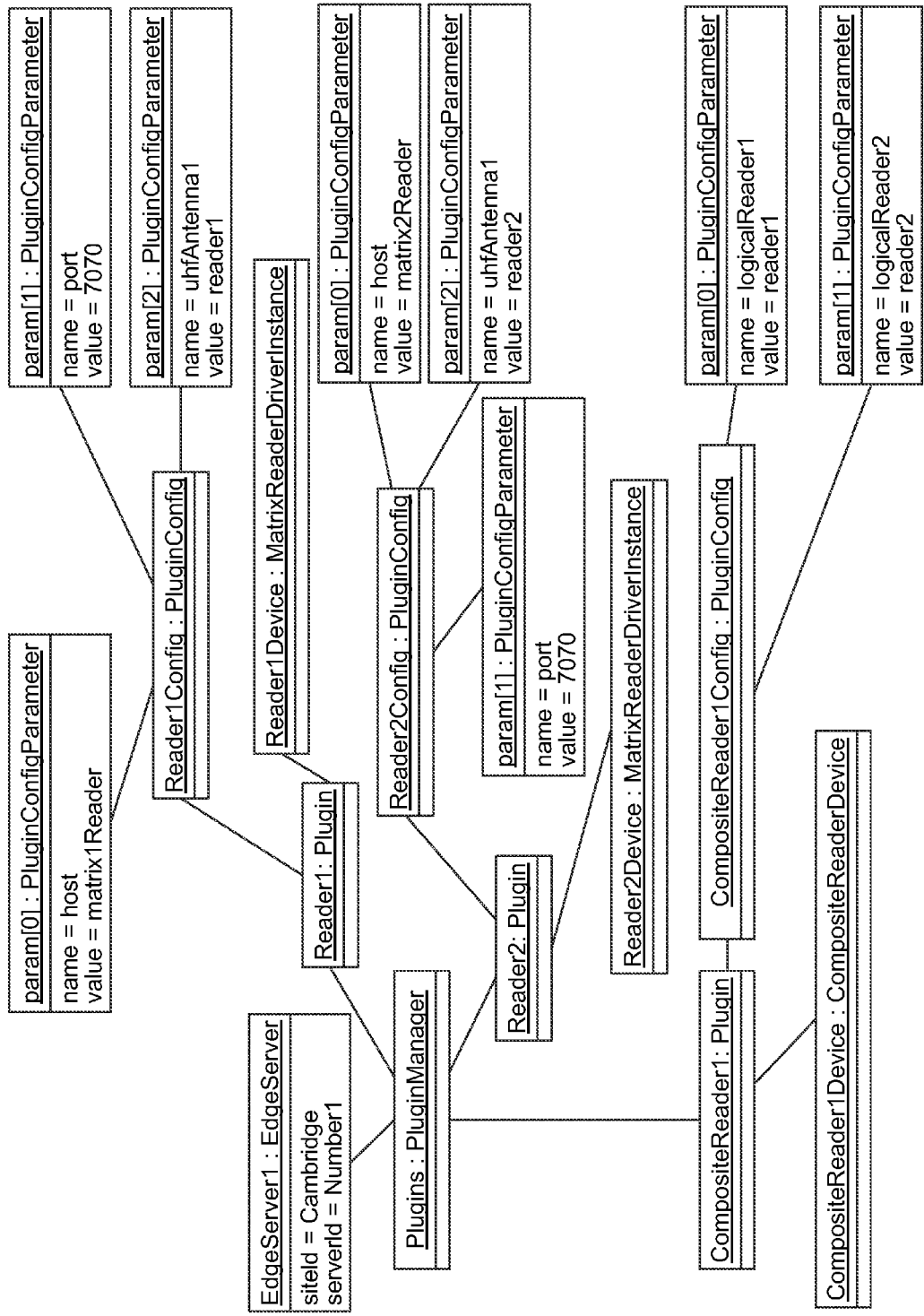

FIG. 6G shows a sample instance diagram showing Plugins and the relation to PluginConfig, PluginConfigParameter, and PluginDevice instances of one embodiment. The PluginManager singleton can manage all Plugin instances.

The PluginManager can be a singleton and provide a container for management of Plugin instances. The PluginManager can support Plugin configuration requests through the Plugin API. The PluginManager can also manage Plugin Persistence. Persistence can be supported in one of two ways; through the edge.properties file or through the dynamic configuration persistence. The mode of persistence operation can be controlled through the EnableDynamicConfiguration Boolean property. If this value is set to true, then the dynamic configuration persistence mechanism can be enabled. When the edge server starts, all Plugin instances can be read from the dynamic configuration store. The dynamic configuration store can be in the form of a set of PropsRawConfig files within the var/edgestate/plugin directory.

In one embodiment, if the EnableDynamicConfiguration Boolean property is set to false, then the plugin configuration can be read from the edge.props file. This allows for backward compatibility with existing RFID edge server installations. In this mode, the Plugin Configuration API can be restricted to read only access, so that no modification may be made through the Plugin Configuration API. In this mode, current configuration may be discovered through the Plugic Configuration API.

Methods can include:

--- add(role : String, name : String, plugin : Plugin) : void, throws PluginValidationException
    Adds a new Plugin instance with given role, name and Plugin instance. Throws
    DuplicateNameException if a Plugin instance with the same name and role
    already exist. Throws PluginValidationException if there is a problem validating
    the configuration parameters. The add command persist the newly defined Plugin
    to the persistent store.
lookup(role : String, name : String): Plugin, throws PluginException
    Looks up and returns the Plugin instance with matching role and name. Throws
    NoSuchPluginException if a matching Plugin instance is not found.
remove(role : String, name : String): void, throws NoSuchPluginException
    Removes the Plugin instance with matching role and name. Marks the Plugin
    instance as void. Throws a NoSuchPluginException if a matching Plugin instance
    is not found. The associated Plugin is removed from the persistent store.
remove(plugin : Plugin) : void, throws PluginException
    Removes the Plugin instance and marks the Plugin instance as void. The
    associated Plugin is removed from the persistent store.
getPluginList(role : String) : List <Plugin>
    Returns the extent of Plugin instances for the given Plugin Role. If Plugin Role is
    null, the extent for all Plugin Roles is returned.

---

The Plugin class can model a configured Plugin instance. It can be responsible for management of the PluginConfiguration instance and the PluginDevice instance. The Plugin class can support the redefine operation by shutting down, reconfiguring and restarting the PluginDevice.

Methods can include:

--- getName( ): String
    Returns the assigned name of the Plugin. Together, the Name and
    Role uniquely dentify the plugin instance.
getState( ): PluginState
    Returns an instance of the PluginState enumeration class that
    defines the state of he Plugin. (e.g. Active, Disabled).
getPluginConfig( ): PluginConfig
    Returns the associated PluginConfig instance, containing the
    configuration for the Plugin instance.
setPluginConfig(pluginConfig: PluginConfig) : void, throws
PluginException

---

Replaces the existing configuration with the specified configuration. Executes following steps:

1. Validates the Specified Configuration
2. Shutdown the associated PluginDevice instance.
3. Either reinitialize the existing PluginDevice with the new configuration and restart or create a new PluginDevice with the new configuration.

If any of the above steps fail, a PluginException is thrown.

```
getPluginMeta( ) : PluginMeta
    Returns the associated PluginMeta instance.
getPluginRole( ) : String
    Returns the instance of the PluginType enumeration.
    (e.g. READER, COMPOSITE_READER, FILTER, TRIGGER)
getPluginDevice( ) : PluginDevice, throws PluginDeviceException
    Returns the associated PluginDevice. PluginDevice is an Interface
    for instances of ReaderDrivers, etc. Throws
    PluginDeviceException if the PluginDevice is not available.
validate( ): void , throws PluginValidationException
    Validates the Plugin configuration. If not valid,
    a PluginValidationException is thrown.
isEnabled( ): boolean
    Returns true if the plugin is enabled. The plugin may be disabled
    in the course of a redefine operation that fails due to invalid
    configuration.
getSource( ): PluginSource
    Returns the source of the Plugin Configuration information, either
    the Edge Server properties file or the Dynamic Plugin
    Configuration store.
```

The PluginConfig class can provide a holder for plugin configuration parameters. There can be a single PluginConfig instance for each Plugin. Optional parameters can be omitted if values are not provided.
Methods can include:

```
getParameter(index : int) : PluginConfigParameter
    Returns the plugin configuration parameter for the associated index.
getParameterCount( ) : int
    Returns the count of Plugin parameters.
```

The PluginConfigParameter class can provide a container for a plugin configuration parameter. An instance of the PluginConfigParameter class can be created for each specified parameter.
Attributes can include:
  name: String
    The name of the parameter, this name maps to the UniqueKey specified by the associated PluginParameterMeta instance.
  value : String
The PluginDevice interface can be implemented by devices managed by the Plugin class. Example implementations of the PluginDevice can include Reader Drivers, Triggers and Filters. The PluginDevice instances can be created from the actual driver classes that are instantiated when a new driver is created.

The driver classes can implement the PluginDevice interface and implement the getStatus( ), initialize( ), shutdown( ), and getPluginMeta( ) methods.
Methods can include:

```
getStatus( ) : PluginStatus
    Returns the PluginStatus enumeration value that defines the current
    state of the PluginDevice. This method is used by the parent Plugin
    to provide status information.
initialize(rawConfig : RawConfig): void , throws PluginDeviceException
    Initializes the PluginDevice with the specified rawConfig. Throws
    PluginDeviceException on error.
shutdown( ): void, throws PluginDeviceException
    Requests that the PluginDevice shutdown. Throws
    PluginDeviceException on error.
    This method is to support the redefine operation where an existing
    reader is updated with a new configuration.
getPluginMeta( ): PluginMeta, throws PluginDeviceException
    Returns that the PluginMeta information associated with the Pluging.
    Throws PluginDeviceException on error. Existing Plugins and new
    plugins must implement this method to provide accurate Plugin
    Meta Information.
```

The PluginStatus class can provide an enumeration of Plugin states defined as Strings:
  ACTIVE (in use)
  INACTIVE
The PluginType class can provide an enumeration of Plugin types defined as Strings:
  READER
  COMPOSITE_READER
  TRIGGER
  FILTER The Plug-in API can be composed of two parts: the Plug-in Meta API and the Plug-in Configuration API. The Plug-in API can be implemented as a SOAP interface defined with a WSDL file. The objects referenced within the interface can be defined in an XML Schema definition and serialized through the SOAP interface. The Plug-in API can also be exposed to clients with a JAVA API.

The PluginMeta API can provide methods for read only access to the Plugin Meta Information.
Methods can include:

```
listPluginMeta(pluginRole: String) : List <PluginMeta>
    Returns a list of PluginMeta objects for the given Plugin Role.
getPluginMeta(pluginRole: String, name : String) : PluginMeta, throws
NoSuchPluginMetaException
    Returns the PluginMeta instance with matching role and name.
    Throws NoSuchPluginMetaException if a matching PluginMeta
    instance is not found.
listRoles( ) : List <String>
    Returns a list of the available Plugin Roles.
```

The Plugin configuration API can provide methods for creating, modifying, removing and listing Plugins. Plugins can live within the scope of the EdgeServer.
Methods can include:

```
listPlugin(pluginRole: String) : List <PluginConfig>, throws
PluginException
    Returns a list of Plugins defined on the Edge Server that match
    the specified pluginType.
definePlugin(pluginRole: String, pluginName: String, pluginConfig:
PluginConfig): void, throws PluginException
    Defines the plugin with role, name, and plugin configuration on the
    edge server. Throws PluginException if the plugin already exist or
    the configuration is incorrect.
redefinePlugin(pluginRole: String, pluginName: String, pluginConfig:
PluginConfig) : void, throws PluginException
    Redefines the plugin with matching role and name, applying the new
    pluginConfig. Throws PluginException if the plugin is not already
    defined or the plugin configuration is not valid.
undefinePlugin(pluginRole: String, pluginName: String) : void,
throws PluginException
    Un-defines the plugin with matching role and name. Throws
    PluginException if the plugin is not already defined.
getPlugin(pluginRole: String, pluginName: String,): PluginConfig, throws
NoSuchPluginException
    Returns the Plugin instance with matching role and name. Throws a
    NoSuchPluginException if the Plugin is not found.
```

Figure 6H:
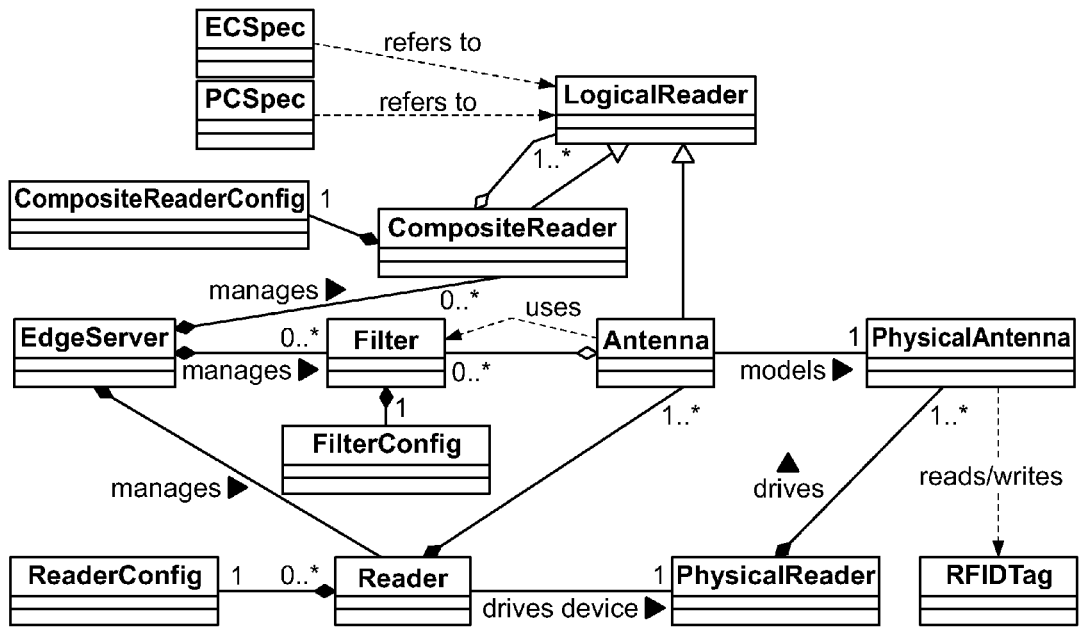

The ability to dynamically update a Plugin Configuration can result in a synchronization problem with the Event Cycle engine. The synchronization issue results due to the interdependences between ECSpecs, PCSpecs, Readers, Logical Readers (i.e. Composite Readers and Antennas (a.k.a. Reader Point)) and Filters. FIG. 6H is an analysis model that provides an overview of the dependencies of one embodiment.

Figure 6I:
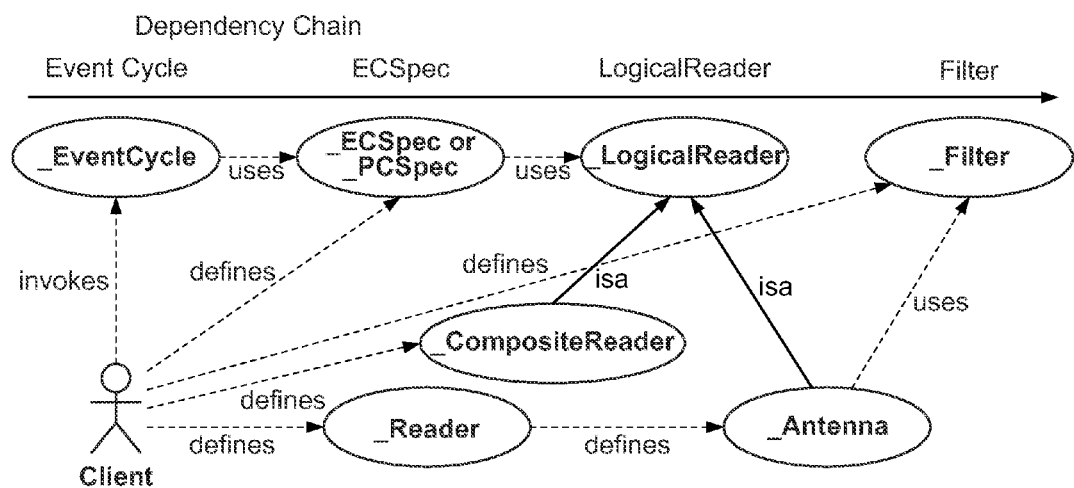

FIG. 6I shows an exemplary dependency graph.

Figure 6J:
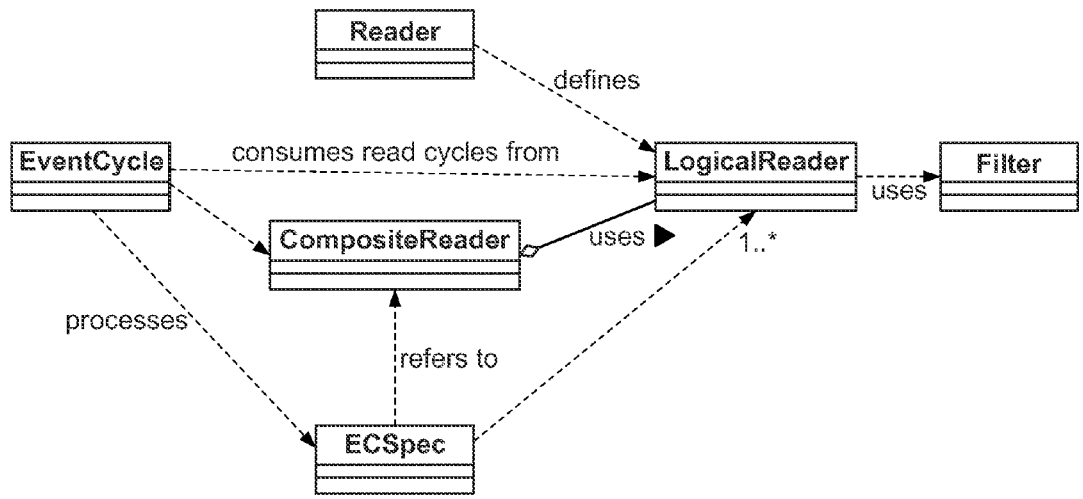

FIG. 6J shows an exemplary event cycle dependency graph of one embodiment.

EventCycles can be at the root of the dependency graph. Event Cycles can manage the processing of an active ECSpec or PCSpec. Event Cycles can be invoked by the client through the following interface calls:
 1. Poll
 2. Immediate
 3. Subscribe
An Event Cycle can directly depend on:
ECSpec
PCSpec ECSpecs can define the characteristics of an event cycle. ECSpecs can be modified by the client through calls to the following methods:
 1. Define
 2. Redefine
 3. Undefine
ECSpec and PCSpec can directly depend on:
Logical Reader
  Composite Reader
  Antenna Concrete implementations of Logical Reader can include Composite Reader and Antenna. A Composite Reader can be a composite for Logical Reader. Composite Readers can be defined by the client through the plugin interface. An Antenna is defined as part of the configuration for a Reader. Where the Reader can model a physical Reader (e.g. MatrixAR4000) and the Antenna can model a physical antenna (e.g. uhfl Antenna) attached to the Reader.

An Antenna can directly depend on a filter:

A filter can support filtering of EPCs at the Antenna source. A Filter can be defined by the client through the Plugin API. In one embodiment, a filter has no dependencies.

A Configuration Event can result from a configuration change to one of the EventCycle entities (i.e. CompositeReader, Reader, or Filter). A configuration event can generate a change event notification. The Change Notification can be sent to each of the observers of the entity. Depending on the entity and configuration, there may be 0, 1 or more observers. Observers of the entity can normally include consumers of the entity. For example, observers of a filter can include any Antennas that reference the filter.

When an observer receives a Change Notification, the observer can take an appropriate action. In some cases, no action will be required.

If the receiver of a Change notification has registered observers, the change event can be forwarded to those observers.

In one embodiment, changes to Filters may only occur through configuration events. Consumers of filters can be limited to the Antenna subtype of Logical Readers.
Addition:
 Add the new Filter to the filter manager.
 No notification required.
Modification can include:
 1. Create a new Filter object with new configuration.
 2. Notify Logical Readers to replace the old Filter with the new Filter.
 3. Disable and remove the old Filter.
Removal can include:
 1. Create a placeholder Filter object.
 2. Notify Logical Readers to replace the old filter with placeholder Filter.
 3. Disable and remove old Filter In one embodiment, changes to Readers may occur through configuration events.
Addition can include:
 Add the new Reader and Logical Readers defined by the configuration.
 Process addition of each Logical Readers defined by the Reader
Modification can include:
 Process removal of each Logical Reader associated with the old Reader instance
 Disable old Reader Object
 Create new Reader Object
 Process addition of each Logical Reader associated with the new Reader instance
Removal can include:
 Process removal of each Logical Reader
 Disable old Reader instance
Changes to Logical Readers:
Addition can include:
 1. If there is a matching placeholder Logical Reader, then:
 2. Create new Logical Reader
 3. Notify Event Cycles to update references to use new Logical Reader
 4. Remove old Placeholder Logical Reader
 5. Validate, execute and persist changes.
 6. Otherwise, no action since the Logical Reader is not currently required by any active EventCycles
Modification can include:
Error condition. Conflicts with another active logical reader.
Removal:
 1. Create a placeholder Logical Reader (if it is currently referenced by an active Event Cycle).
 2. Notify Event Cycles to update reference to use new placeholder object
 3. Remove old Logical Reader Updates to ECSpecs can continue to use current mechanism to handle define, redefine and undefine events.

In one embodiment, if EnableDynamicConfig Boolean property is set to true:
 1. Get plugin data from Dynamic Plugin Configuration persistent store
 2. If a logical reader is missing, create a placeholder for use by referencing ECSpecs and Composite Readers.

In one embodiment, if EnableDynamicConfig Boolean property is set to false:
 1. Use edge.props for plugin configuration information.

The JAVA API can include the following set of classes.
PluginMeta
PluginParameterMeta
PluginParameterConstraint
PluginParameterConstraintRangeNumeric
PluginParameterConstratintRegEx
PluginConfig
PluginConfigParameter
PluginType
PluginStatus The JAVA API can also support a client stub to expose the methods defined by the Plug-in API.

Schema definition can be added to support the serialization into XML of the following classes:

PluginMeta
PluginParameterMeta
PluginParameterConstraint
PluginParameterConstraintRangeNumeric
PluginParameterConstratintRegEx
PluginConfig
PluginConfigParameter
PluginType
PluginStatus A new boolean configuration parameter "EnableDynamicPluginConfiguration" can be added to the edge.props file. This configuration parameter can determine the mode of operation for handling Plugin Instance creation and persistence. The default setting can be true.

The edge.properties file can support static declaration of readers, composite readers, triggers, and filters.

PluginMeta information can be provided by the getPluginMeta( ) method of all Plugin drivers.

The Plugin information can be stored in the form of PropsRawConfig files. These files can be constructed and updated dynamically in response to definePlugin, redefinePlugin and undefinePlugin API method invocations.

The Admin Console can be updated to support read only access to Plug-in Meta information and read/write access to Plug-in information using the Plug-in a JAVA API.

An edge server can be configured by means of an configuration file, such as an edge.props file, which can be a JAVA-properties formatted file that configures:
1. The name of the edge server and the port on which its Soap server listens for connections.
2. Internal matters such as thread concurrency and queue depths.
3. Location(s) of EPC company prefix index translation tables.
4. Other settings for: persistence, telemetry, notification drivers and default notification delivery failure handling.
5. Physical readers: driver class, and per-driver configuration items.
6. Composite readers.
7. Filters for logical readers.
8. Triggers: driver class, and per-driver configuration items.

The "Admin Console" can be currently the primary user-visible manifestation of a RFID edge server deployment. This can be where all edge servers are listed and monitored, where ECSpecs and PCSpecs are authored and deployed, and where telemetry and alerts are marshalled. The Admin Console can be extended to allow the configuration of an edge server to be viewed and manipulated via the ALE Configuration API, for example allowing new readers to be defined and configured, triggers to be created, etc.

Figure 7A:
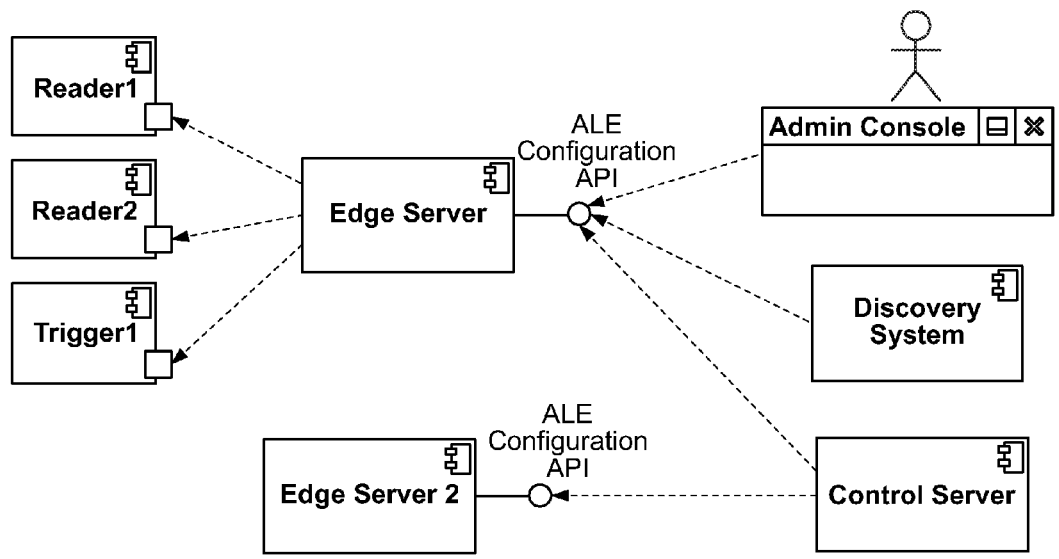
FIGS. 7A-7B illustrate an exemplary ALE configuration API.

FIG. 7A shows the relationship between the readers/triggers, edge servers, the admin console, discovery system, and control server of one embodiment.

Using the ALE Configuration API, an edge server can be configured to work with one or more readers and zero or more triggers. The ALE Configuration API can be accessible to the admin console, so that an administrator may view and manipulate the reader/trigger definitions in an edge server.

The ALE Configuration API can also be available to a discovery system that is responsible for noting the comings and goings of readers on the site network. The discovery system can use the ALE Configuration API to configure an edge server to use a discovered reader.

A control server can use the ALE Configuration API to manipulate the configuration of multiple edge servers.

The ALE Configuration API can provide methods that expose and manipulate various aspects of an edge server's configuration. This API may be considered to be a public interface to an underlying object model.

Figure 7B:
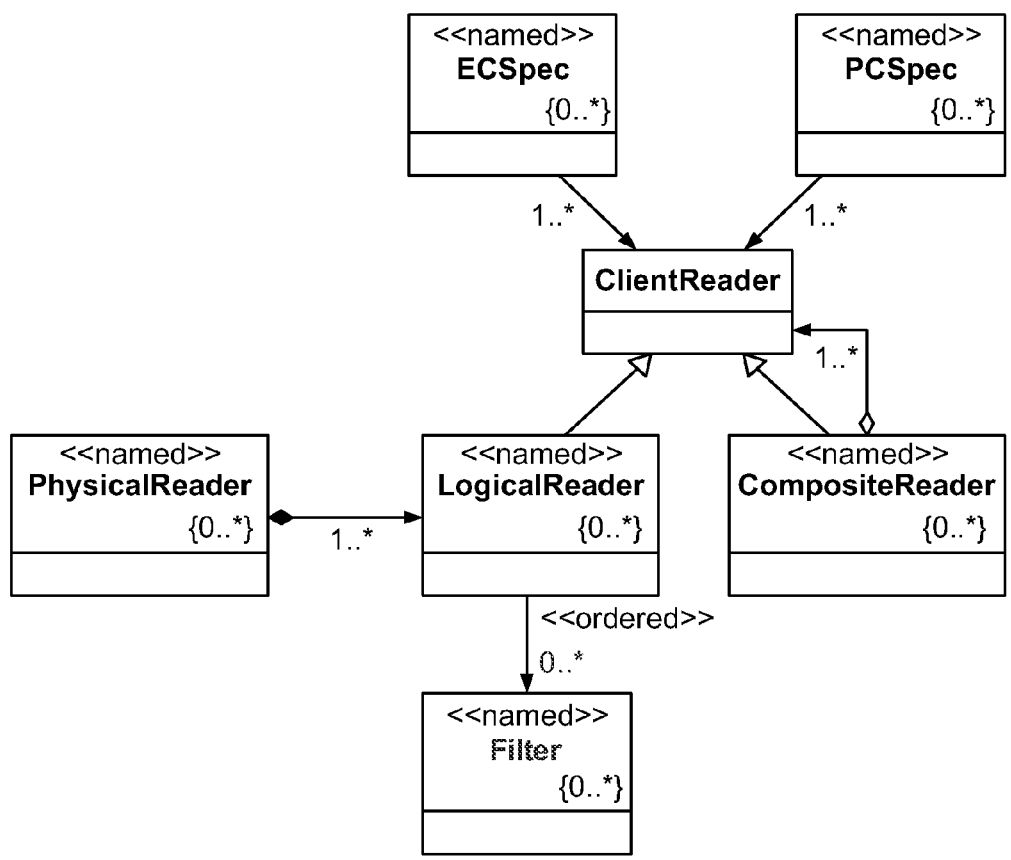

FIG. 7B shows an exemplary entity-relationship diagram of one embodiment. In the interest of simplicity, triggers are not shown.

The <<named>> stereotype indicates that the entity is a collection of instances, each of which has a distinct name (akin to the primary key in a relational model). For example, an edge server can have any number of ECSpec instances, each of which has a unique name. In one embodiment, the ALE Configuration API, such entities are always reference by their name. When one entity references another, it does so via the name of the referenced entity (like a foreign key). ECSpecs and PCSpecs are created via the ALE and ALEPC APIs, respectively. Each ECSpec (or PCSpec) refers to one or more "client" readers, each of which is either a logical reader or a composite reader. A composite reader can be created by use of the ALE Configuration API, and can simply be a collection of logical readers and/or composite readers. A physical reader entity can be created by use of the ALE Configuration API, by specifying a driver implementation class and a set of properties, interpreted by the driver, that configure the physical reader instance. Each physical reader can define one or more logical readers. In one embodiment, Logical readers are not created directly by the ALE Configuration API, but instead are owned by a physical reader. Filters can be created by use of the ALE Configuration API. Each logical reader may have an ordered sequence of filters configured for use during read cycle processing.

Like the other ALE APIs, the ALE Configuration API can be organized as a set of top-level methods, helper objects, and exceptions. In this section we present the ALE Configuration API, with the top-level methods organized and grouped according to function. The API can be presented using pseudo-JAVA syntax. Fundamentally, the API can be exposed as a SOAP-based remote invocation wire protocol, with a JAVA client binding provided to encapsulate the SOAP layer. In addition to the exceptions listed below, all methods can also throw EngineException and RemoteException.

Physical Reader Methods can include:

```
List getAllPhysicalReaderNames( )
void definePhysicalReader(String physicalReaderName, EntitySpec spec)
    throws DuplicatePhysicalReaderNameException,
        DuplicateLogicalReaderNameException,
        EntitySpecValidationException,
        NoSuchDriverException
void undefinePhysicalReader(String physicalReaderName)
    throws NoSuchPhysicalReaderException
void undefinePhysicalReader(String physicalReaderName,
ReferentialIntegrity riControl)
    throws NoSuchPhysicalReaderException,
        InUseException
void redefinePhysicalReader(String physicalReaderName,
EntitySpec spec)
    throws NoSuchPhysicalReaderException,
        DuplicateLogicalReaderNameException,
        EntitySpecValidationException,
        NoSuchDriverException
void redefinePhysicalReader(String physicalReaderName,
            EntitySpec spec, ReferentialIntegrity riControl)
    throws NoSuchPhysicalReaderException,
        DuplicateLogicalReaderNameException,
        EntitySpecValidationException,
        NoSuchDriverException,
        InUseException
EntitySpec getPhysicalReaderSpec(String physicalReaderName)
```

```
List getLogicalReaderNames(String physicalReaderName)
    throws NoSuchPhysicalReaderException
List getPhysicalReaderDriverNames( )
// TBD: methods to list ECSpecs/PCSpecs that depend on a given
physical reader?
//   Not here-such methods should be part of the ALE and ALEPC
//   APIs.
```

The following helper object can be used by all of the methods that define entity instances and return information about them:

```
            class EntitySpec
            {
               String driverName;
               Map config;
            }
```

The driverName can identify the driver class responsible for this entity. The config can be a set of name/value pairs, and is interpreted by the driver class. Each driver class should specify what names it looks for in the map and how it treats their values.
The following enum can be used by methods that could possibly break inter-entity references:

```
   enum ReferentialIntegrity
   {
      ENFORCE,// throw InUseException rather than break reference
      RELAX        // allow reference to dangle
      // UPDATE // remove the reference
   }
```

If ENFORCE is specified, a method such as undefinePhysicalReader( ) can throw InUseException if the operation would cause a reference to be broken (such as an ECSpec that references a logical reader defined by the to-be-undefined physical reader).

In one embodiment, if RELAX is specified, then enforcement of referential integrity constraints is not performed. This introduces the possibility of dangling references. For example, if a physical reader is undefined, and an ECSpec lists a logical reader which no longer exists as a result of undefining the physical reader, then we say that the ECSpec has a dangling reference to a non-existent logical reader. In all such cases, can carefully specify the resulting behavior. In the present example, the ECSpec can operate as if the missing logical reader exists but always produces read errors (say).

UPDATE can maintain referential integrity by modifying a referencing entity so that it no longer references the deleted entity. For example, ECSpecs and PCSpecs can be altered to remove an undefined reader from their list of logical readers.

Logical Reader Methods can include:

```
List getAllLogicalReaderNames( )
boolean supportsReading(String logicalReaderName)
    throws NoSuchLogicalReaderException
boolean supportsWriting(String logicalReaderName)
    throws NoSuchLogicalReaderException
List getFilterChain(String logicalReaderName)
    throws NoSuchLogicalReaderException
void setFilterChain(String logicalReaderName, List filterNames)
    throws NoSuchLogicalReaderException,
        NoSuchFilterException
void prependFilterToChain(String logicalReaderName, String filterName)
    throws NoSuchLogicalReaderException,
        NoSuchFilterException
void appendFilterToChain(String logicalReaderName, String filterName)
    throws NoSuchLogicalReaderException,
        NoSuchFilterException
void removeFilterFromChain(String logicalReaderName,
String filterName)
    throws NoSuchLogicalReaderException,
        NoSuchFilterException
String getPhysicalReaderName(String logicalReaderName)
    throws NoSuchLogicalReaderException
// This method should be part of ALE: getECSpecsForReader
//List getECSpecNamesUsingReader(String clientReaderName)
//   throws NoSuchClientReaderException
// This method should be part of ALEPC: getPCSpecsForReader
//List getPCSpecNamesUsingReader(String clientReaderName)
//   throws NoSuchClientReaderException
List getCompositeReaderNamesUsingReader(String clientReaderName)
    throws NoSuchClientReaderException
```

Filter Methods can include:

```
List getAllFilterNames( )
    void defineFilter(String filterName, EntitySpec spec)
        throws DuplicateFilterNameException,
            EntitySpecValidationException,
            NoSuchDriverException
    void undefineFilter(String filterName)
        throws NoSuchFilterException
    void undefineFilter(String filterName, ReferentialIntegrity riControl)
        throws NoSuchFilterException,
            InUseException
    void redefineFilter(String filterName, EntitySpec spec)
        throws NoSuchFilterException,
            EntitySpecValidationException,
            NoSuchDriverException
    void redefineFilter(String filterName, EntitySpec spec,
    ReferentialIntegrity riControl)
        throws NoSuchFilterException,
            EntitySpecValidationException,
            NoSuchDriverException,
            InUseException
    EntitySpec getFilterSpec(String filterName)
    List getLogicalReaderNamesUsingFilter(String filterName)
        throws NoSuchFilterException
    List getFilterDriverNames( )
```

Composite Reader Methods can include:

```
List getAllCompositeReaderNames( )
    void defineCompositeReader(String compositeReaderName,
            List clientReaderNames, boolean reportFailedMembers)
        throws DuplicateCompositeReaderNameException,
            NoSuchClientReaderException,
            CyclicDefinitionException
    void undefineCompositeReader(String compositeReaderName)
        throws NoSuchCompositeReaderException
    void undefineCompositeReader(String compositeReaderName,
    ReferentialIntegrity riControl)
        throws NoSuchCompositeReaderException,
            InUseException
    void redefineCompositeReader(String compositeReaderName,
            List clientReaderNames, boolean reportFailedMembers)
        throws NoSuchCompositeReaderException,
            NoSuchClientReaderException,
            CyclicDefinitionException
    void redefineCompositeReader(String compositeReaderName,
            List clientReaderNames, boolean reportFailedMembers,
            ReferentialIntegrity riControl)
        throws NoSuchCompositeReaderException,
```

```
        NoSuchClientReaderException,
        CyclicDefinitionException,
        InUseException
    void addReaderToComposite(String compositeReaderName, String
clientReaderName)
        throws NoSuchCompositeReaderException,
        CyclicDefinitionException
    void addReadersToComposite(String compositeReaderName, List
clientReaderNames)
        throws NoSuchCompositeReaderException,
        CyclicDefinitionException
    void removeReaderFromComposite(String compositeReaderName, String
clientReaderName)
        throws NoSuchCompositeReaderException
    boolean getReportFailedMembers(String compositeReaderName)
        throws NoSuchCompositeReaderException
    List getClientReaderNames(String compositeReaderName)
        throws NoSuchCompositeReaderException
```

Trigger Methods can include:

```
List getAllTriggerNames( )
void defineTrigger(String triggerName, EntitySpec spec)
    throws DuplicateTriggerNameException,
        EntitySpecValidationException,
        NoSuchDriverException
void undefineTrigger(String triggerName)
    throws NoSuchTriggerException
void undefineTrigger(String triggerName, ReferentialIntegrity riControl)
    throws NoSuchTriggerException,
        InUseException
void redefineTrigger(String triggerName, EntitySpec spec)
    throws NoSuchTriggerException,
        EntitySpecValidationException,
        NoSuchDriverException
void redefineTrigger(String triggerName, EntitySpec spec,
    ReferentialIntegrity riControl) throws NoSuchTriggerException,
        EntitySpecValidationException,
        NoSuchDriverException,
        InUseException
EntitySpec getTriggerSpec(String triggerName)
// This method should be part of ALE: getECSpecsForTrigger
//List getECSpecNamesUsingTrigger(String triggerName)
//    throws NoSuchTriggerException
// This method should be part of ALEPC: getPCSpecsForTrigger
//List getPCSpecNamesUsingTrigger(String triggerName)
//    throws NoSuchTriggerException
```

The definitions for readers, filters, triggers, etc. can be all persisted in a persistent store, such as the var/edgestate repository along with ECSpecs, subscriptions, EPC caches, etc.

The ClearEdgeServerState utility can have options to control which persistent state is cleared.

In one embodiment, dynamic changes to an edge server's configuration can have an effect on that edge server's ongoing processing activities.

In one embodiment, the general strategy can be twofold. First, we notify affected entities of a change to something they refer to. So for example, if a filter is changed, then affected logical readers can be notified. If a reader is changed, then affected event cycles and/or programming cycles can be notified.

Second, if an entity is undefined in RELAX mode, then other entities that refer to it can replace their reference with a reference to a "placeholder" object of the same name, where the placeholder object provides an appropriate neutral behavior (for example, a placeholder filter's behavior can be pass-through). Later, if an entity is defined again to the same name, then such placeholder references can be replaced (such as, in the change-notification logic) with a reference to the newly defined entity of the same name as the previously undefined entity.

Normally, defining a new physical reader (and so one or more logical readers), filter, composite reader, or trigger would not affect any existing ECSpecs or PCSpecs, because the ECSpecs and PCSpecs are already bound to existing entities and don't care about any additional readers etc.

However, a RELAX-mode change to configuration could have left an ECSpec or PCSpec with a "dangling" reference to a reader or trigger (or a logical reader could have a dangling reference to a filter, etc.), in which case defining a "new" entity could really be re-establishing a previous referential relationship.

Thus, even new entity definitions should be treated as potentially affecting ongoing processing activity.

All event cycles (and programming cycles) can be told (by queuing a change notification event) whenever:
   a new client reader (logical or composite) is defined. The change notification is decorated with the reader's name and a reference to the reader instance.
   a new trigger is defined. The change notification is decorated with the trigger's name and a reference to the trigger instance.
   a composite reader is updated due to a new logical reader being defined, with the effect of replacing a placeholder reference in the composite reader.

When the event cycle processes the queued change notification, it can check its client reader list (or trigger specs) to see if any placeholder references thereon are to be replaced with a reference to a newly defined reader (or trigger). If so, the event cycle can re-performs any of its validations or computations related to its reader list (or trigger specs).

Whenever a new filter is defined, the reader manager can notify all logical readers (via a new method to be defined in the LogicalReader interface), identifying the name of the new filter and providing the filter definition (factory, in the parlance of our implementation). Each logical reader can determine whether it has any placeholder references that should be re-bound to an instance of the newly defined filter, and if so, create an instance of the new filter and replaces the placholder with it, and commence using the new filter in the logical reader's filter chain.

If a new logical reader is defined (indirectly, by (re)defining a physical reader), then the CompositeReaderManager can be notified so that it can update its tables, replacing placeholder references as appropriate. In addition, all event/programming cycles can be notified of the change, as mentioned above.

Whenever an entity is undefined in RELAX mode, all entities that reference it can be notified, so that the references to the undefined entity can be replaced with "placeholder" references. Placeholder references can be used so that if the just-undefined entity is later re-defined, the redefined entity will take the place of the previously undefined original in all referencing entities.

When an entity is undefined, the telemetry subsystem can be notified. Any TelemetrySpecs that reference the just-undefined entity can replace the entity with a placeholder, and optionally also generate a report to subscribers notifying them that the device has been undefined.

When a physical reader is undefined in RELAX mode, resulting in one or more logical readers being undefined, then any referencing ECSpecs or PCSpecs (and composite readers) can replace their reference to the just-undefined logical reader with a reference to a placeholder logical reader.

In one embodiment, a placeholder logical reader is not visible through the ALE Configuration API methods, and so for example placeholder logical readers are not part of the getAllLogicalReaderNames( ) collection. But an ECSpec (or PCSpec, or composite) that references a placeholder logical reader can include the logical reader name among its list of client readers.

When an active event cycle (or programming cycle) attempts to use a placeholder logical reader, the placeholder logical reader can complete its operation with an "undefined logical reader" failure status, and the event cycle (or programming cycle) can behave as it normally does when a logical reader fails.

When a composite reader is undefined in RELAX mode, then any referencing ECSpecs or PCSpecs (or other composite readers) can replace their reference to the just-undefined composite reader with a reference to a placeholder composite reader. In one embodiment, a placeholder composite reader is not visible through the ALE Configuration API methods, and so for example placeholder composite readers are not part of the getAllCompositeReaderNames( ) collection. An ECSpec (or PCSpec, or another composite) that references a placeholder composite reader can include the composite reader name among its list of client readers. A placeholder composite reader can simply behave as a composite reader with no entries.

When a filter is undefined in RELAX mode, then any referencing logical readers can replace their reference to the just-undefined filter with a reference to a placeholder filter. In one embodiment, a placeholder filter is not visible through the ALE Configuration API methods, and so for example placeholder filters are not part of the getAllFilterNames( ) collection. In one embodiment, a logical reader that references a placeholder filter can include the filter name in its chain of filters. A placeholder filter can behave as a pass-through (identity) function, leaving the EPCBuffer contents unchanged.

When a trigger is undefined in RELAX mode, then any referencing ECSpecs or PCSpecs can replace their reference to the just-undefined trigger with a reference to a placeholder trigger. A placeholder trigger is not visible through the ALE Configuration API methods, and so for example placeholder triggers are not part of the getAllTriggerNames( ) collection. A ECSpec (or PCSpec) that references a placeholder trigger can continue to include the trigger name in its specification. A placeholder trigger can behave as a "dead" trigger, one that can be subscribed/unsubscribed, but never actually fires.

When a physical reader is redefined, this can cause new logical readers to be defined or existing logical readers to be undefined (because the replacement physical reader's spec can define a different set of logical readers as the original physical reader spec). Handling of newly defined (or undefined) logical readers can be handled as described above. In addition, the read/write capability of an existing logical reader may be changed as a result of redefining the physical reader that defines the logical reader. Affected ECSpecs and PCSpecs can re-evaluate the usability of their logical readers whenever such a change occurs.

When a composite reader is redefined, affected ECSpecs and PCSpecs can be notified so that they can re-expand the composite and continue working with the resulting list of logical readers.

When a filter is redefined, affected logical readers can be notified so that they can replace their corresponding filter chain entries with a reference to a replacement filter instance.

When a trigger is redefined, affected ECSpecs and PCSpecs can be notified so that they can replace their reference to the previous trigger with a reference to the new trigger.

The dynamic configuration API can expand the configuration API discussion below.

The Configuration API can provide a mechanism for applications to decouple the form of a configuration file (properties, XML, database, etc) from the usage of that configuration. It can thus easy to add a new configuration file format without changing the application code which uses the configuration data. It can also be easy to delegate description and validation of configuration to the module which makes use of that configuration. In one embodiment, configuration items may be Boolean values, integers, strings, files, and may also be extended to include new types. Configuration items may be organized into subconfigurations, or into concepts, which allow an arbitrary number of similar configurations to be created.

The design can consists of three separate parts. First is the RawConfig class. This class can represent configuration which is read directly from a configuration source, before any parsing and validation. It is also possible to create a RawConfig class by taking a piece of an existing RawConfig.

The next part of the system can be the ConfigItem and its derived classes. A ConfigItem represents one bit of configuration data. Each derived class can determine the semantics of a particular type, including validation criteria such as format and ranges. The derived class can also acts as a holder for the typed configuration item.

Finally, the ValidatedConfig class can tie together RawConfig and ConfigItems. This class can represent a description of configuration for a specific component of the system. A ValidatedConfig object can be composed of a set of ConfigItem objects. After the ValidatedConfig is created and all its ConfigItem objects are set, the ValidatedConfig can be tied to a RawConfig object. The ValidatedConfig object can read items from the RawConfig for each ConfigItem, and uses the ConfigItem to verify and store the value. After this step, the application can read the values from the ValidatedConfig object, from holder ConfigItem objects, or create a new RawConfig which represents a slice of the RawConfig which is associated with the ValidatedConfig.

The properties can be imported into the configuration system by crearing a PropsRawConfig object using these properties. The prefix can indicate that only properties with this prefix should be considered.

The first two properties are simple ConfigItems. The first can be an integer, and the second can be string. They could be described using addIntItem( ) and addstringItem( ), or they could be described using addItem( ) and explicitly created ConfigInt and ConfigString objects. Once ValidatedConfig.readFrom( ) is called to parse the RawConfig, their values can be retrieved using getIntValue( ) and getStringValue( ) on the ValidatedConfig object, or by calling ConfigInt.intValue( ) and ConfigString.stringValue( ). com.connecterra.ale.servicePort=6060
com.connecterra.ale.siteID=DistributionCenter The next two values can introduce the idea of subconfiguration. The persistence subsystem of ALE can take a set of config values. Rather than having the persistence subsystem aware of the structure of the entire application, the application can create a slice of the configuration space by calling getSubConfig("persistence") on either the RawConfig or ValidatedConfig objects. Then, the persistence subsystem can treat the directory and interval items as simple items. If the configuration of the subsystem is known in advance, ValidatedConfig.addSubConfig( ) can be used to partially or fully describe it. ValidatedConfig.readFrom( ) will then validate and read into the subconfig as well. com.connecterra.ale.persistence.directory=/opt/rfta/var/edgestate com.connecterra.ale.persistence.interval=3600

The final aspect of configuration can be concepts and instances. It is sometimes useful to use configuration to describe an open-ended set. In the example below, we describe two instances of a concept "reader", named "dock1" and "dock2". A common pattern will be to create a simple inferior ValidatedConfig containing only the items common across all instances (in this case, "class"), add that to the main validated config with the addConcept( ) method. When readFrom( ) is called, the configuration implementation can verify that each instance of the concept which is given contains the necessary properties. The inferior ValidatedConfig can be filled in with arbitrary data at this point. Next, the caller can use listInstanceNames( ) to get a list of all of the instances, and then use getInstance( ) to construct a slice of the configuration which can be passed to the specific initialization code for further validation. The specific initialization code can treat its configuration as simple items. The readFromInstance( ) sugar method can combine a call to getInstance( ) with a call to readFrom( ). com.connecterra.ale.reader.dock1.class=com.connecterra.ThingMagic com.connecterra.ale.reader.dock1.hostname=thingmagic.example.com com.connecterra.ale.reader.dock2.class= com.connecterra.Matrics com.connecterra.ale.reader.dock2.defaultRate=500

Figure 8A:
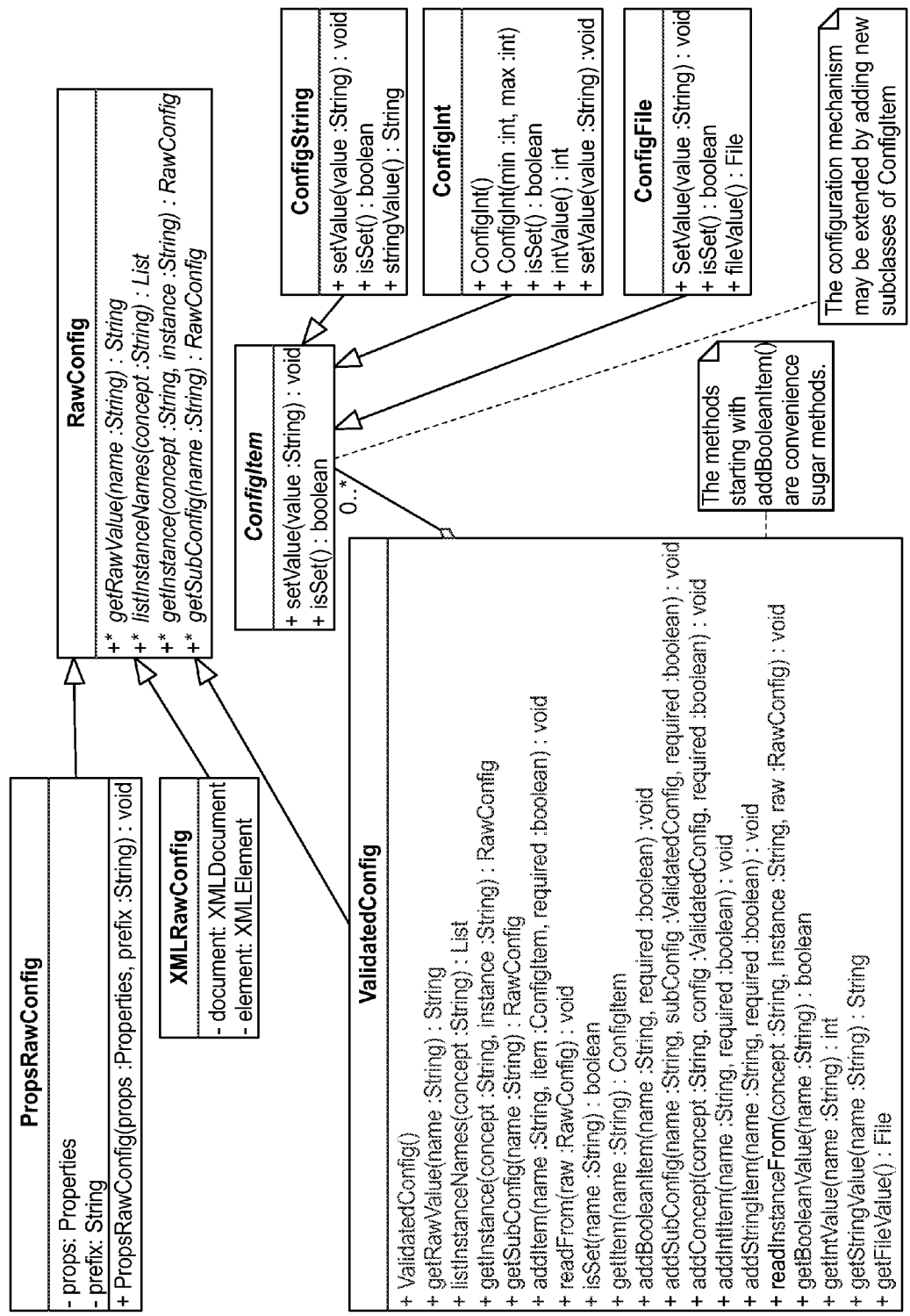
FIGS. 8A-8C illustrate an exemplary configuration API.

FIG. 8A shows a configuration UML interaction diagram of one embodiment.

The API can be used in two ways. The higher level interface can use sugar methods to add configuration items to the ValidatedConfig and to retrieve their values. This can result in less code for the common case (no subConfigs or concepts, and only native or String types). It can be used in other situations, but will generally require downcasts which can only be correctly verified at runtime.

The low level interface can use ConfigItem objects as holders. It can involve more code, but allows complex configurations to be built while still permitting compile-time checking for all types, including new ConfigItem types for which no sugar methods exist.

Figure 8B:
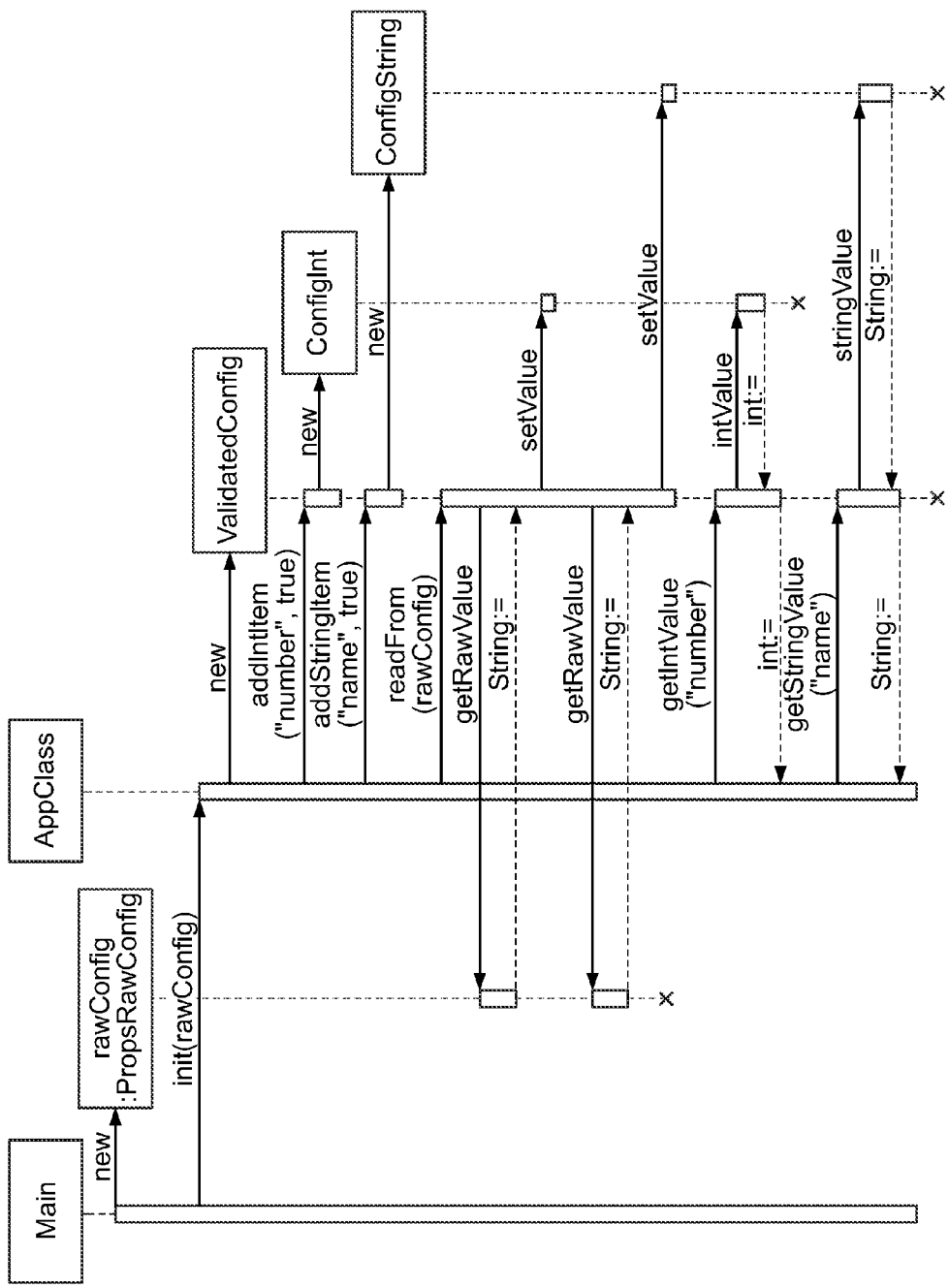

FIG. 8B shows a diagram of a high level configuration API of one embodiment.

Figure 8C:
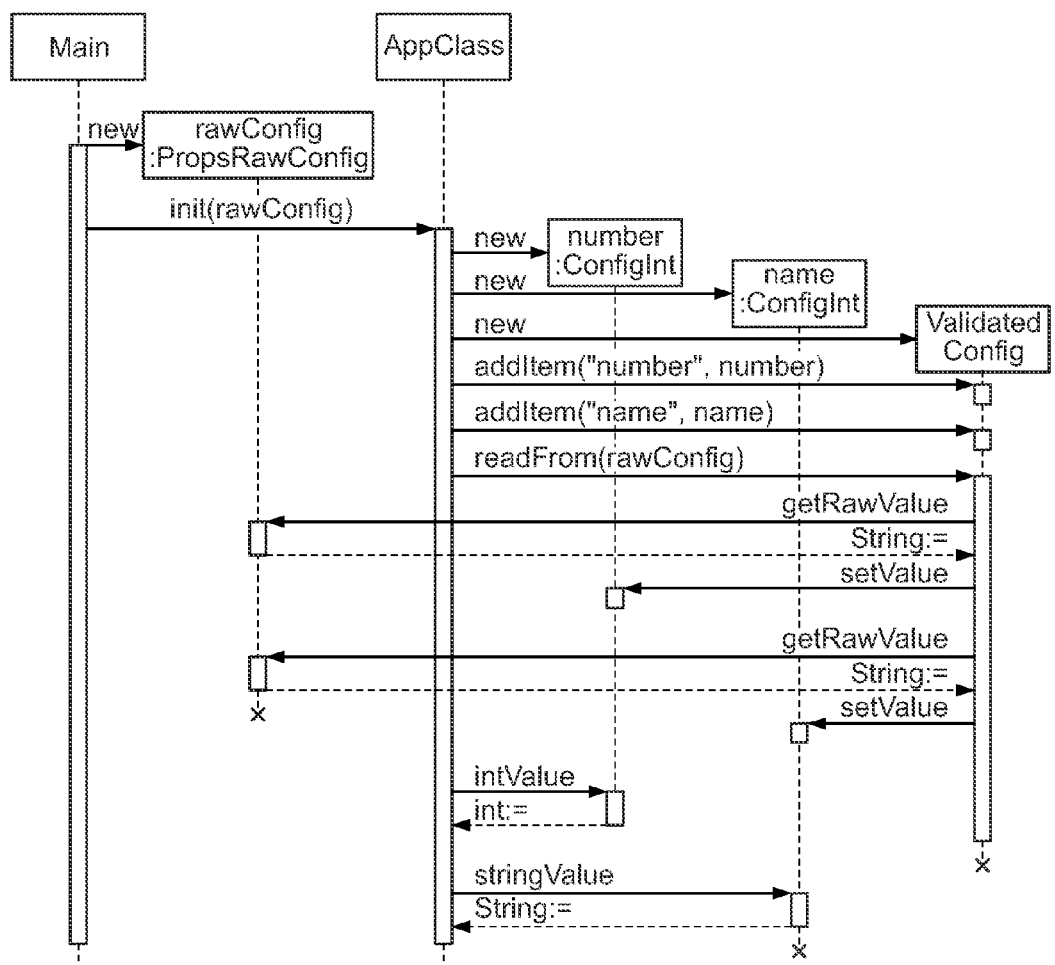

FIG. 8C shows a diagram of a low level configuration API of one embodiment.

In one embodiment, there are three places where exceptions need to be considered When a configuration item is invalid according to ConfigItem.setValue( ) In this case, a ConfigItemException checked exception is thrown. The reason string for this exception will give a human-readable description of the configuration error.

When ConfigFoo.fooValue( ) or ValidatedConfig.getFooValue( ) has no value to return, because the underlying value was optional and not specified. In this case, an UnsetItemException unchecked exception, which derives from IllegalStateException, is thrown.

When the validation performed by readFrom( ) fails.

When the ValidatedConfig.readFrom( ) method runs, it can attempt to collect as much information about the configuration problems it sees as it can, so that the user can respond to them all at once, instead of repeating a run-error-fix-retry cycle. To accomplish this, ConfigValidationException, which derives from com.connecterra.util.MultiException, can be used. When setValue( ) throws a ConfigItemException, this exception can be added to a ConfigValidationException, which can be thrown at the end of the validation process. The ConfigItemException can also be decorated with additional information to determine the context, such as the property name, XML path, file line number, etc.

Figure 5A:
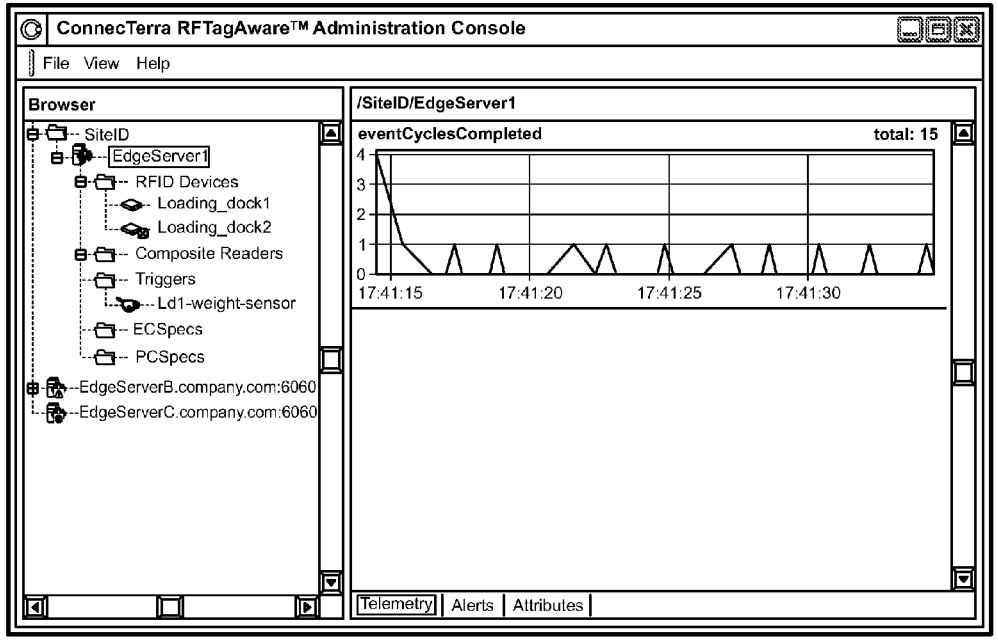
FIGS. 5A-5H illustrate console screens of an exemplary console for a RFID edge filter.

FIG. 5A shows an exemplary administration console window for use with a system of the present invention. Active edge servers can be organized into a site/server hierarchy, based on the SiteID and ServerID configured at the edge. Each edge server node in the tree can have children that represent different parts of the edge server. Readers, Triggers, ECSpecs, PCSpecs, and Composite Readers can be nodes in the tree.

Figure 5B:
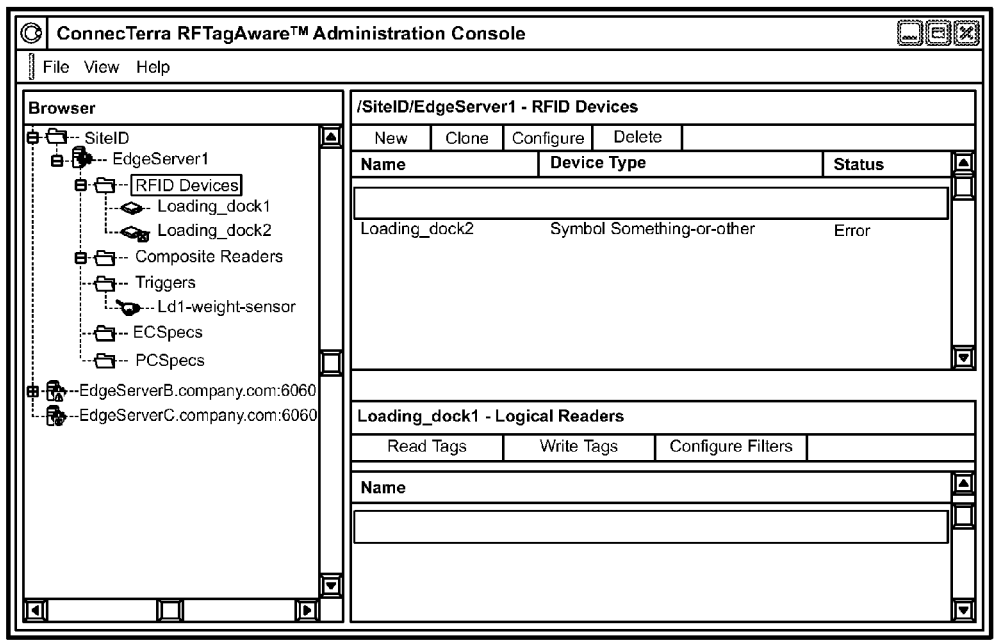

FIG. 5B shows an exemplary administration console RFID Devices Panel window. When the "RFID Devices" node is selected in the tree, the right-hand panel can show the RFID Devices Panels. In the RFID Devices subpane, the "New" button can always be enabled, allowing the user to configure a new device.

When a device is selected from the list, the Logical Readers list panel can update, displaying a list of Logical Readers associated with that device. Also, the panel can enables the Clone, Configure, and Delete buttons. The Clone button can act like the New button, beginning the creation of a new RFID Device entry on the server, but it can also fill in the configuration dialog fields with values from the currently-selected device. The Configure button can display the configuration dialog for the device, allowing the user to change configuration values as desired. The Delete button can ask the user to confirm their intention to remove the device's configuration from the Edge Server.

In the Logical Readers subpane, when a logical reader is selected, the Configure Filters button can be enabled. Also, if the selected reader supports reading tags, the Read Tags button can be enabled; likewise with the Write Tags button. The Read Tags and Write Tags buttons can activate their respective User Interfaces. The Configure Filters button can allow the user to configure the edge server filters associated with the reader at the device level.

Figures 5C, 5D:
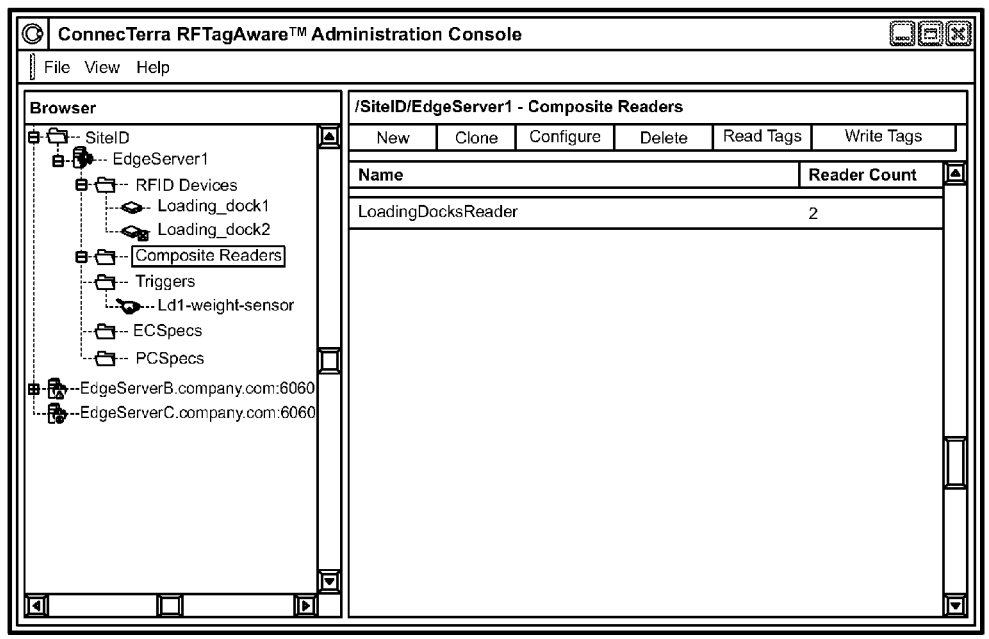

As shown in FIG. 5C, when a composite reader is selected from the list, the panel can enable the Clone, Configure, and Delete buttons. The Clone button can create a new composite reader and populate the new configuration dialog with the selected reader's configuration. The Configure button can display the configuration dialog for the selected reader, allowing the user to modify its reader list as desired. The Delete button can ask the user to confirm their intention to remove the selected reader from the Edge Server.

Read Tags and Write Tags can work on a Composite Reader as they do on a Logical Reader. When the user selects "New Reader . . . ", the Reader Configuration dialog can be displayed with empty fields. The Reader Driver combo box selection can read "Select a Driver . . . " and the parameter area of the screen can be left empty until an initial driver selection.

The first time the user tries to create or edit a Reader on a given Edge Server, the list of available drivers can be requested from the remote server. Once we have the list of drivers for a server, we can assume that it won't change while we believe the Edge Server is running. If the Edge Server ever appears to be unavailable, we can clear this memorized list of drivers, since this could be the result of a restart operation. Also, if the user chooses to manually refresh an Edge's device tree, that server's list of drivers can be cleared.

The list of drivers can be used to populate the Reader Driver pull down combo box of one embodiment is shown in FIG. 5D. The Reader Configuration dialog can be dynamically generated from server-provided information about the configuration options supported by the currently-selected driver. When the driver changes, the dialog can remember all values associated with their internal key name, and attempts to configure the new driver with the remembered values. If there is sufficient room to display the parameters and the driver need to be configured, the dialog can simply consist of a set of parameter edit fields, allowing the user to enter values for each parameter. If there are too many parameters to fit gracefully, these parameters can be embedded in a scrolling pane.

Each parameter edit field can display the human-readable parameter name (if this is provided by the Config API—if not, it can display the internal parameter name), a text entry field, a "required field" indicator, and a description of the field constraint, if such a description is available through the Config API. When the user completes the form, entries can be validated and the specified reader saved to the server.

Figure 5E:
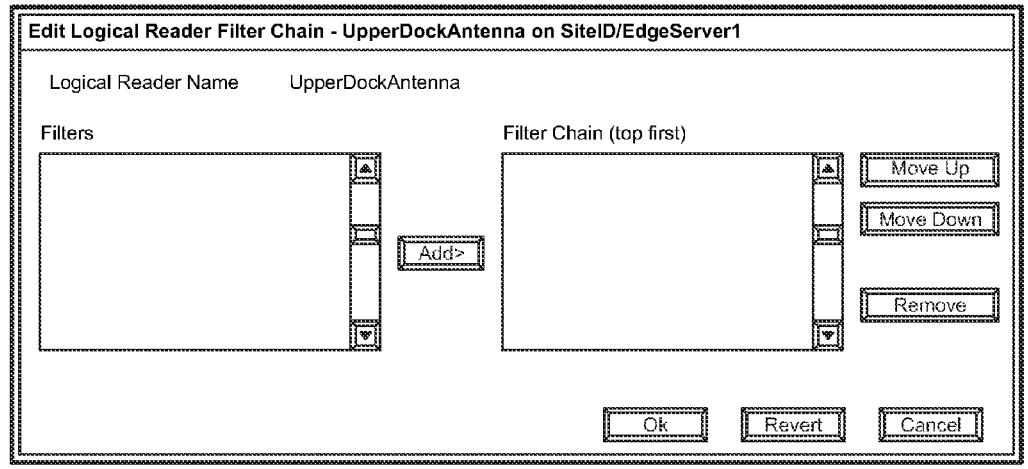

FIG. 5E shows a screen for managing the ALE filters of one embodiment. The list of available filters on an Edge Server can be obtained in a just-in-time basis, and cached for the lifetime of an Edge Server connection. Like the list of available reader drivers, the cached version of this list can be invalidated if we lose connection to the Edge. This screen of FIG. 5E can be used to edits the filter chain associated with a logical reader. The "Add" button can add the currently selected filter from the Filters list to the bottom of the chain. Adding a filter to the chain need not remove it from the Filters list, since a filter can be include multiple times in a given reader's chain. The "Move Up" and "Move Down" button can move the selected filter earlier or later in the filter chain. "Remove" can remove the selected filter from the chain.

In one embodiment, the Add button is only enabled if there is a filter selected in the Filters list and the Move Up, Move Down, and Remove buttons need only enabled if there is a filter selected in the Filter Chain. When the user presses the "Revert" button, the filter chain is reverted to the list of filters it contained when the dialog was initialized. "Cancel" can exit the dialog box without saving changes. The "Ok" button can commit the changes to the filter chain to the edge server.

Figure 5F:
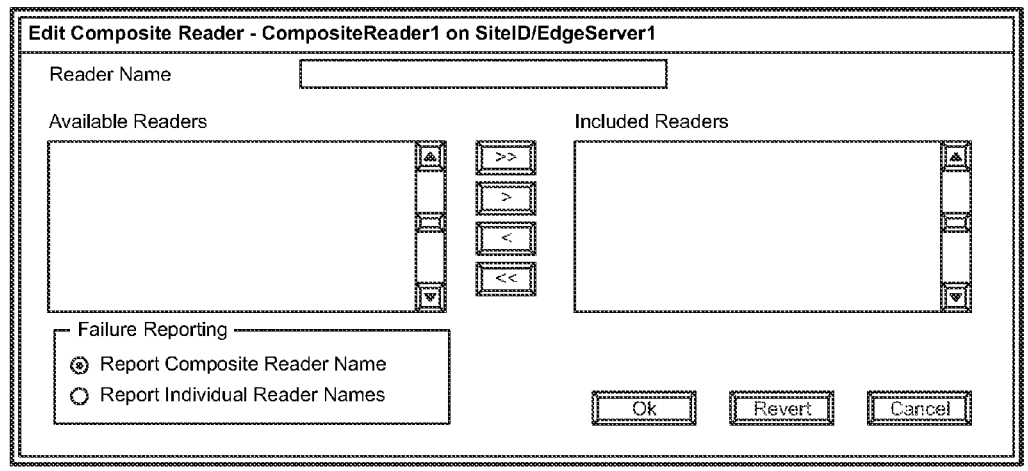

In one embodiment, when the user configures or creates a composite reader, the admin console can present the Composite Reader Configuration Dialog as shown in FIG. 5F. The Available Readers list box can list Logical Readers that are configured, but not included in the Composite Reader. The Included Readers list box can list all Logical Readers that are included in this Composite Reader. Two arrow buttons can allow "moving" a logical reader from one side to the other. Double-clicking a reader in either list can move it to the other side.

The "Failure Reporting" radio buttons can let the user choose the form a failure report takes in the ECReports object for an ECSpec that lists the CompositeReader. In one embodiment, the user can only add currently configured Logical Readers to a Composite Reader. The user is given a warning if he attempts to remove an unconfigured Logical Reader from the Composite Reader: "The Logical Reader you are removing is not configured. You will not be able to add it back to this Composite Reader without reconfiguring it first."

An EC Spec Editor can be used to indicate when a EC Spec is suspended, rather than adding another column to the pane, the suspended state will be indicated by added "(suspended)" to the Subscriber Count and by changing the row to have a yellow background, similar to the warnings on the Alerts page. The EC Spec table to be sorted by the various columns (using TableSorter), and enable the user to open an EC Spec, Filter or Report by double clicking on the appropriate line in the corresponding table.

"Deploy" and "Deploy As" can be added to the ECSpec file menu to join "Export" and "Close". Add "Import" and "Revert" can be also added to the Leave "Test" as the only item in Tools menu.

View menu can include "EC Spec Editor", "As XML" and "As Text" with one of them grayed out at any given time. The icons for these three functions can always be visible, with one grayed out.

The Attributes section can be added to allow the user to specify whether to include the EC Spec in each EC Report. It can be below the Stop section and above the Application Data section. In the Stop section, the user can be able to specify Duration (Milliseconds), Duration (Read Cycles), Stable Field Interval (Milliseconds) and Stable Field Interval (Read Cycles) independently.

In the Start section, the label Milliseconds can be positioned to the left of the repeat period text box to be consistent with Duration and Stable Set Interval in the Stop section.

There need not be three tabs at the bottom of the screen to switch to View by Text or View by XML, or back to the editor. Instead these functions can be accessed through the menu or toolbar.

Include can be renamed Include Filters, Exclude can be renamed to Exclude Filters, and there can be a new entry named Grouping in that tree. Selecting Grouping can call up a list of the grouping patterns, just like the filters table. The input grouping pattern screen can look just like the input filter screen except that there is a fourth option for each field "Group By" inserted between "Any" and "Specific". When the user enters a grouping pattern, an abbreviated URI representation can appear in the tree on the left, similar to the filters.

In one embodiment, validation of the EC Spec will not be done as the user enters data. Validation can be left to the edge server whenever possible. The messages section need not be a tabbed pane. It can be a simple pane with a blue grouping box similar to the sections in the EC Spec Edit pane above it.

The Report Type section can be renamed "Report Contents:". It can have 5 check boxes in a column, "EPC List", "Tag List", "Raw Hexadecimal List", "Raw Decimal List" and "Count". EPC List is checked by default. This list need not be validated. Validation can be left to the Edge Server. The "Behavior when Empty" section can be replaced by "Omit Report:" section. In this section is "Omit if empty", "Omit if unchanged from last cycle" and "If omitted, suppress all EC Reports this cycle". The last of these can be grayed out if the first two are both unchecked as it would not have an effect.

When the EC Report comes back, it can be viewed in a new frame The title can include the EC Spec Name and a Timestamp. It can have a menu bar (not Save and OK buttons). The File menu can contain "Export" and "Close". The Help menu can contain "EC Reports Help". The frame can be non-modal.

There can be a progress dialog that says "Please wait while we communicate with the Edge Server", it can have an animated gif like an hourglass or an endlessly repeating progress bar. It can have a single button Cancel. This dialog can be modal and appears roughly half a second after the message is sent to the Edge Server if the response hasn't come back. This may be accomplished by creating the dialog immediately and setting a timer that will display it. The cursor can change to a watch cursor (with an hourglass) as soon as the user clicks, and the user will be prevented from clicking around.

This dialog need not be used for Activate Once or Test (on an edited EC Spec). Instead the EC Report View dialog can be called up instead, and initially says something like "waiting for results from the edge server." That dialog can be non-modal.

Figure 5G:
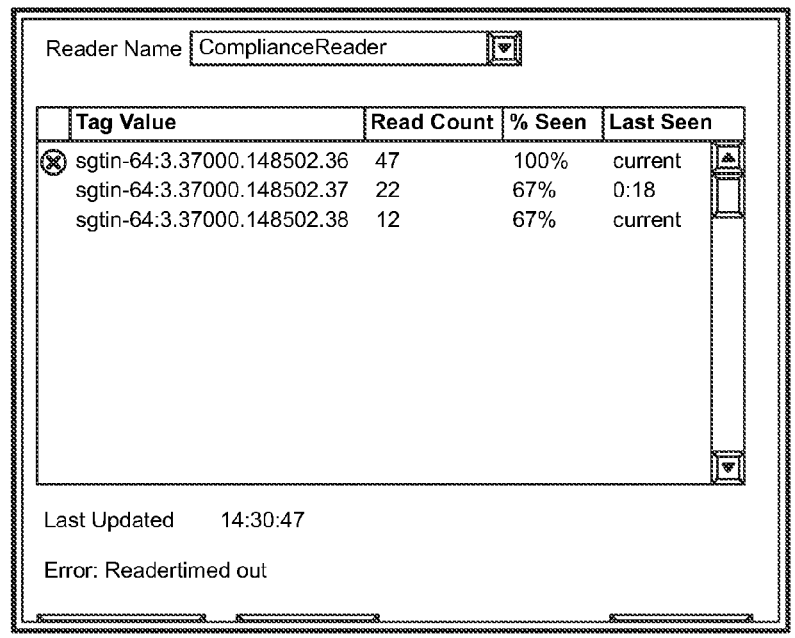

FIG. 5G shows a Read Tags dialog that can come up when a user presses the "Read Tags" toolbar button from the Logical Readers table or the Composite Readers table. The Admin Console can repeatedly perform immediate tag reads on the selected reader, displaying the results in the tag values list box. The first column can be an indicator of tag status; a red X shows a tag that has left the reader's field. Once 5 minutes have passed without seeing a tag, that tag can be deleted from the list. The Read count can show how many times a tag has been read. The % Seen column can be calculated as a percentage of read cycles in which the tag has been detected since the tag was first seen. Thus, a tag can start out at 100%, and if the tag is removed from the field its percentage can decrease until the tag entry expires from the list in five minutes. This column can be most valuable for measuring intermittent tags. When the reader is running, the user can press the "Stop" button to suspend reads. If a read returns an error, reads can be suspended. When reads are suspended, the "Start" and "Clear" buttons can be enabled. "Restart" can continue reading. In one embodiment, the values in the table do not update while reads are suspended, and tags do not expire from the list.

Figure 5H:
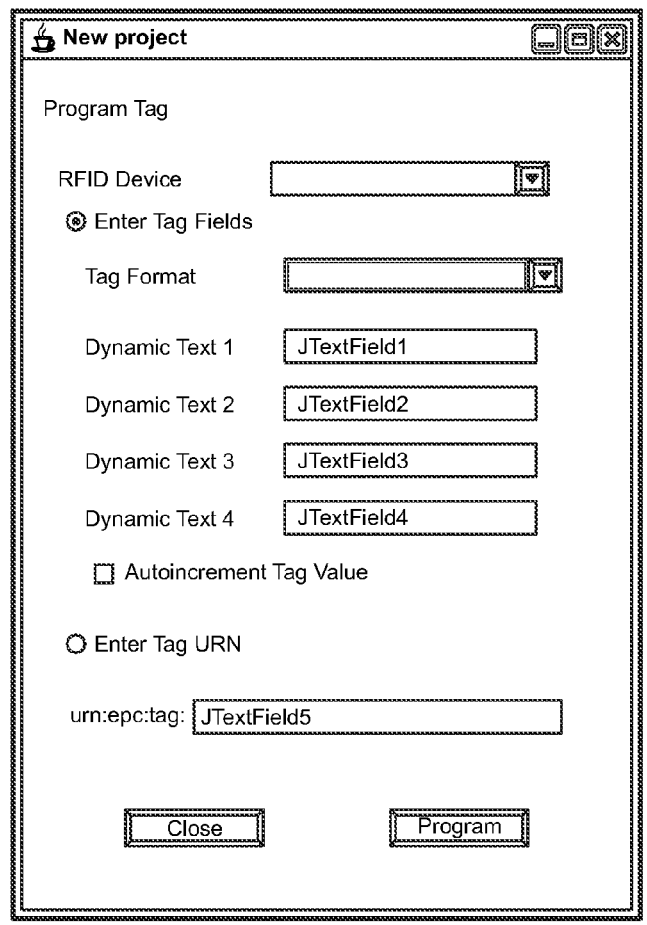

FIG. 5H shows a Write Tags dialog that can come up when a user presses the "Write Tags" toolbar button from the Logical Readers table or the Composite Readers table. If a reader was selected in that table, the Logical Reader field can be populated with the selected reader's name.

When the user presses the "Program" button, the Admin Console can validate the tag value, put together a PC Spec with the specified tag value (using certain hard-coded defaults for PC Spec parameters) and attempt to write the tag. If there is an error, a Tag Programming Error dialog can come up with descriptive text. Otherwise, the console can either dismiss the dialog or update it, depending on the value of the "Autoincrement Tag Value" checkbox.

This document describes a part of the design for the ALE GUI. Specifically, it provides a controller and model design on which the ALE GUI views are to be built. These components may also be reused by other user interfaces which make use of the RFID Edge Server, ALE and telemetry APIs.

This section lists key terms and definitions as utilized in the design of one embodiment:

Model—A data container that holds a view-independent version of system information. Often, models notify registered listeners when changes have occurred in the underlying data.

Controller—An object that provides a mechanism for getting data into the Model in an application-specific way. The Controller is the link between the Model/View and the real world.

Telemetry—The RFID Edge Server can have a Telemetry API that provides device status and time-series information on a subscription basis. The client subscribes to a telemetry stream, and the Edge Server begins pushing data to the client, until either the client unsubscribes, or there are enough consecutive delivery failures.

Time-series information—Various devices on the Edge Server export time-series data streams via the Telemetry API. These data streams are either time/value pairs, or time/gauge pairs, and the names of these streams are device-specific.

Gauge—a stock-ticker style data point with a high-water mark, low-water mark, and average value for any given time.

The design encompasses separate controllers and models for the ALE API and the Telemetry API. They can share a few classes which describe edge servers, since this is the common point of reference for both APIs. Each controller can provide methods which can be used to monitor changes to some edge server data. The interface can hide details such as whether a publish/subscribe model or a polling model is used, so as protocols are enhanced, the GUI can work more efficiently without making changes to the view code. Each controller can also provide access to their underlying connection pools, to provide managed access to server connections for other tasks.

The use case for these classes can be GUI clients which use network calls which may take a long time to complete or fail, and which the user may wish to cancel. These operations can take place on separate threads so that the interface does not appear to hang to the user.

The Admin Console GUI can have panels that monitor the state of the edge server and its constituent devices. The device browser can maintain a graphical display of device status in its tree view; the display can update asynchronously, when the edge server can push new telemetry information to the console application.

When certain device nodes are selected, the device information panel can display the device's associated time-series telemetry charts. When the user can select such a node, the application can send the edge server a telemetry subscription request, and when the user deselects the node, the application can unsubscribe.

The ECSpec information panel can display an edge server's ECSpecs in a table, and update that information periodically. The ALEController can provide a subscription-like interface to this information so that the pattern of subscribing when the "ECSpecs" node is selected and unsubscribing when leaving the node parallels the device telemetry stream pattern.

In one embodiment, the design of the ALE GUI can take into account a complex set of requirements.

The GUI can manage multiple edge servers. This management can use several different APIs (ALE and Telemetry, and possibly others in the future)

For good user interaction, the GUI can never appear to block. Instead, any long-lived operation can be performed on a separate thread.

For efficient use of resources, multiple calls to the same API on the same edge server can share a single connection.

The user can be allowed to cancel operations, even though the underlying network protocol implementation does not always provide a mechanism to interrupt an operation in progress.

Some of the information needed can be subscribed to, but other information can be polled.

This design can provide an interface for a local caching model for the ALE API, one for the Telemetry API, and another for the Config API. The model can also include a listener/event mechanism so that the view can automatically updated when the model is changed. A controller can provide methods which cause periodic updates to the local model to be made which can then be acted on by listeners.

Figure 9A:
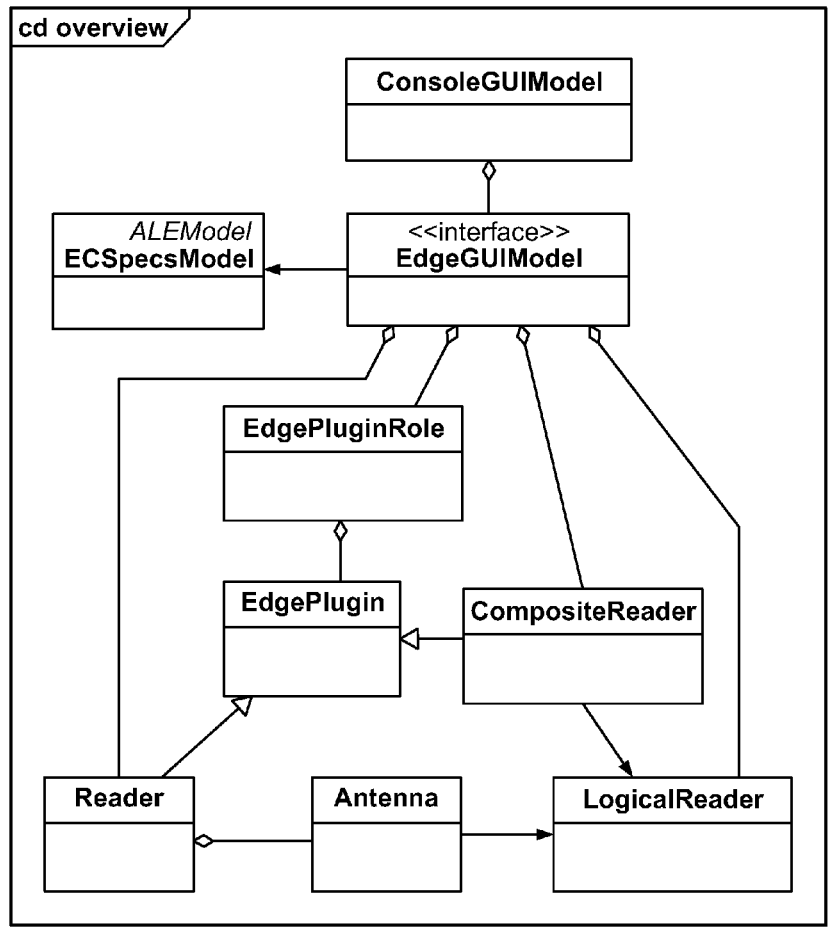
FIGS. 9A-9R illustrate an exemplary ALE GUI.

FIG. 9A shows a model exposed by this architecture is a confluence of information and operational methods into one interface that hides the underlying mechanism used to implement the requests. Information from the various edge server interfaces can be merged into this one model; the GUI does not need to know that device status information comes from the telemetry. In one embodiment, the model can hide the fact that, while the association of logical reader name to physical reader comes from the Configuration API, the capability of that logical reader—whether it can read tags, write tags, or both—can be gleaned from the ALE API.

In one embodiment, while the ConfigAPIModel exposes Readers and CompositeReaders as plugins, the EdgeGUIModel can treat these specially, hiding the reader and composite reader "roles" in favor of specific interfaces for accessing the models. Other plugin-type objects (filters and triggers) can be handled through the plugin role interface, since the admin console should be able to handle new types of objects as they are introduced underneath.

Figure 9B:
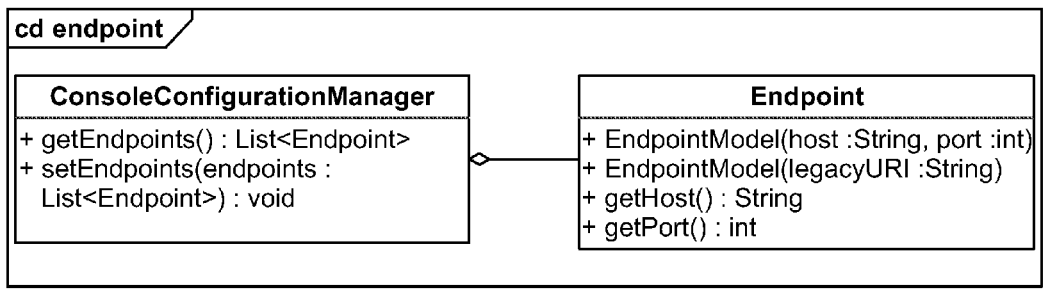

FIG. 9B shows an Endpoint model that encapsulates the information necessary to connect to an edge server. This can simply be a host and port, since the ALE, Config, and Telemetry API URI paths can all be generated from this information. The Endpoint can be constructed from a host/port combination or a string representation. The string representation can be a legacy URI, for backwards compatibility with older Admin Console configurations, or simply a host/port pair of the form "host:port". When the admin console writes the configuration back out, though, legacy URLs can be converted to the new form, "host:port". The URI-based constructor can throw an InvalidURIException, if the String is a malformed URI, or if it is not one of the expected legacy forms.

In one embodiment, the Endpoint is immutable; to change an edge server endpoint, the endpoint must be removed from the EndpointList under the old value, and re-added with the new value. This object is the key identifier for any edge server connection.

Figure 9C:
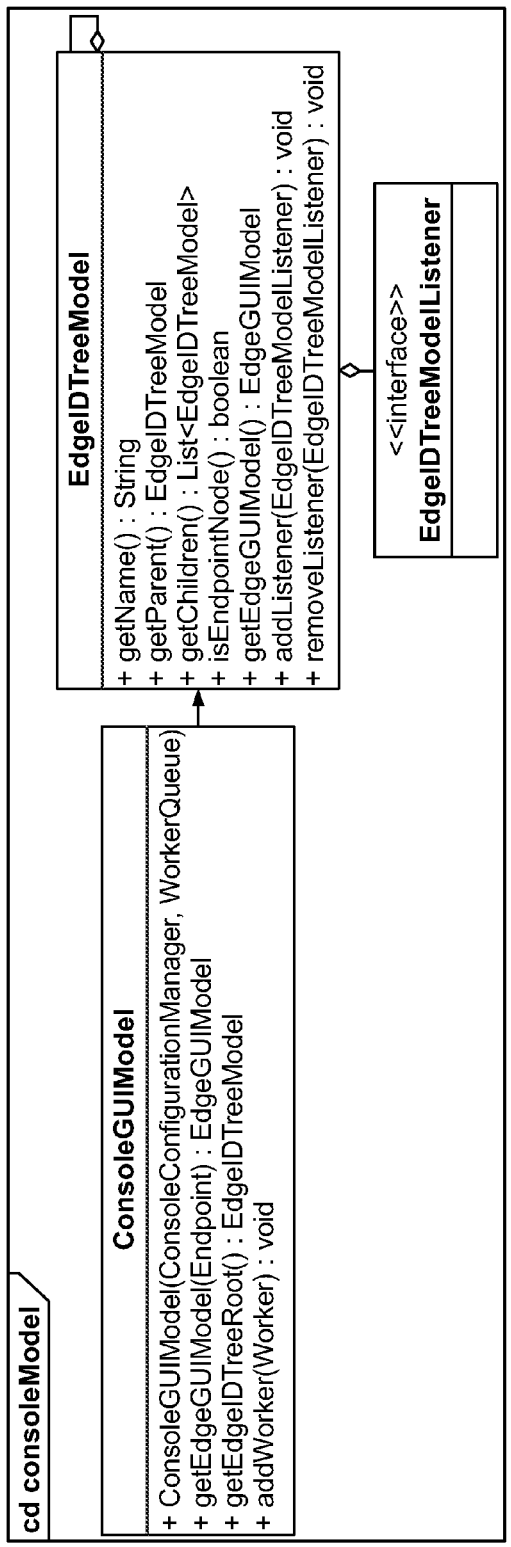

The Admin Console initialization can generate this configuration manager and passes it into ConsoleGUIModel. As shown in FIG. 9C, in one embodiment, the ConsoleGUIModel gets its list of endpoints from this object. The config manager can simply handles transfer of the list of endpoints to and from persistence.

The ConsoleGUIModel can be the top-level Model object for the Admin Console application. It can represent the tree structure of the device browser. It can also hold the ConfigurationManager passed in from the application. It can get the list of connections to edge servers from that object, and uses it to persist changes to that list.

When an Endpoint is removed from the edge server list, the ConsoleGUIModel can be responsible for making sure that the associated EdgeGUIModel disconnects from the server and that it's associated node is removed from the device tree.

The Admin Console can read the edge list configuration into a ConsoleConfigurationManager and passes that object to the ConsoleGUIModel constructor. The constructor can create a preliminary EdgeIDTreeModel tree structure with each edge server in the "Unknown" path, and create Edge-Models for each edge server. As the telemetry service returns device path information for each edge server, it can update the EdgeIDTreeModel tree structure to sort those servers into the reported device path.

The EdgeTreeModel can be a tree structure maintained by the ConsoleGUIModel. The tree structure can mirror the structure present in the device ID paths returned each Edge Server's telemetry. The following invariant can apply to this tree—any node with children is not an endpoint node, and has no associated EdgeGUIModel; all leaves are endpoint nodes that contain a reference to an EdgeGUIModel object.

Figure 9D:
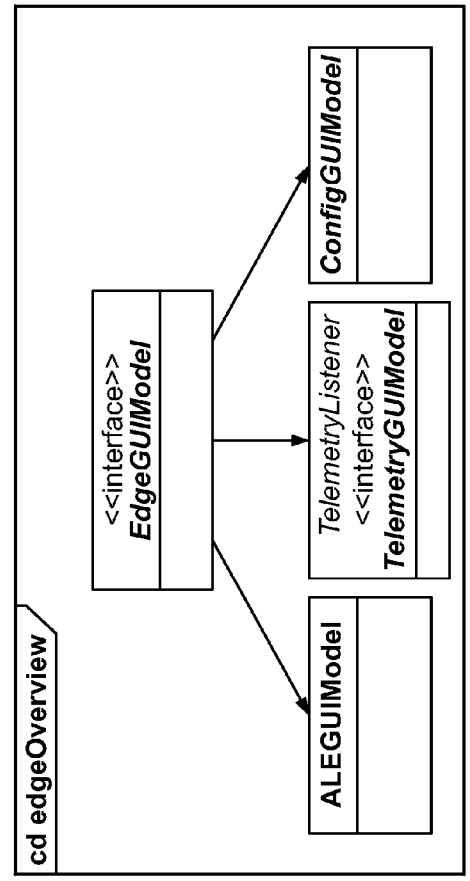
Figure 9E:
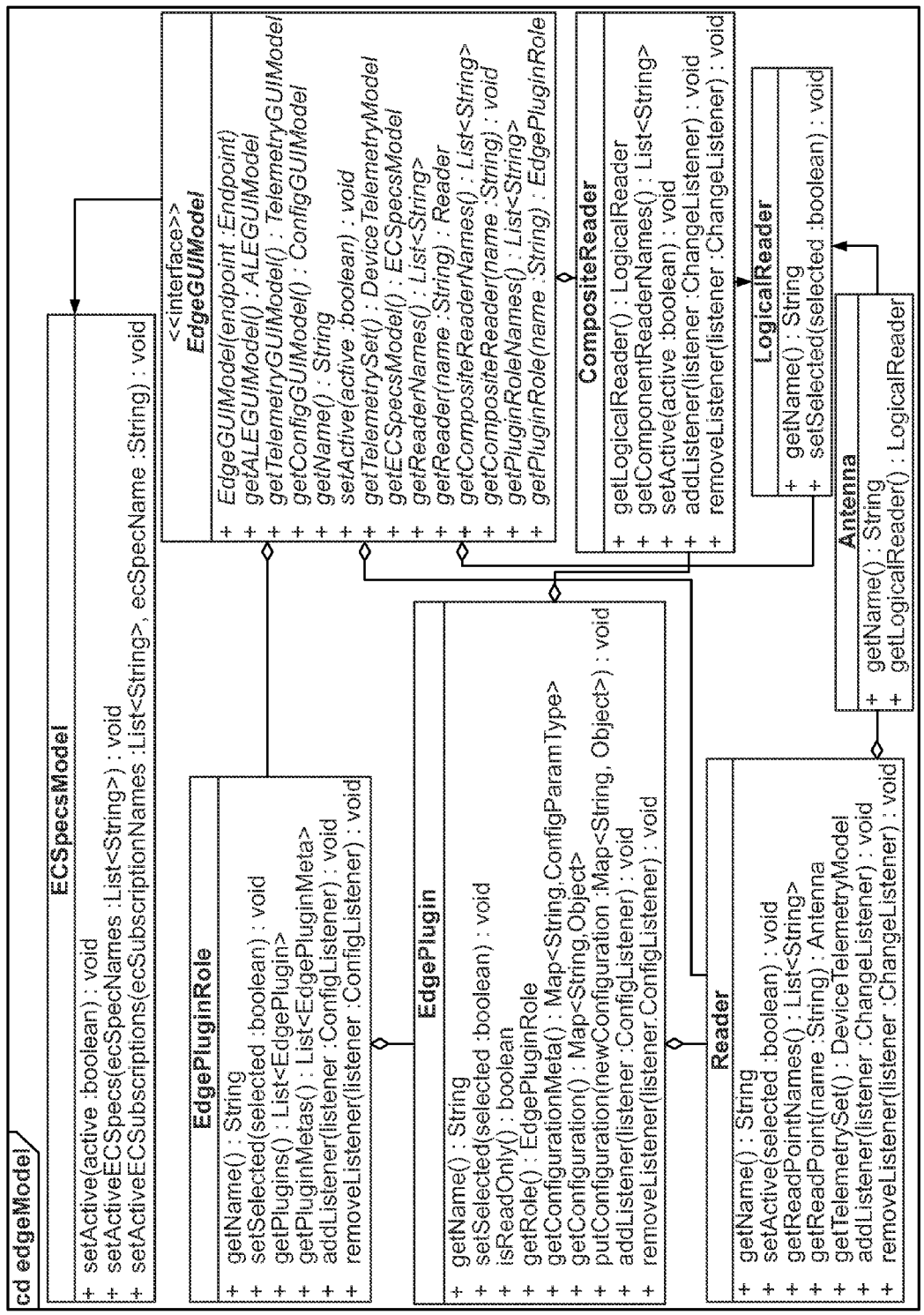

As shown in FIGS. 9D and 9E, the EdgeGUIModel can provide a subtree for the ConsoleGUIModel's device tree to include. It can also consolidate the information from the ALEGUIModel, TelemetryGUIModel, and ConfigGUIModel into one full representation.

An EdgeGUIModel can be constructed to provide access to a single edge server specified by an Endpoint object. It can create an ALEGUIModel, a TelemetryGUIModel, and a ConfigGUIModel with that endpoint and holds those objects.

When the EdgeGUIModel is in "active" mode, it can start the TelemetryGUIModel monitoring the telemetry for the associated Edge Server. The EdgeGUIModel can also expose the TelemetrySetModel that holds the edge server's "edge device" telemetry. The EdgeGUIModel can provide access to the edge server's associated devices; readers and composite readers bypass the generic "role" mechanism provided to parallel the ConfigAPI, but other devices can be referenced first by their role on the edge server. Readers can be instead accessed through the getReaderNames/getReader interface, since these devices have meaning even to an edge server that does not support the Config API. Composite Readers can be the same.

EdgePluginRole can represent a type of configurable device the Edge Server exposes via the Configuration API. This can simply provide read-only access to filters, per the limitations of the Configuration API. Readers and composite readers can bypass this mechanism, accessed through specific APIs on the EdgeGUIModel; the "reader" and "composite reader" roles can be kept hidden at this layer.

The EdgePlugin can represent a configurable device exposed by the server's Configuration API. The getConfigurationMeta( ) method can return the Config API's native PluginMeta object for the associated PluginDevice's Plugin. This dependency on the ConfigAPI can be useful because the parameter information structure is complex; it may be useful for these classes to be moved into a more shared component in the future.

A Reader can represent a Physical Reader device on the edge server. The device can have configuration information (with accessors inherited from the EdgePlugin object) and a TelemetrySet associated with it. It can also have ReadPoints associated with it, each of which has a Logical Reader.

Figure 9F:
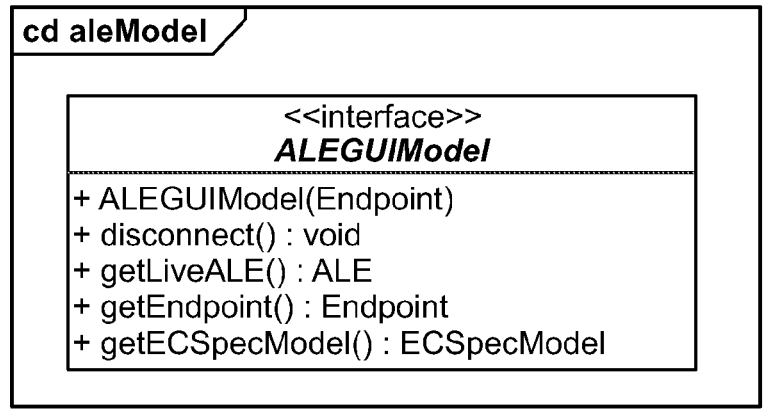

As shown in FIG. 9F, in one embodiment, the ALEGUI-Model can expose a more UI-centric interface to the information in the ALEController and ALEModel. It can provide direct access to the underlying caching ALEModel and the ECSpecModel. The class can also provide direct access to the ALEController's "Live ALE" object—this object is a wrapper around the ALE interface that automatically checks out a connection, makes the requested call, and then checks the connection back in.

Figure 9G:
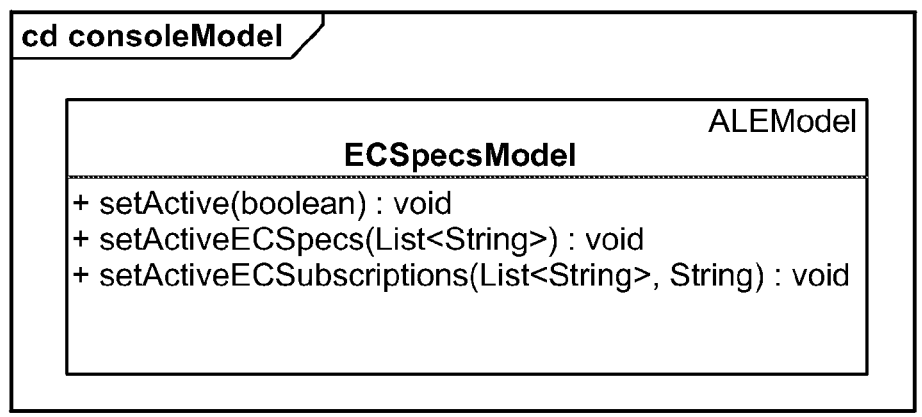

As shown in FIG. 9G, in one embodiment, the ECSpecs-Model can be a thin extension over the ALEModel (which itself implements the ALE interface to provide cached information). The Admin Console can inform the ECSpecsModel which ECSpecs are "active"—active ECSpecs can have their ECSpecInfo periodically polled and updated in the ECSpecsModel. Similarly, the ALEGUIModel can maintain information on which ECSubscriptions are active.

Figure 9H:
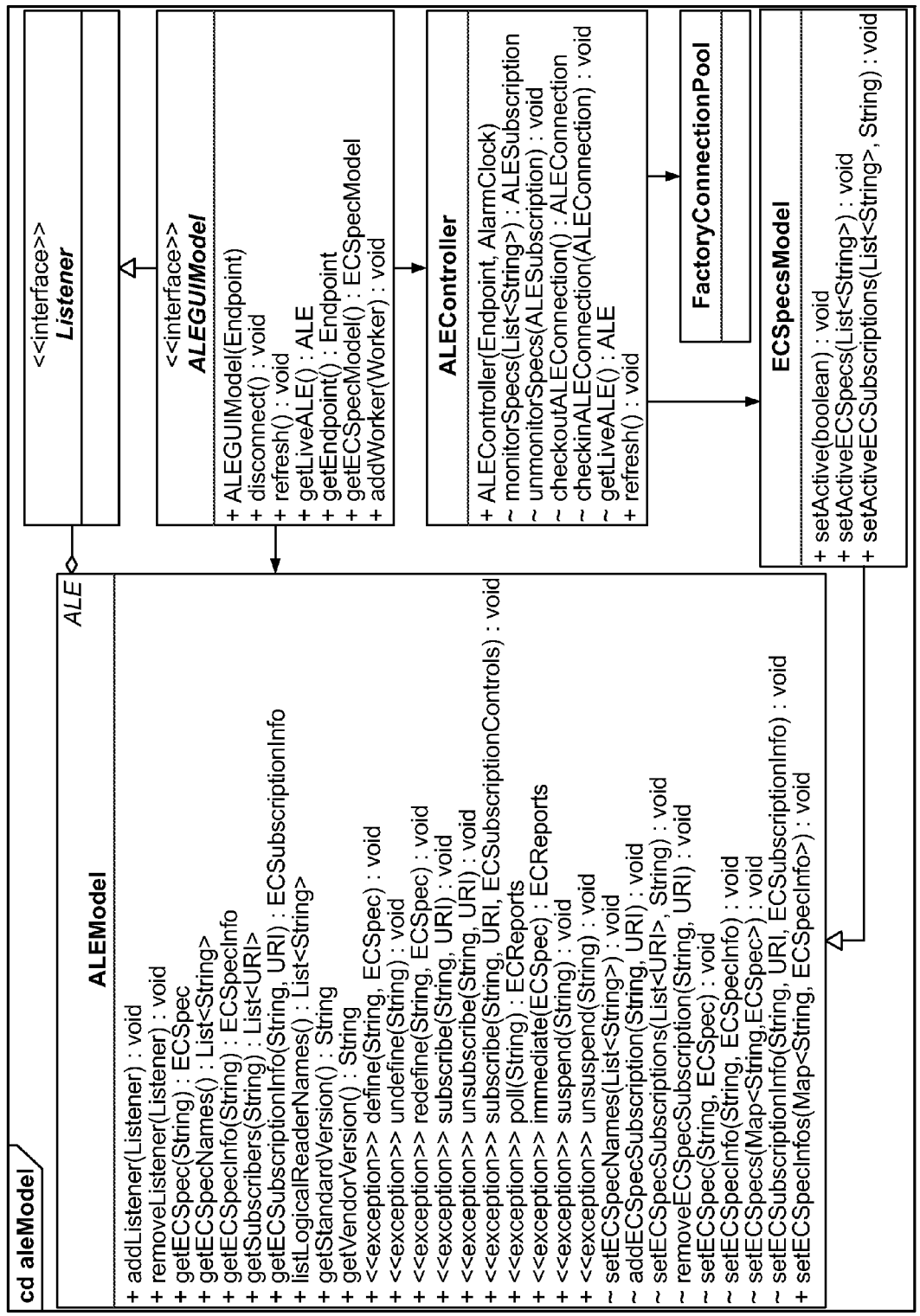

As shown in FIG. 9H, the model/controller abstraction over the ALE API is multi-layered, adding a distinct set of new function at each level. The lowest level, the Connection Pool can enable server connection sharing. The FactoryConnectionPool can use an AxisALEConnectionFactory to create a simple Axis-based connection to the Edge Server's ALE service and wraps that ALE object in a layer that detects exceptions that are related to the connection to the server. If the connection goes down, that wrapper can mark the associated connection object "suspect." Then when the connection is checked back into the connection pool, the pool knows to remove it. The next level can consist of two classes, the ALEController and the ALEModel. The ALEController can wrap the Connection's ALE object—the ALEController's wrapper maintains the link between data seen over the ALE connection and the cached information in the ALEModel. The ALEController can also have a polling thread that watches for changes in edge server's ECSpecs. Operations on ALEModel can always refer to the cache and never block on network traffic. The ALEModel can implement certain package-private setter methods for use by the ALEController's ALE wrapper. ALEModel can call to define, undefine, redefine, poll, or immediate result in an IllegalOperationException. The ECSpecModel can be a thin layer over ALEModel that provides a connection back to the ALEConnection's polling mechanism.

Figure 9I:
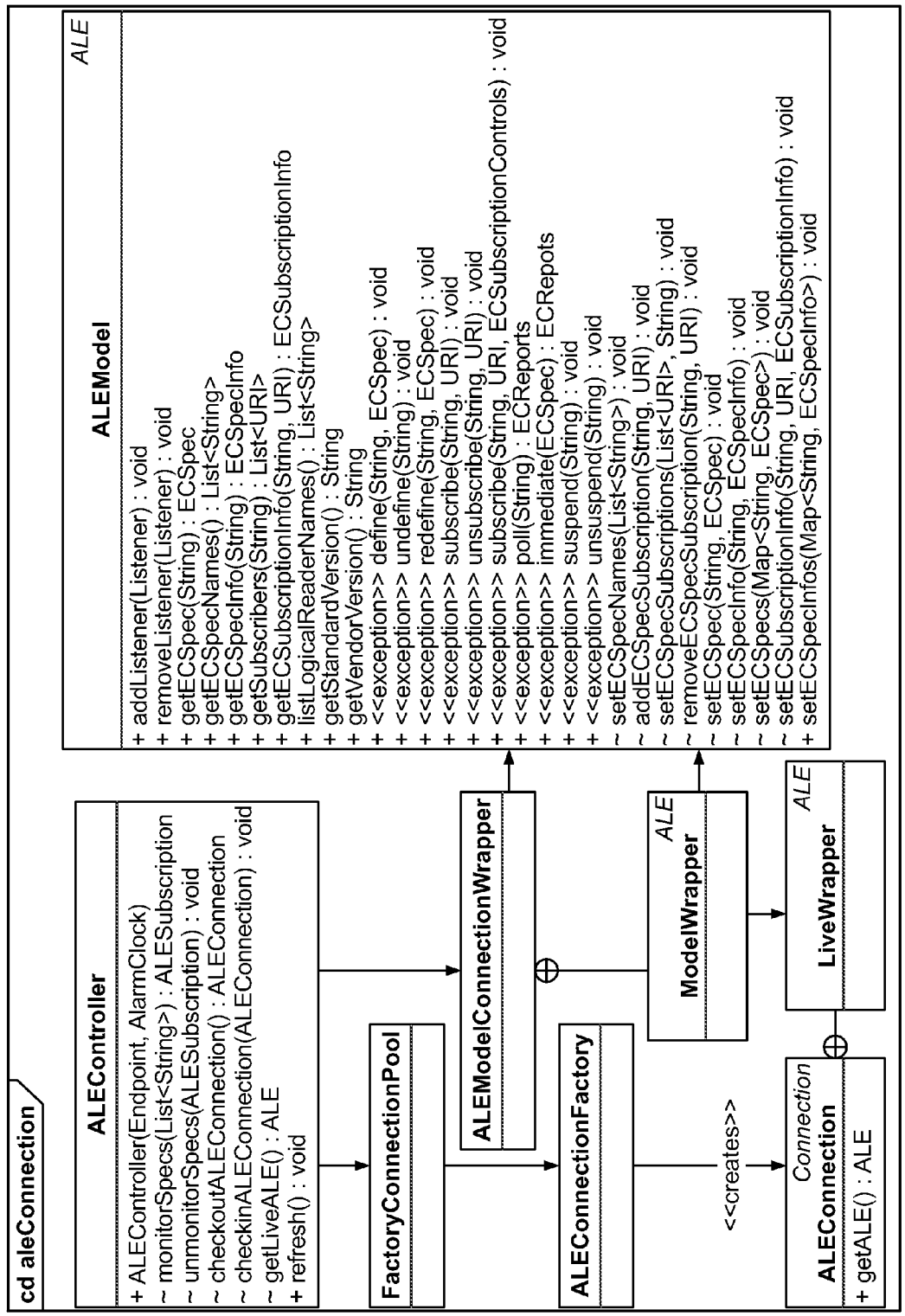

As shown in FIG. 9I, in one embodiment, the next level is the ALEGUIModel, which combines the ALEController and ALEModel into one interface. It can expose the ALEController's live ALE connection, the Worker Queue, and the ECSpecModel.

This class can implement methods for requesting updates to ECSpecs or ECSubscriptions on an edge server. This can be implemented with a polling thread. If the ALE API can be enhanced or a ConnecTerra-private API is developed in the future to support a subscription mechanism for changes in this data, the implementation can be updated to take advantage of that. The ALEController can use the AlarmClock mechanism from the ConnecTerra Util component to perform this periodic polling.

The ALEController can also provide a "Live ALE" object which implements the ALE API by wrapping calls with checkout and checkin operations to the ALE Connection pool. This can be useful for callers to perform specific ALE operations, such as creating or deleting ECSpecs, within the ALEController's connection management framework.

The ALEConnectionFactory instance can return AxisALEClient instances directly or the AxisALEClient object can be wrapped in another class which implements the ALE interface. For each method in the ALE interface which can alter the model, this wrapper class can update the model, perhaps issuing additional ALE method calls if the arguments and return value are insufficient to understand the model changes. In this way, changes made as a result of user calls can be automatically updated in the model, and if appropriate listeners are in place, the view as well. Additionally, exceptions that indicate an error with the connection can label the associated ALEConnection object as suspect, causing the ConnectionPool to discard the connection and attempt to generate a new one. The ALEController can use the FactoryConnectionPool to adapt this factory class into a connection pool.

Operations on ALEModel can refer to the cache and never block on network traffic. The ALEModel can implement certain package-private setter methods for use by the ALEController's ALE wrapper. ALEModel calls to define, undefine, redefine, poll, or immediate can result in an IllegalOperationException. The ALEModel object can store the local cached data for all the edge servers which the system is monitoring. There can be methods for adding and removing listeners which receive events whenever the model changes. There can be getter methods for the view to query the model in order to build UI objects. And, there can be setter methods which are used by the controller to update the model, either as a result of a subscription or poll operation, or by the ALE instance wrapper. The ECSpecModel can be a thin layer over ALEModel that provides a connection back to the ALEConnection's polling mechanism.

Figure 9J:
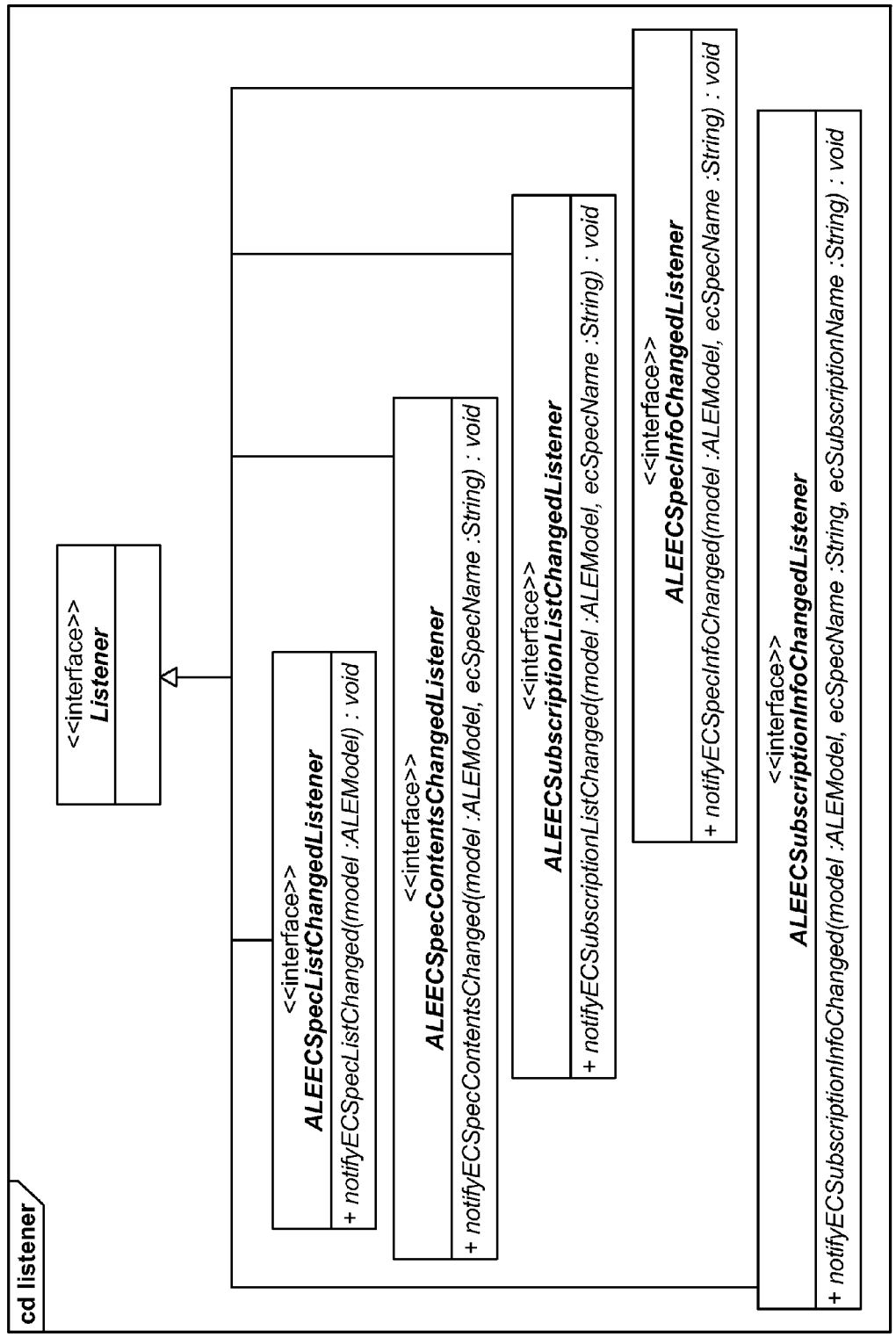

As shown in FIG. 9J, in one embodiment, these listener interfaces can monitor the ALEModel and ECSpecsModel for changes. Each leaf of the tree can listen for a specific type of change. When the listener is added to a model object, the model can maintain list of differentiated listener interfaces, and adds the listener to each list that matches that type. That way, an object can implement as many or as few of these interfaces as it wishes, but it only has to get passed into the model addListener call once to be added to all the relevant internal lists.

Figure 9K:
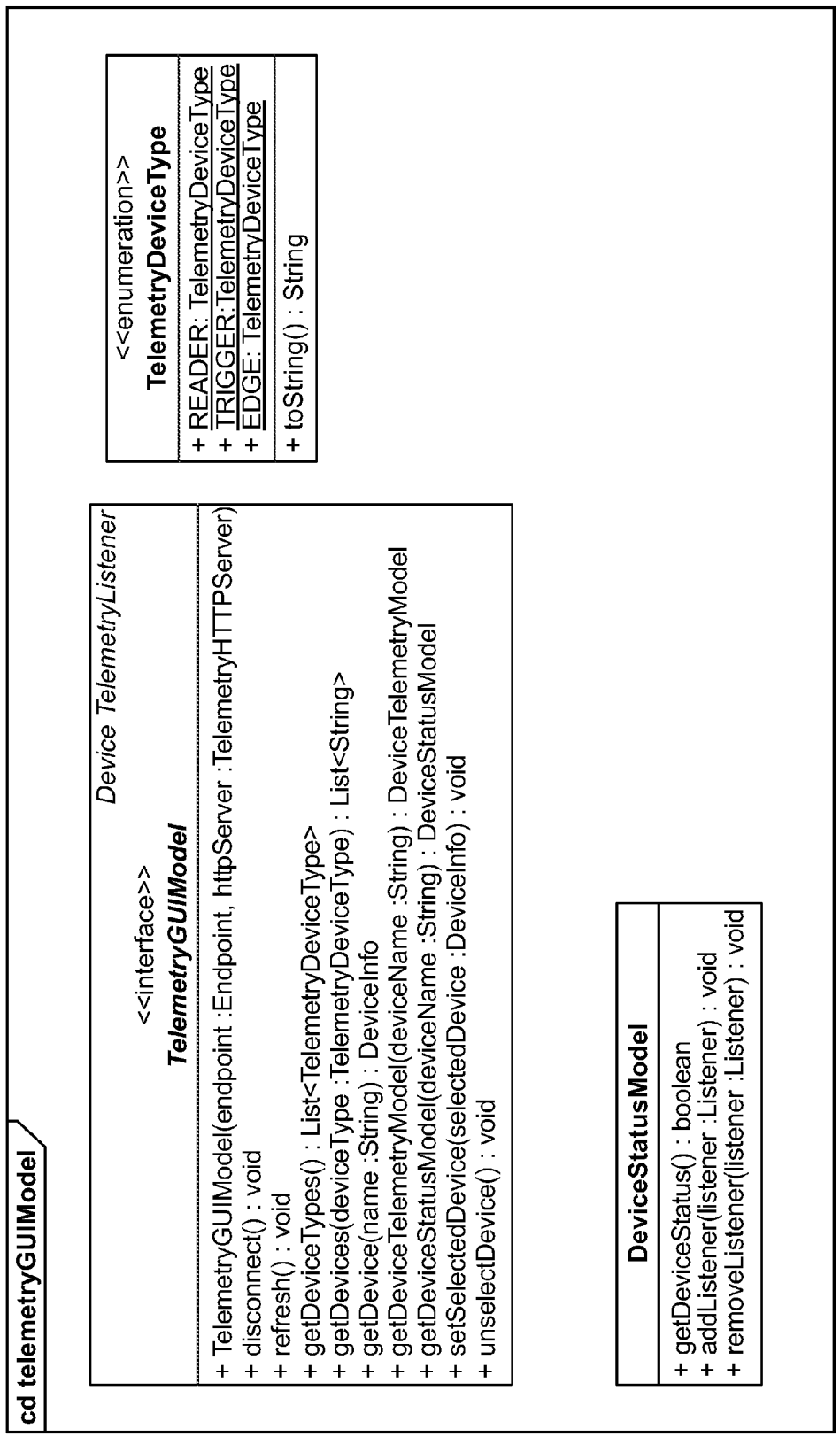

As shown in FIG. 9K, the TelemetryGUIModel can expose a GUI-specific representation of the telemetry for a given Edge Server. It can list the device types, and the devices in each type. It can also provide a DeviceTelemetryModel for each device, combining all the telemetry data (alerts, time-series, and attributes) into one object. In one embodiment, only the selected device can have a subscription to telemetry data. The TelemetryGUIModel can subscribe to device status information for all devices, however, and the returned DeviceStatusModel for each device maintains its state based on that. In one embodiment, when the TelemetryGUIModel is disconnected, associated DeviceStatusModels can stop updating.

Figure 9L:
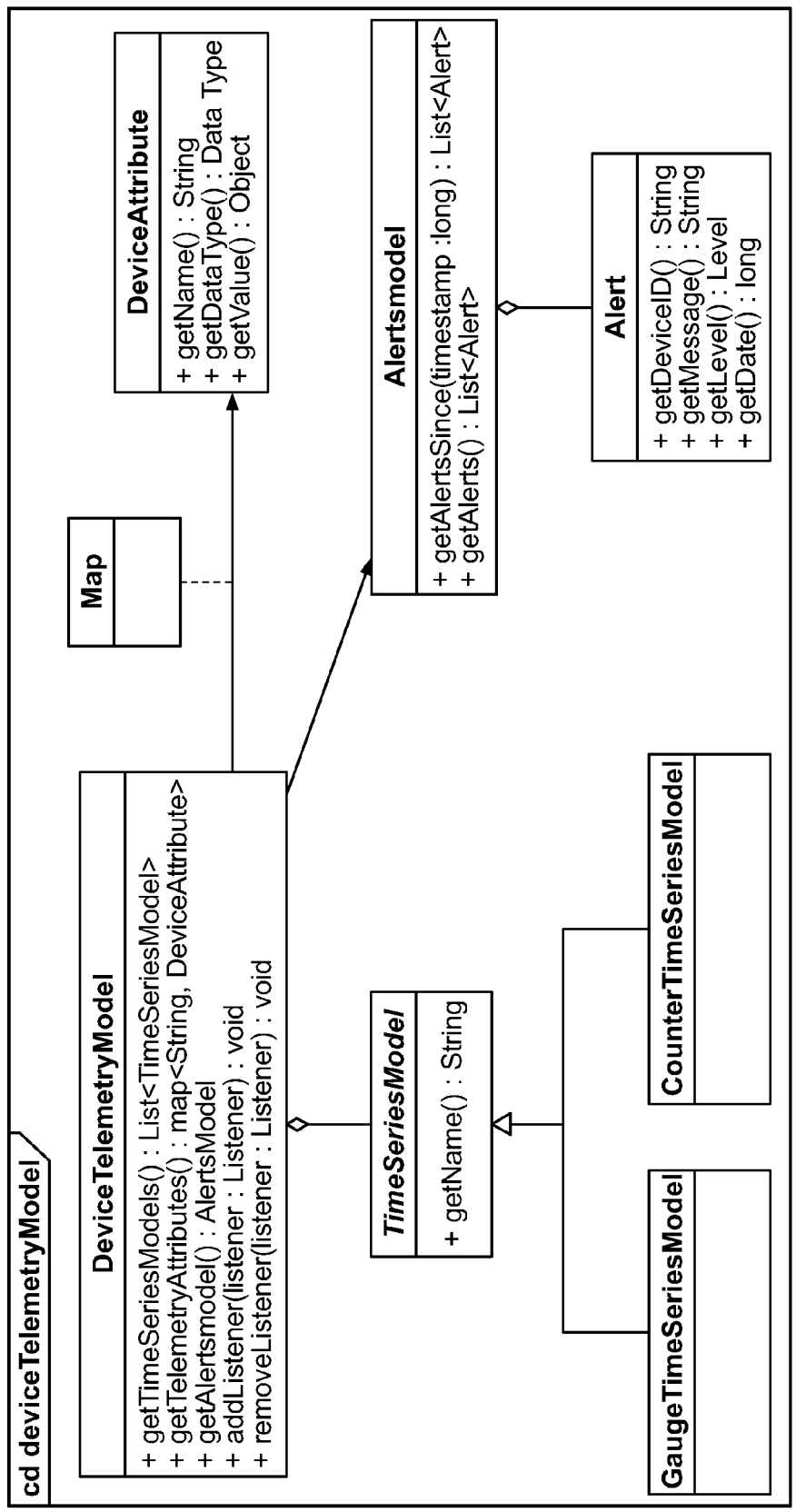

As shown in FIG. 9L, the Device TelemetryModel can represent the information the Edge telemetry provides for any given device. Alert and DeviceAttribute Alert and DeviceAttribute can be objects that implement the interfaces from the Telemetry API.

Figure 9M:
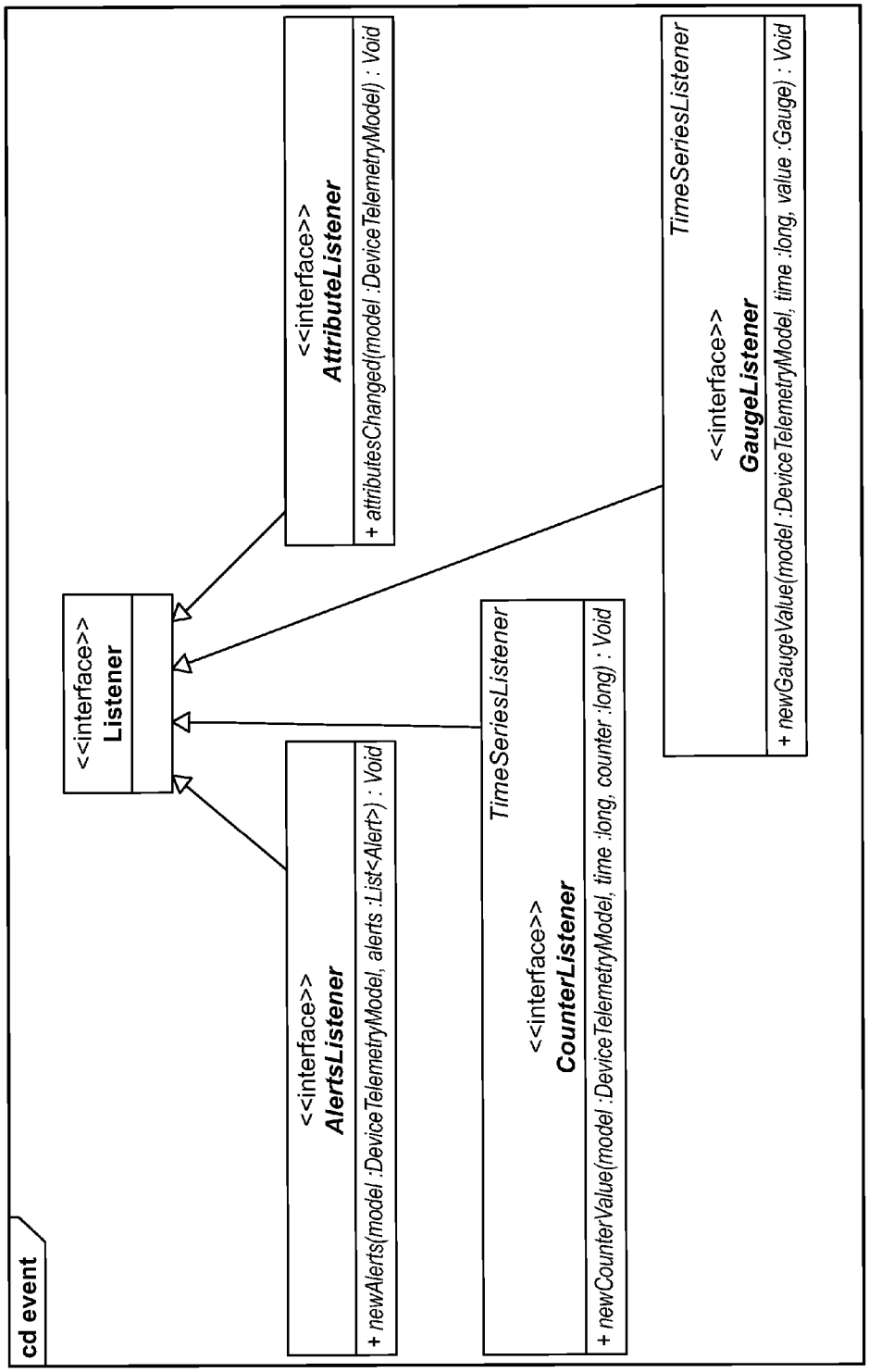
Figure 9N:
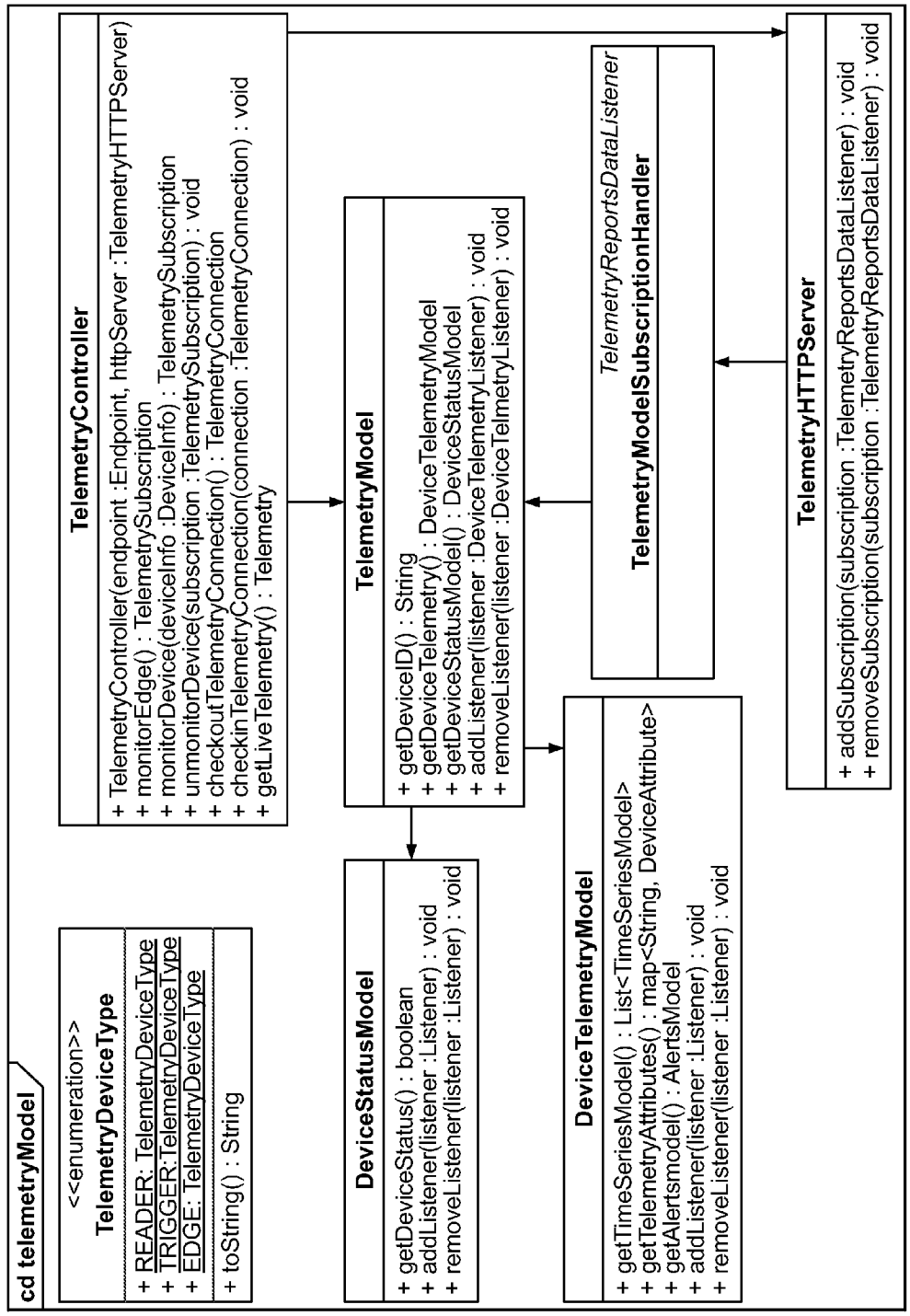
Figure 9O:
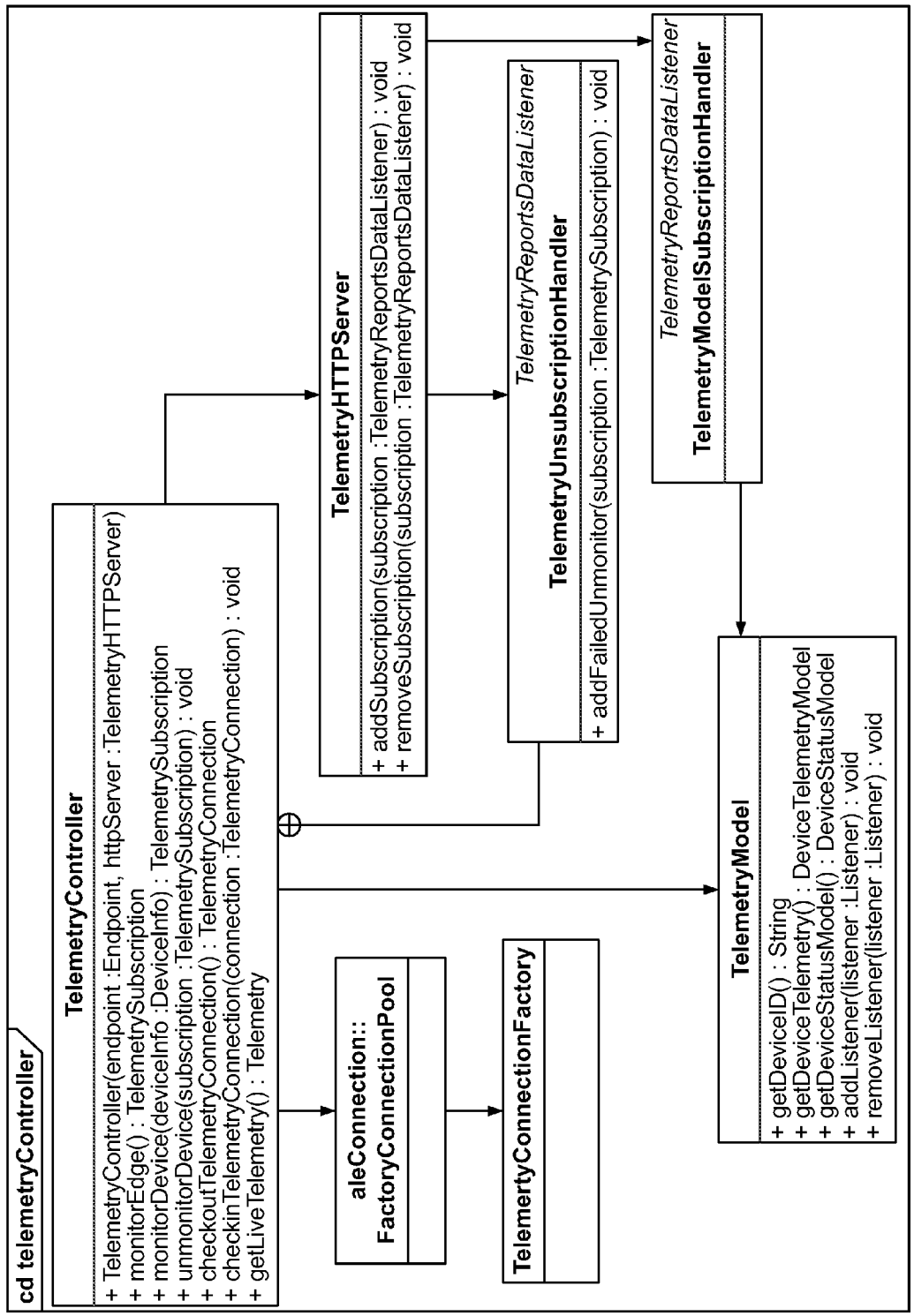

As shown in FIG. 9M, the TelemetrySetListener can be a listener for the DeviceTelemetryModel. The DeviceTelemetryListener can follow the ALEListener pattern with the specific list of interfaces the listener implements being used to dispatch the appropriate As shown in FIGS. 9N and 9O, in one embodiment, the Telemetry API can abstracted in a similar way as the ALE API, with succeeding layers adding new functionality to the underlying layer.

It can implement methods for monitoring device telemetry, which are implemented by subscribing and unsubscribing to TelemetrySpecs. This permits the admin console to subscribe just to the telemetry needed to update whatever UT objects are visible to the user. It also can include methods for checking a Telemetry connection object out of the connection pool, and checking it back in when done. Additionally, the TelemetryController can keep track of failed unsubscription attempts; if telemetry associated with a terminated subscription arrives, it can assume the connection has been reestablished, and it attempts to resend the unsubscribe request.

In one embodiment, when the TelemetryController attempts to unsubscribe to a telemetry stream and fails for some transient reason, it does not expose that failure to its callers. Instead, it can pass information about the failed subscription to its contained TelemetryModelUnsubscriptionHandler object. This object can subscribe to telemetry information from the HTTP server, and when it recognizes data associated with a failed unsubscription, it can attempt again to unsubscribe from that telemetry stream. A race condition could arise if the UI attempts to subscribe to a stream that has, during a previous interaction, had a failed unsubscription attempt. In this situation the TelemetryUnsubscriptionListener could potentially unsubscribe shortly after the new subscription is established. To avoid this, the TelemetryController can inform the TelemetryUnsubscriptionListener of new subscription requests before making the subscription request. The TelemetryUnsubscriptionListener can detect a match in its list of failed unsubscriptions and remove matching entries from its list. The Worker Queue mechanism can be used to serialize these requests, making sure the removal from the Handler's list completes before the new subscription is attempted.

Figure 9P:
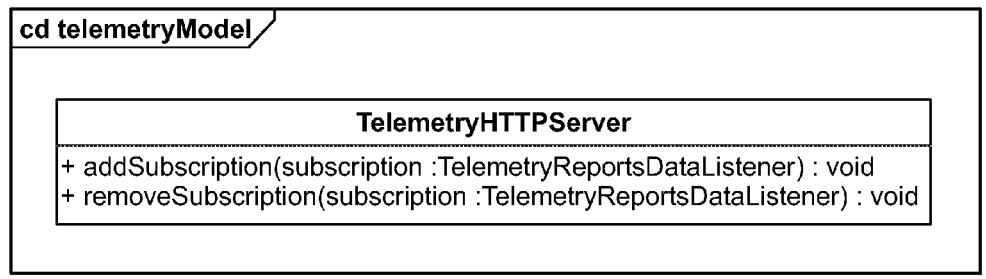

As shown in FIG. 9P, in one embodiment, the TelemetryHTTPServer can be an HTTP server thread that receives Telemetry streams from Edge Servers, converts the received XML data into TelemetryReports objects (from the TelemetryAPI component) and passes them on to listeners. In one embodiment, the TelemetryModel and the TelemetryUnsubscriptionListener are the only two objects that will listen to the streams at this level of abstraction.

Figure 9R:
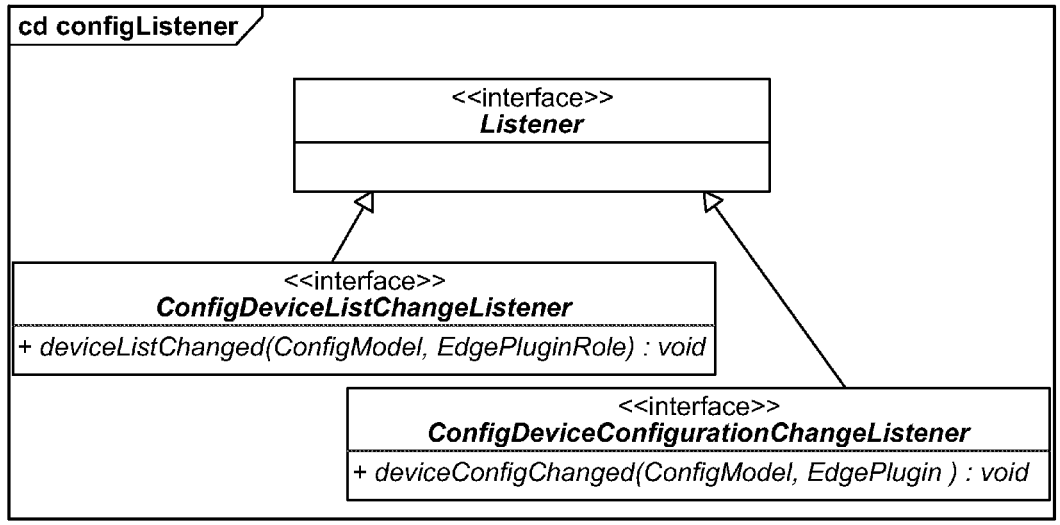
Figure 9Q:
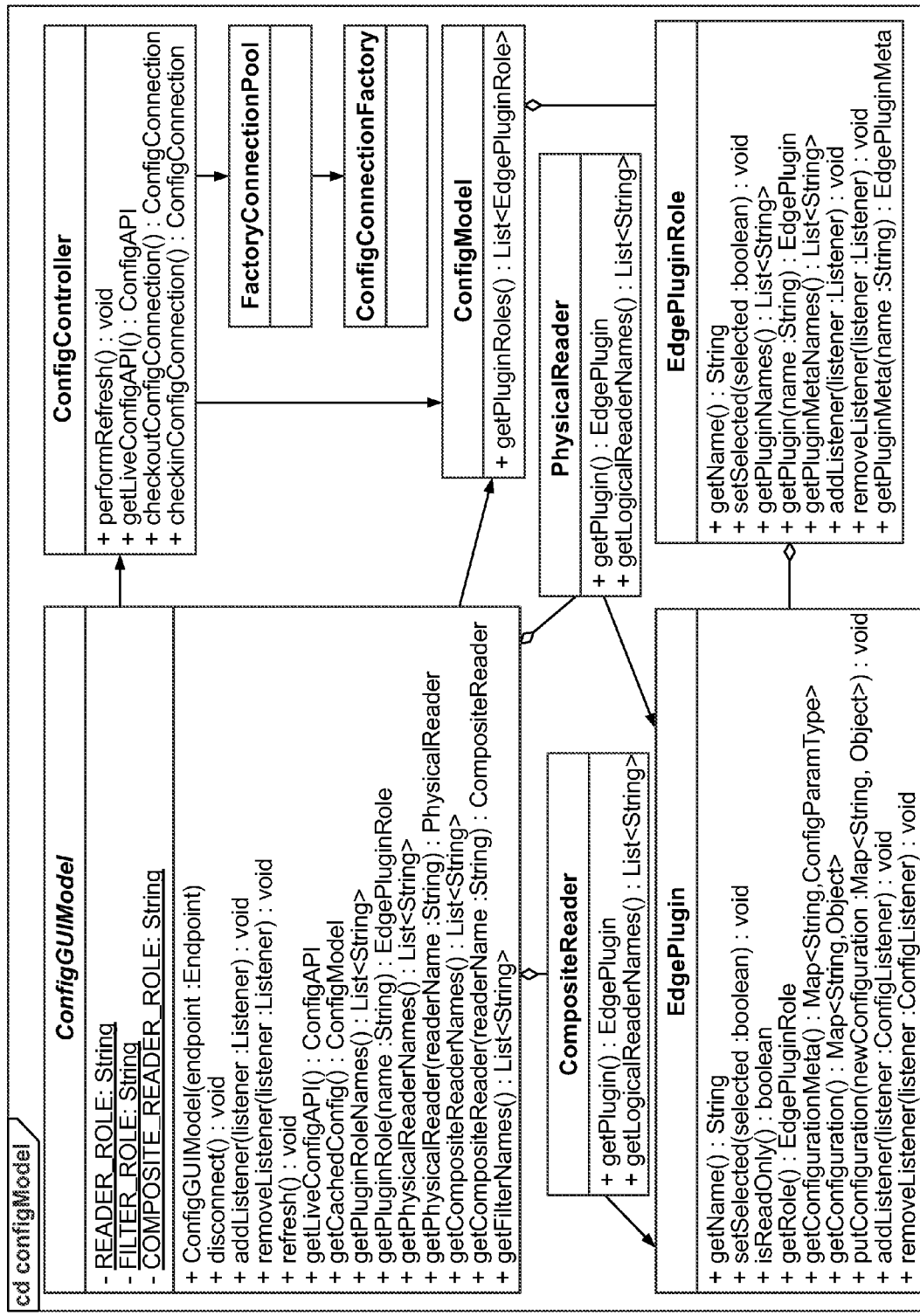

As shown in FIG. 9Q, in one embodiment, the ConfigGUIModel can hide the Reader and Composite Reader roles from the Config Model and exposes the reader devices through a specific interface. This can parallel the fact that the GUI will treat these devices specially, and the plugin interface exposed out of this layer can be used in a generic fashion to display the rest of the configurable objects. PhysicalReader can wrap a reader-type EdgePlugin. It can implement the getLogicalReaderNames call by going through the configuration for the reader and assuming all parameters of type "logical reader name" represent a logical reader defined by this physical reader.

PhysicalReader can wrap a composite reader-type EdgePlugin. It can understand the configuration specifics of the composite reader and exports a specific interface for that configuration task. The ConfigModel can be a cache for all of the configuration on an Edge Server. The ConfigController can be responsible for keeping the ConfigModel up to date. A refresh can be triggered manually at the GUI level, though this may easily be extended to involve the AlarmClock with a polling interval, as in the ALEController. It can depend on the use case; the configuration is not expected to change often.

As shown in FIG. 9R, ConfigListener can follow the pattern established by ALEListener and TelemetryListener. Additional specific change listeners can be added as they are needed.

Figure 10:
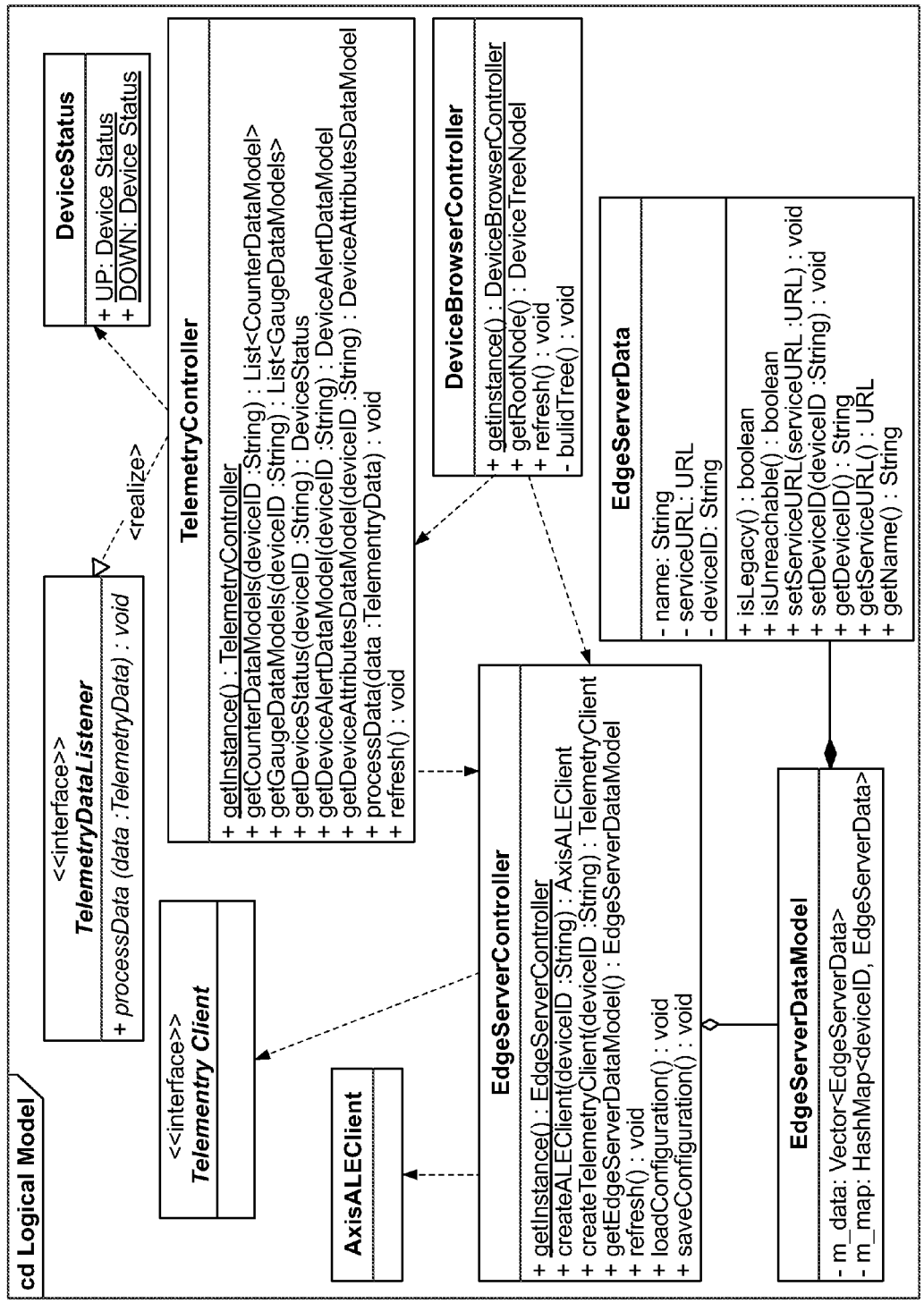
FIG. 10 illustrates an exemplary ALE GUI logic model.

FIG. 10 shows an exemplary logical model. The TelemetryController can coordinate all monitoring data (counters, gauges, subscription status, last activated counts, etc.) coming from the edgeserver. (Note that some of the data comes from traditional telemetry methods, and other parts of it come from ALE APIs). Whether the actual data is pulled or pushed doesn't matter, it can be stored and retrieved by this controller by mapping telemetry data items to deviceID. In one embodiment, get operations may be implemented differently—pull operations would be executed when gets are called, whereas push operations would retrieve stored data as it comes in from the edgeserver. The end result however, is that the rest of the GUI application does not need to distinguish between push/pull modes, which will make it easy to change these modes for various data as desired in the future. Models can be thread safe since they will be accessed/modified from various threads, including the main dispatch thread.

The EdgeServerController can maintain the configuration data for edgeservers, as well as maintaining a mapping of deviceID to various EdgeServer client interfaces. Since the rest of the GUI application speaks of selectable devices in terms of their "deviceID", they may ask the EdgeServerController for AxisALEClient interfaces or TelemetryClient interfaces by "deviceID" instead of having to ask for the service URL. AxisALEClient can be used rather than the more general ALEClient or ALE because access to the underlying factory methods is necessary for much of the construction work required of things like the ECSpec frame, etc.

The DeviceBrowserController can take care of building and maintaining the main tree control for the application. It can use the EdgeServerController to iterate all the configured Edgeservers and list devices/specs/subscribers. It also can use the TelemetryController to detect changes in device status.

Tasks that may take a long time are typically tasks using the EdgeServer in some way. In one embodiment, these tasks may be initiated in the following contexts:

the task needs to execute synchronously—i.e. other user action is not allowed to occur, however wait_cursor is updated during this task over the affected frames.

the task may execute asynchronously—i.e. the user can browse other items while this task is completing. Visual feedback that an action is being processed can be given in the form of a progress dialog.

Examples of Tasks 1. populating the device browser tree—(asynchronous trickle—user should be able to select while other parts of tree are loading rather than have to wait for the entire tree to load at once and on every update.) By and large this can be handled in the implementation of TelemetryController, which will spawn a worker thread for interrogating pull data, and have separate listener threads for receiving push data.
2. populating monitor data (ecspec monitor, subscribers monitor, etc)—again can be handled by telemetryController.
3. edit, deploy, activate once, test—any of these operations can open a progress dialog. They all can have well known end states: the progress dialog closes and
   a. edit—the ECSpec or ECSubscriber edit frame opens. (on success only)
   b. commit the ECSubscriber—ECSubscriber edit frame closes. (on success only)
   c. deploy—the ECSpec edit frame closes. (on success only)
   d. activate once—the TextView frame opens with the ECReport (success only)
   e. test—the TextView frame opens with the ECReport (success only)

Figure 11A:
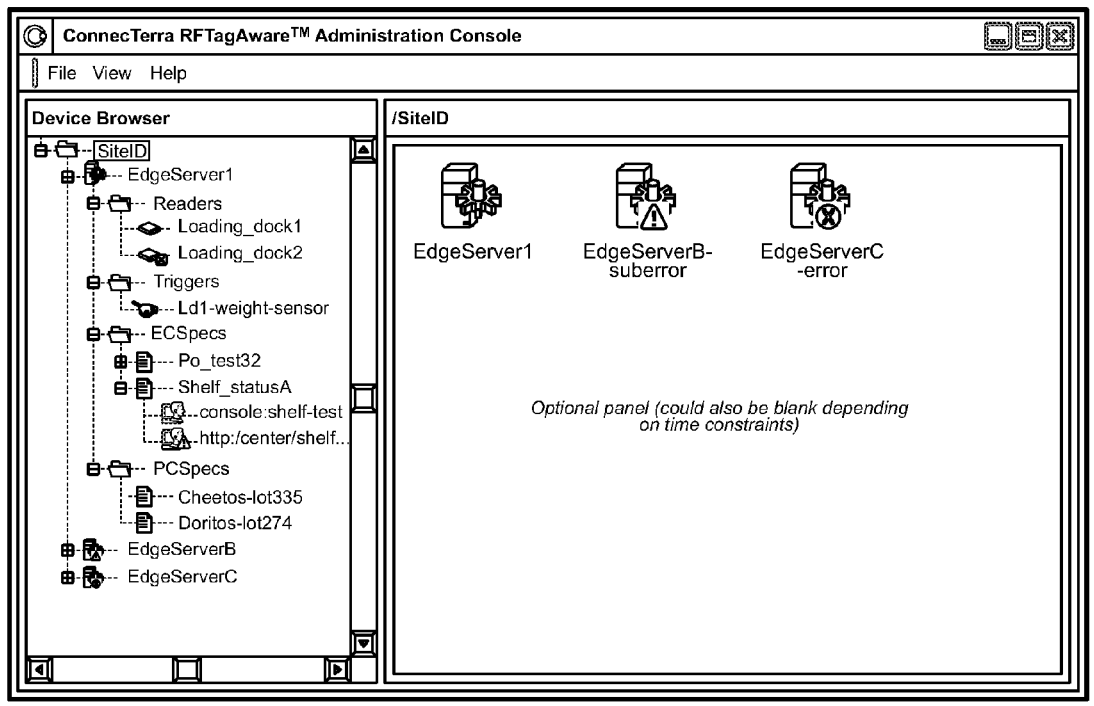
FIGS. 11A-11S illustrate an exemplary ALE GUI.
Figure 11A:
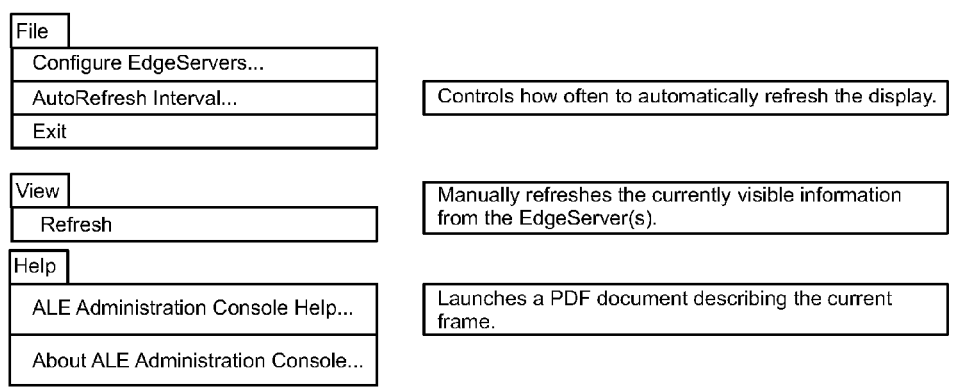

FIG. 11A shown an example of site ID selection of one embodiment.

FIG. 11B illustrates the configuration edge server and preferences of one embodiment.

Figure 11C:
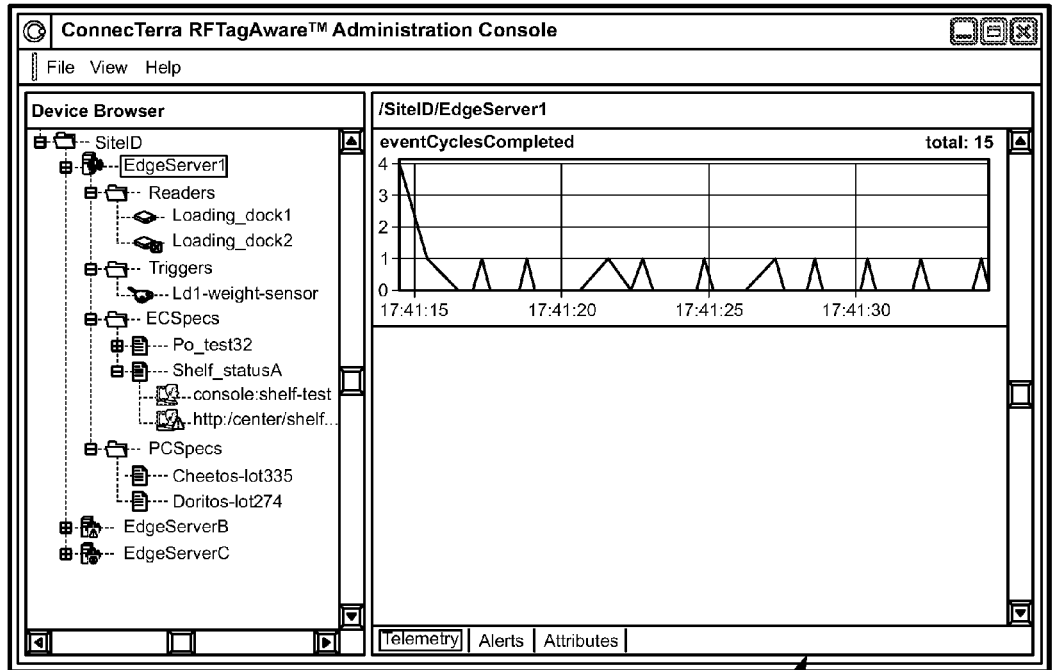

FIG. 11C illustrates telemetry selection of one embodiment.

Figure 11D:
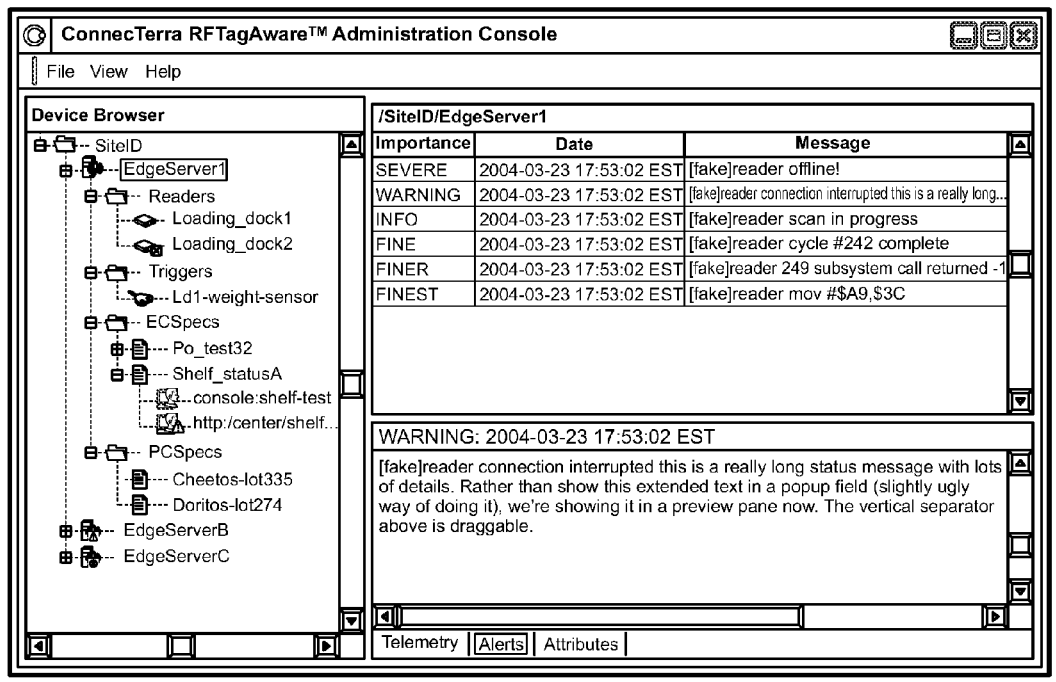

FIG. 11D illustrates alert selection of one embodiment.

Figure 11E:
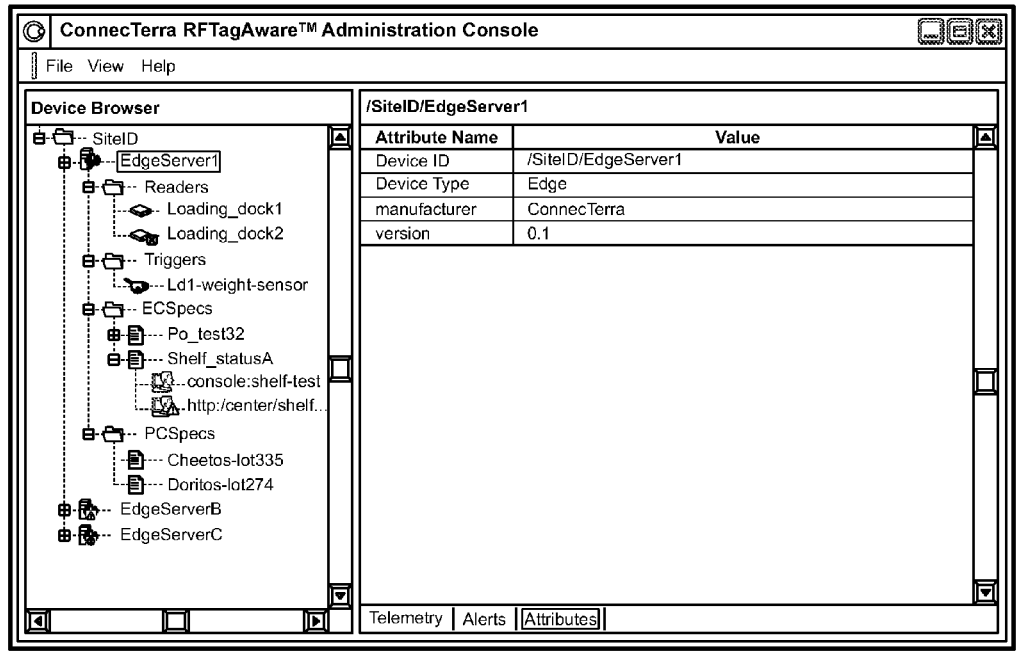

FIG. 11E illustrates attribute selection of one embodiment.

Figure 11F:
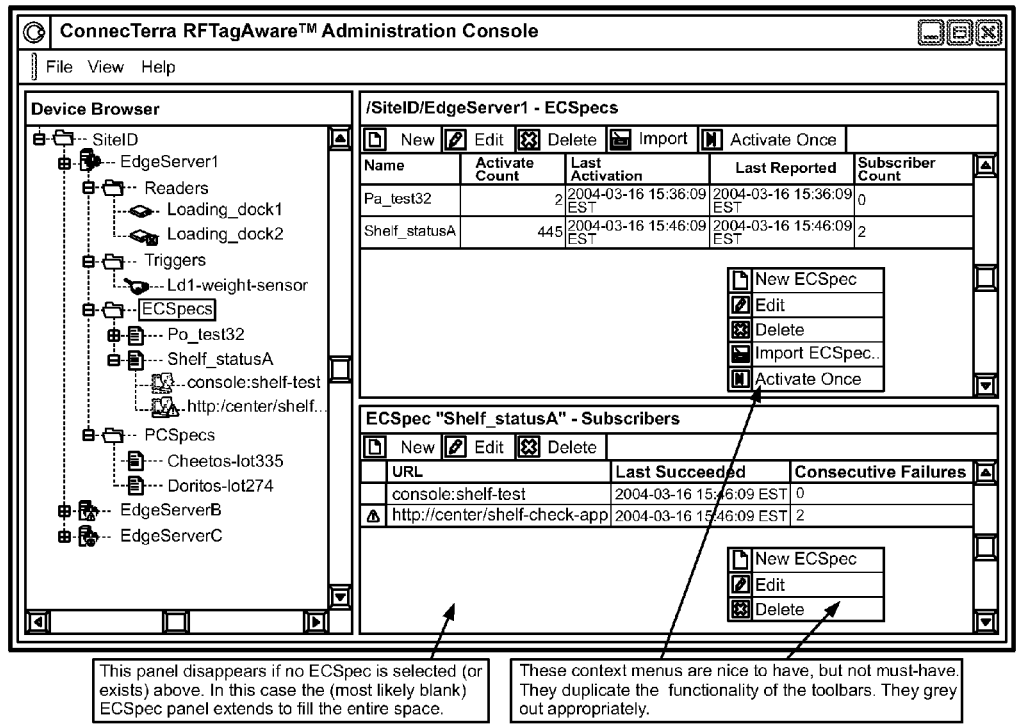

FIG. 11F illustrates monitor selection of one embodiment.

Figure 11G:
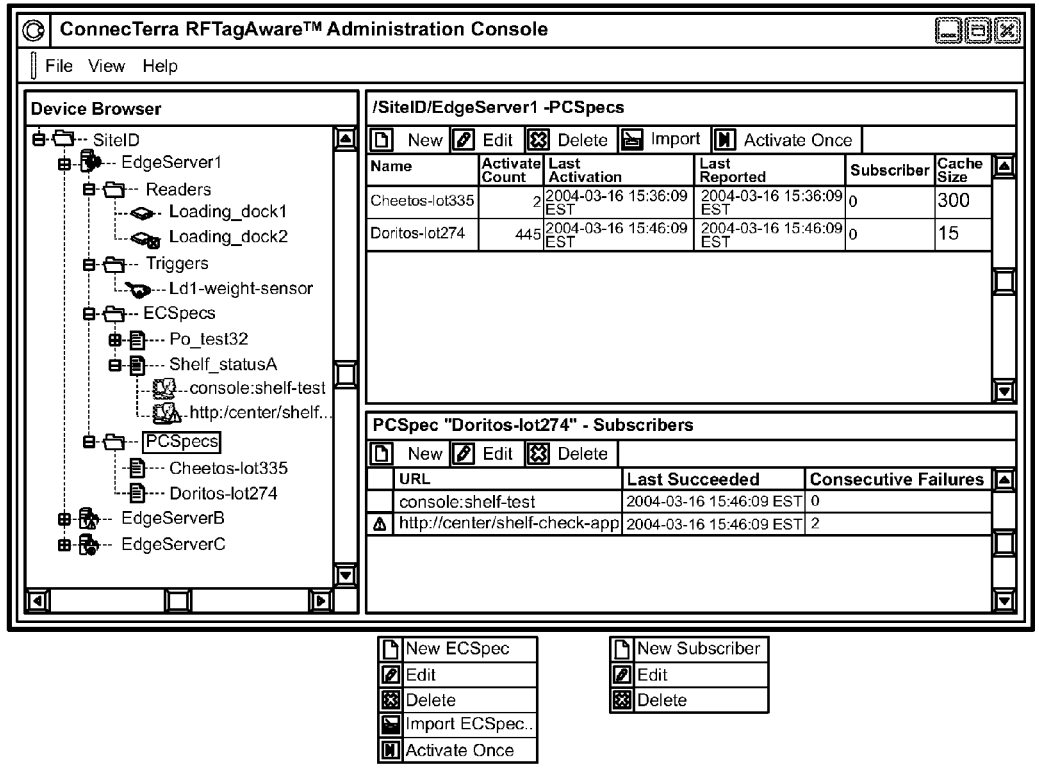

FIG. 11G illustrates PC specs folder selection of one embodiment.

Figure 11H:
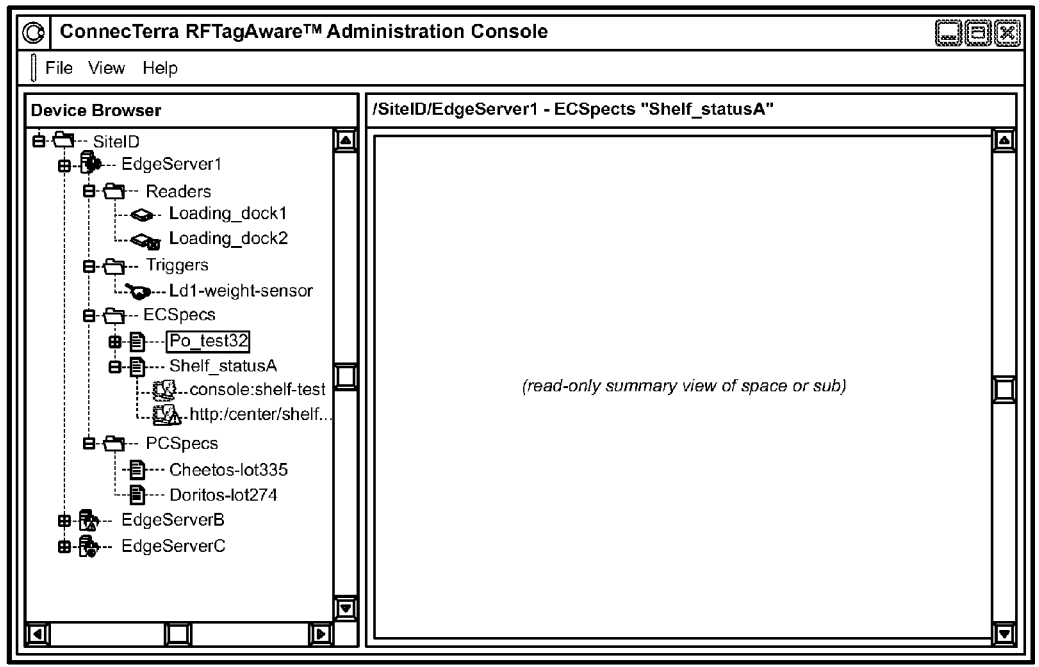

FIG. 11H illustrates EPCSpce selection of one embodiment.

The read-only view of a ecspec can display the collapsed view for every leaf node, and can expand every non-leaf node. Collapsed leaf nodes can display the full content of information summarized. No nodes can be collapsed or expanded in read-only mode—they are a fixed presentation. Any editable fields can be locked during read-only mode. A fall-back alternative to this kind of display is to use a text-view representation of the ECSPec and just make this a text control.

Figure 11I:
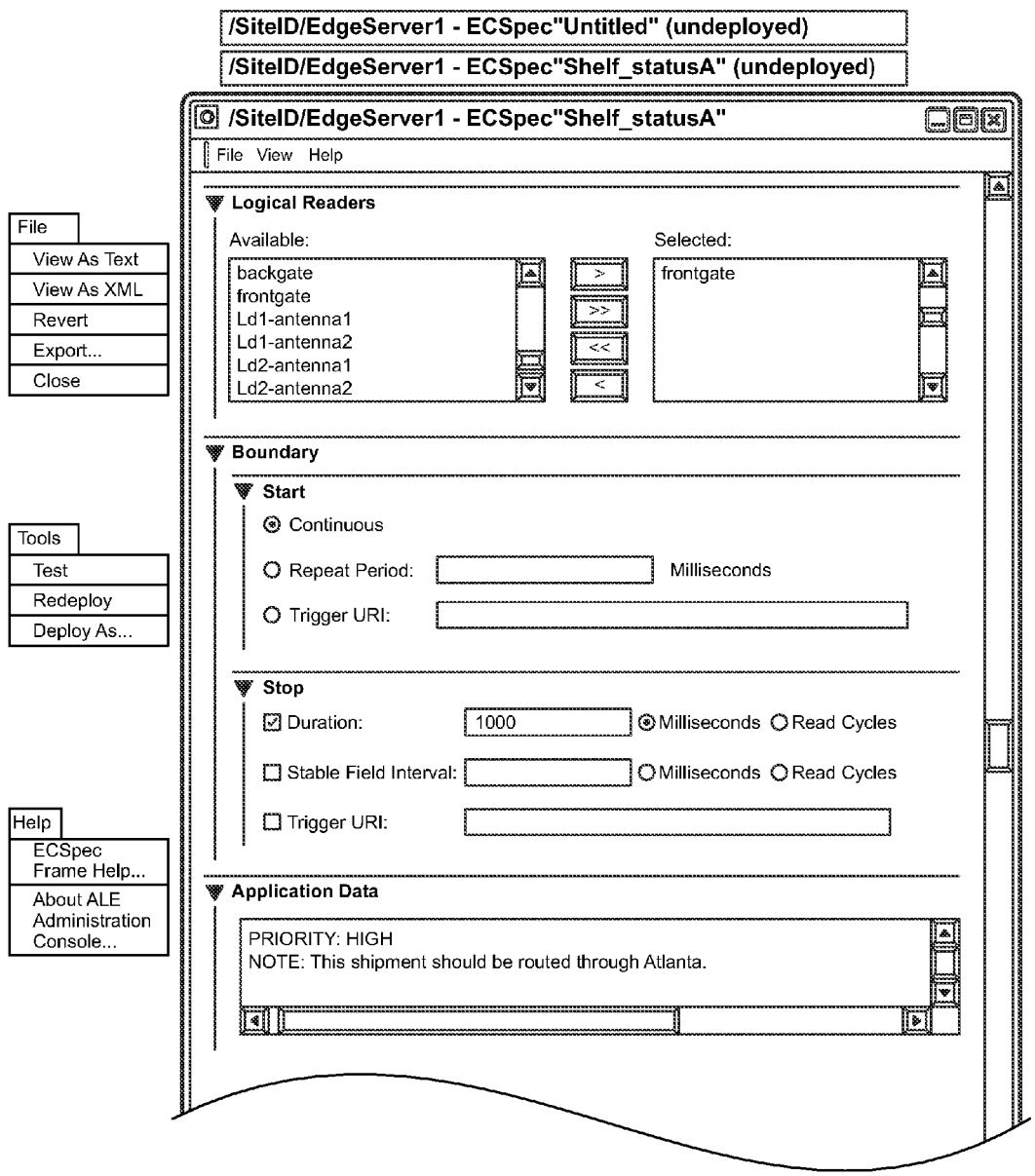
Figure 11K:
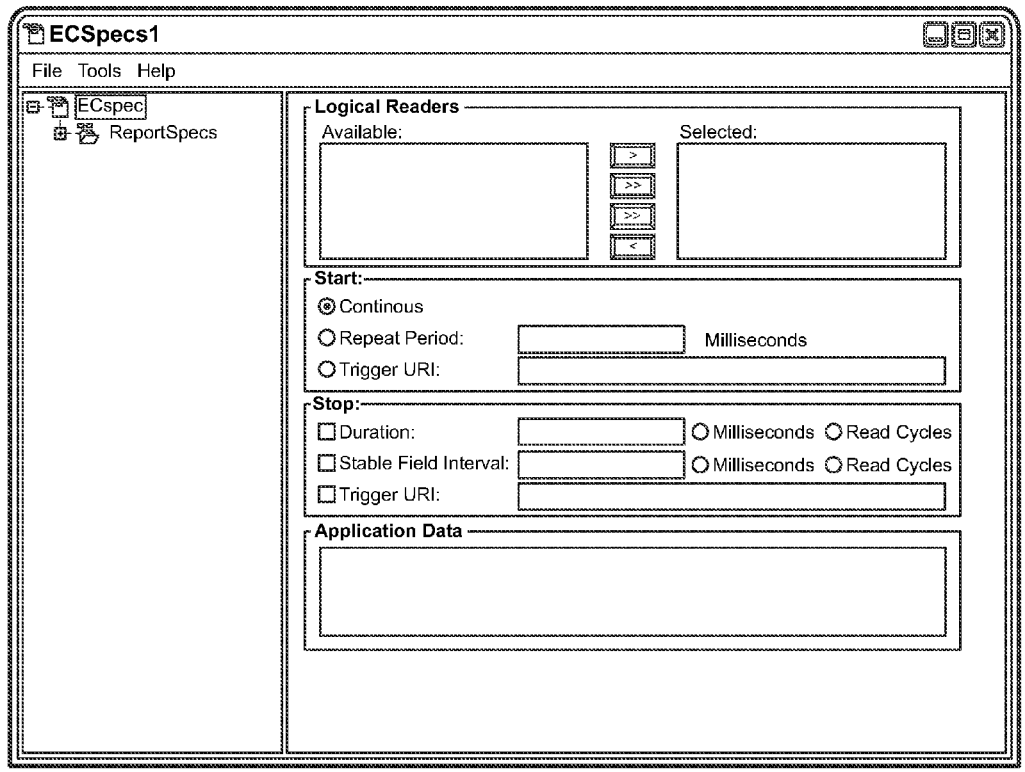
Figure 11L:
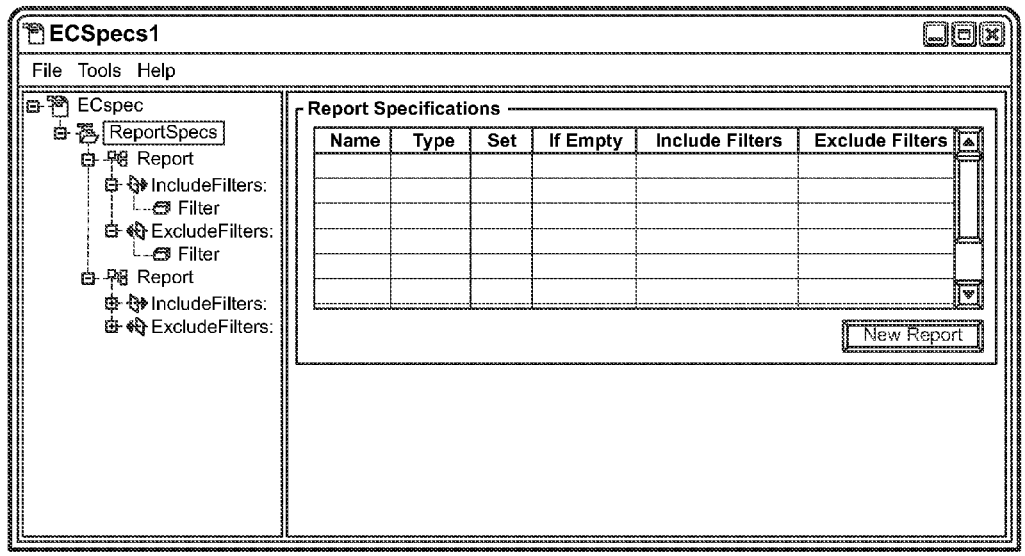

FIGS. 11I and 11J illustrate an ECSpec frame of one embodiment.

The components in this section can be expandable and collapsible views. Each leaf node can have a collapsible view; all non-leaf nodes can be collapsible in edit view, but not in read-only view as described in the preceding section. Selecting "Deploy" or "Redeploy" closes the ECSpec being edited after successfully deploying.

FIGS. 11K, 11L, 11M, 11N and 11O illustrate the configuring of an ECSpec of one embodiment.

Figure 11M:
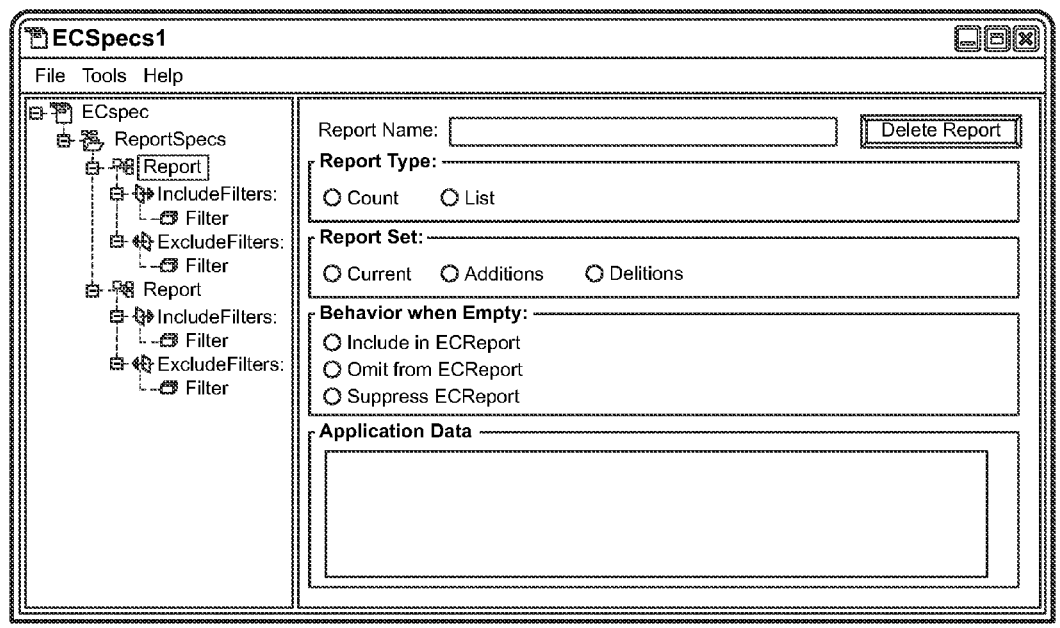
Figure 11N:
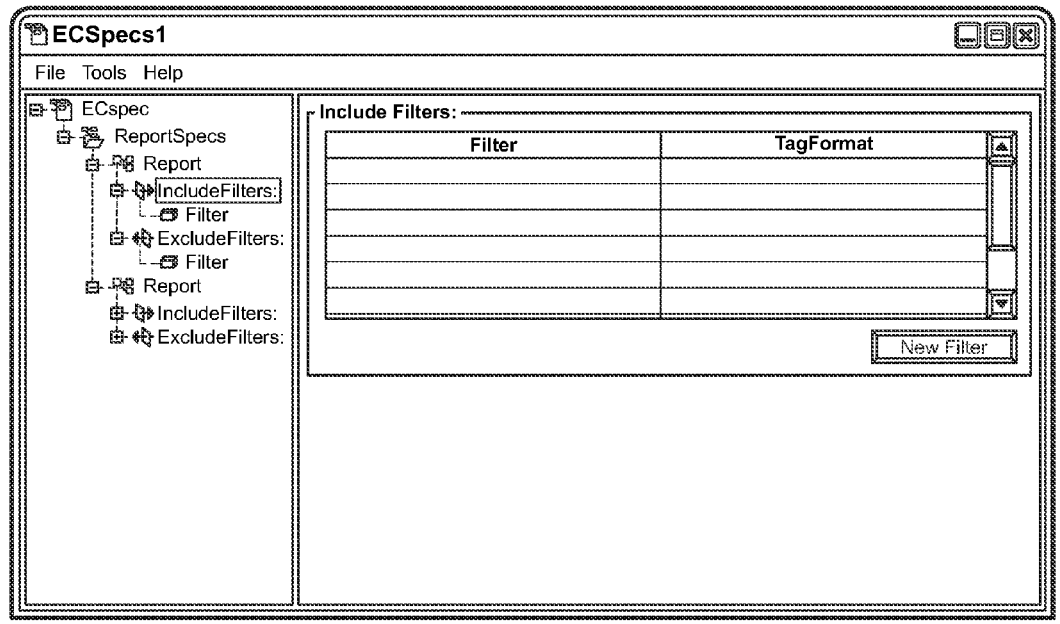
Figure 11O:
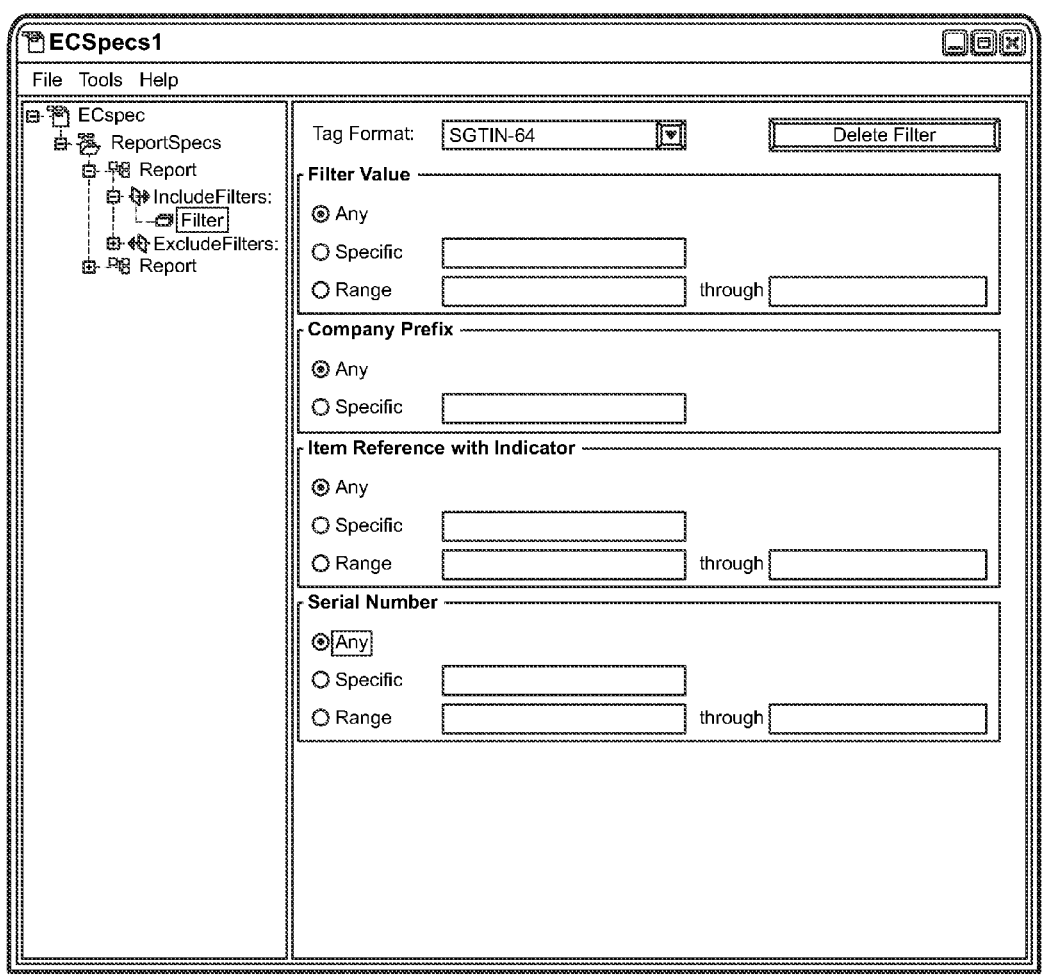
Figure 11P:
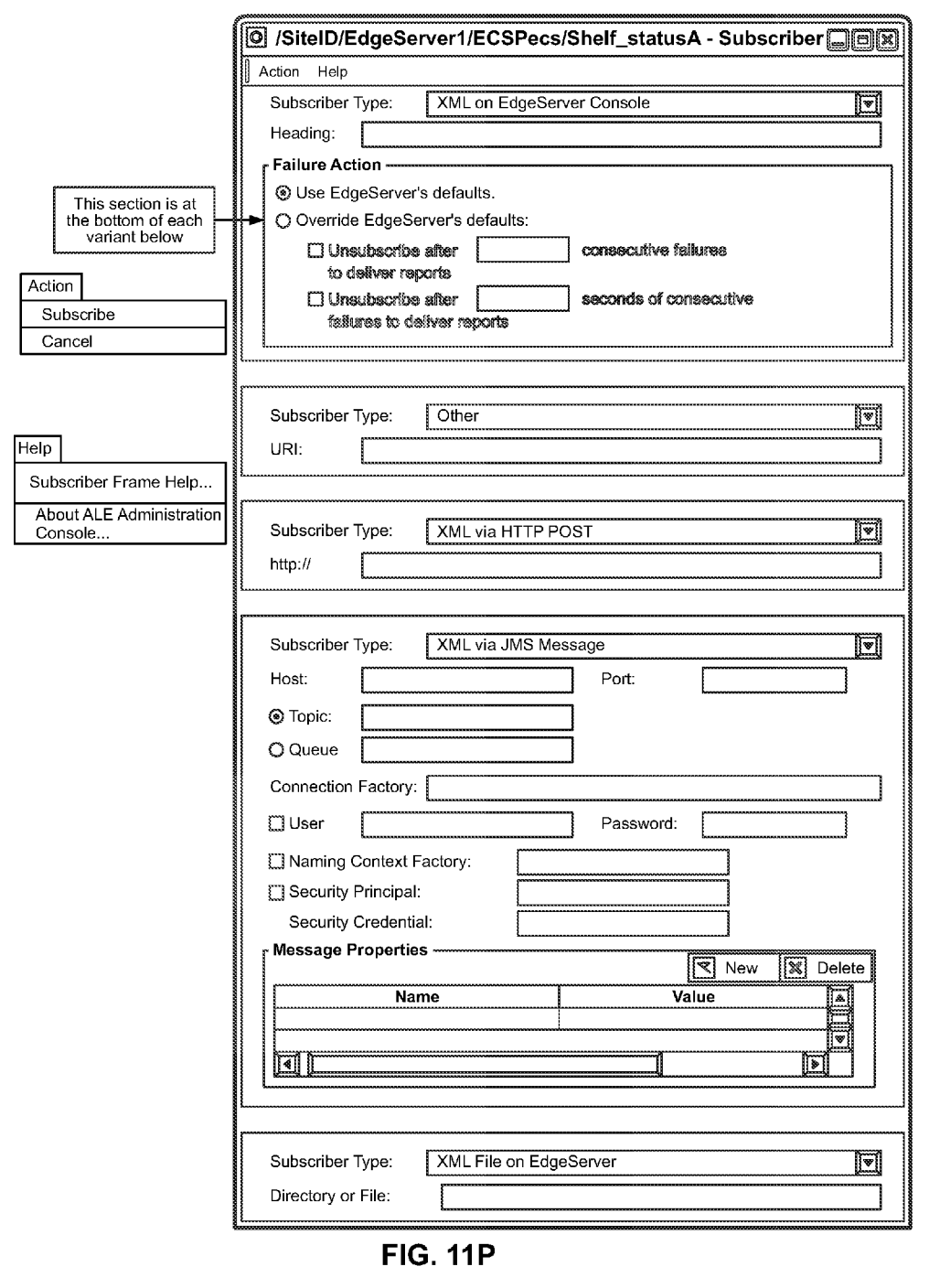
Figure 11Q:
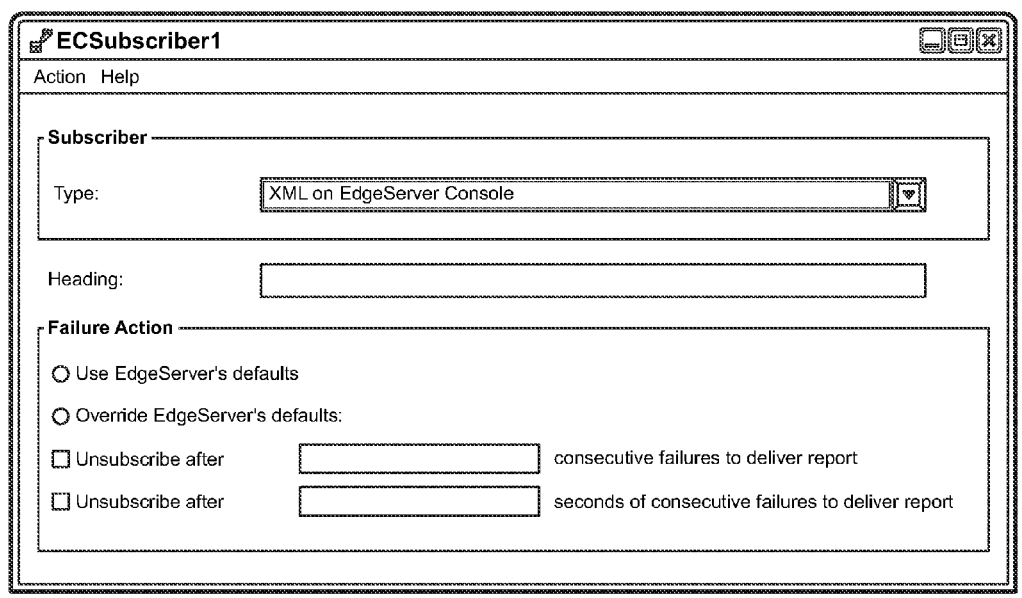
Figure 11R:
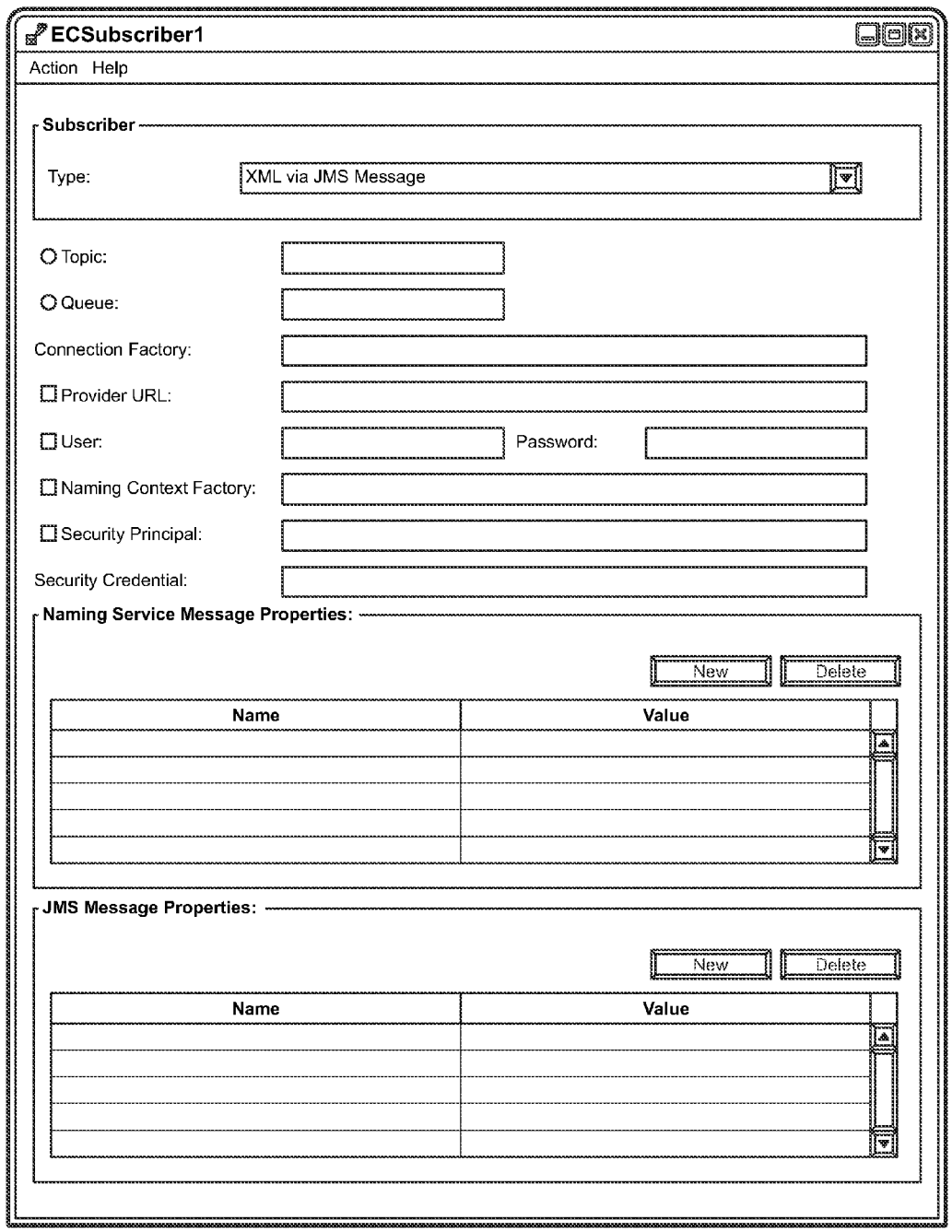

FIGS. 11P, 11Q and 11R illustrate a subscriber frame windows of one embodiment.

Figure 11S:
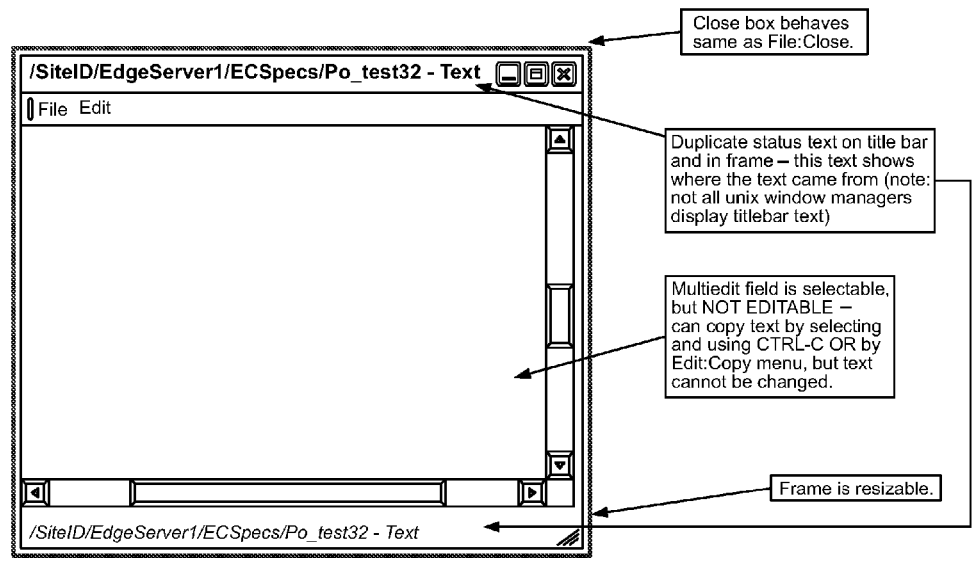

FIG. 11S illustrates a text view frame of one embodiment.

This document outlines an exemplary EPC Provisioning Service.

This section lists key terms and definitions as utilized in the design of one embodiment. EPC Pool: A named list of EPCs maintained in the provisioning system. EPCs may be checked out or checked in to the pool by outside applications. Identity Type: As used in EPC Tag Data Standards document. Examples of some identity types used in this design doc are GTIN, SSCC, DoD Construct. Pool Name, Cache Name: This design assumes that the name of a cache in the Edge Server is the same as the pool name in the provisioning service. Therefore the terms pool name and cache name can be used interchangeably in this document.

Tag writing systems can use a central authority from which they can receive unique EPCs. The EPC Provisioning Service is designed to satisfy this need. In addition to providing a service to give out unique EPCs, a design goal is also to make it easy for administrators to define and maintain pools. Administrators can be able to specify parameters based on which naming of pools and EPC allocations to pool can be done automatically. The service can be generic enough to work with different server products as well as third party products.

Local workflow can check out EPCs from the provisioning service by specifying the parameters for the checkout. An example of the parameters specified is (GTIN=10037000308048, TAG_LENGTH=64, LOCATION_ID=tag@ship-station-1). The provisioning service can check to see if the set of parameters has access to a pool and then returns EPCs to the local workflow. In this process, as required, the provisioning service may create a new pool and allocate EPCs to it. The EPCs given out will be marked as 'allocated' by the provisioning service.

Provisioning system can receive a tag-cache-low report from the RFID Edge Server. The provisioning service will checkout EPCs from the correct pool and replenish the cache in the Edge Server.

Administrator finds out that a product or station must no longer be allowed to get EPCs from the provisioning service. Administrator can make changes to the provisioning service and requests with those parameters will be denied access.

An edge server tag cache can be reset and the EPCs left in the cache is released back to the provisioning service. The provisioning service removes these from allocated list and puts them back in the available list.

Administrator finds out that a tagging station needs to switch from using 64 bit tags to 96 bit tags. Administrator can set up pool naming policy and pool population policy to enable that.

The provisioning service system can be composed of 2 main components:
1. EPC Provisioning Service: This can be a web service that will provide generic provisioning related operations like administering EPC pools, checkout or check-in from EPC pools etc.
2. Integration Component: This component is used to integrate between the RFID Edge Server and the provisioning service. This component can accept cache-low notifications from the edge server and replenish the cache.

There can be a web based GUI for administering the provisioning system. This GUI will be developed using JAVA Server Faces (JSF) technology and communication with the provisioning service can be through the web service interface. Local workflows can communicate with the EPC Provisioning Service or RFTA Integration Component as needed.

Figure 12A:
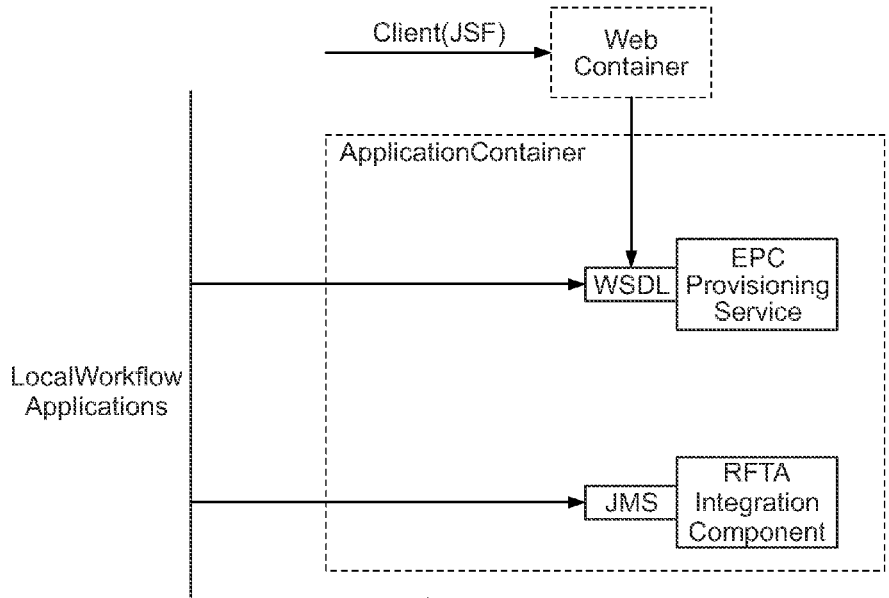
FIGS. 12A-12I illustrate an exemplary EPC provisioning system design.

FIG. 12A illustrates an exemplary providing architecture of one embodiment.

Figure 12B:
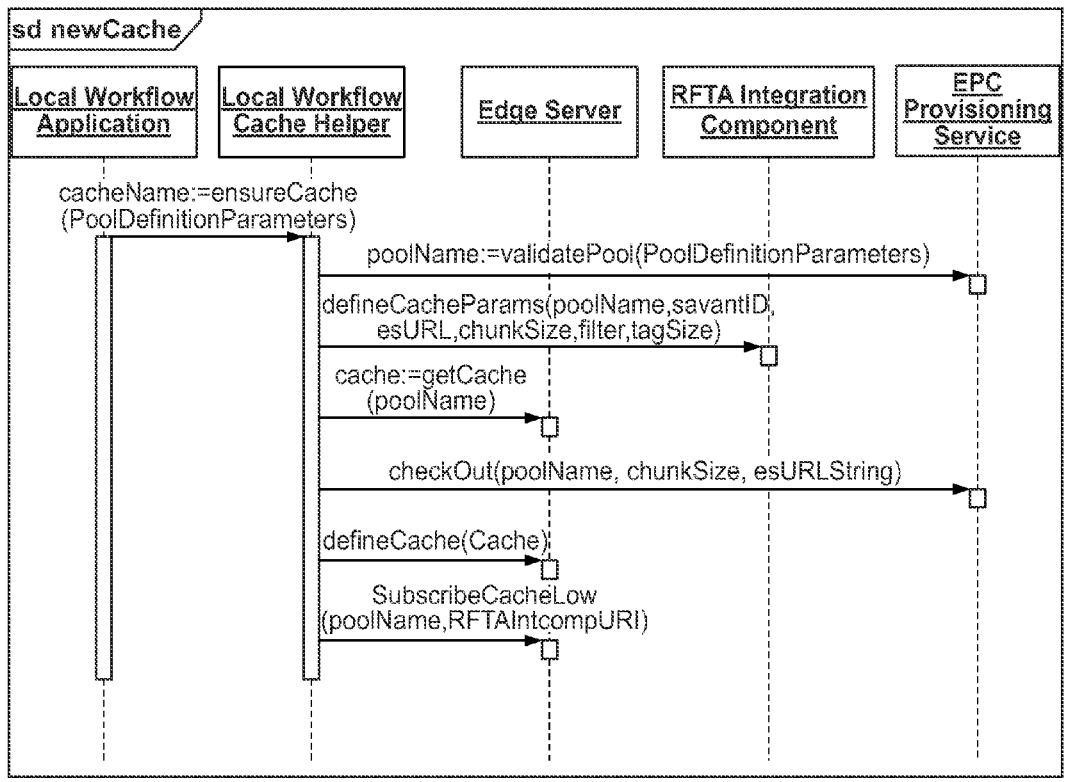

FIG. 12B shows interaction between local workflow components, edge server and EPC provisioning system when the local workflow encounters a new item for which it may need to define a cache at the edge server of one embodiment.

Figure 12C:
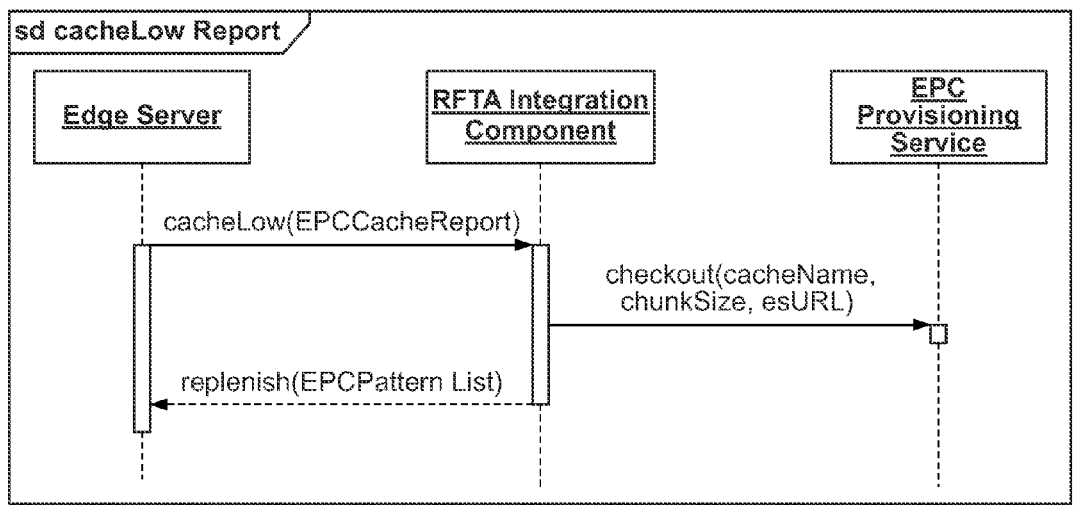

FIG. 12C shows the interactions between the edge server, RFTA Integration Component and EPC Provisioning Service when the edge server detects that a cache's size has reached the low threshold value of one embodiment.

The design overview diagram for a EPC provisioning web service can be similar to other web services in Enterprise Server.

VCC components for this can be:
1. EPCPS_API: This will contain the public facing interfaces (JAVA, WSDL and XSD)
2. EPCPS_Axis: Axis generated classes common to client and server sides of an axis service. Also contains adapter classes for axis generated classes.
3. EPCPS_Client: Implementation of public facing JAVA interface.
4. EPCPS_Engine: Server side implementation of public facing JAVA interfaces which will be used by all the different web service implementations.
5. EPCIS_Service: Different web-service implementations (for example: Axis, BEA) of the provisioning service.

The component can accept EPC Cache Low report from the edge server and replenish the corresponding cache. This can be accomplished using a message driven bean that will accept 2 kinds of messages:
1. Define cache parameters: This message can associate a cache with its edge server URL, filter value, tag size and chunk size. A cache can identified using the cache name and savant ID.
2. EPC Cache low report: This report will be sent by the edge server when the cache falls below a certain pre-specified value. The message driven bean can get EPCs for replenishment from the provisioning service and replenish the cache (the URL for the edge server can be specified by message 1).

The message driven bean can delegate all the business logic work to a simple JAVA class, so that supporting other communication mechanisms in the future will be easy. RFID integration component can communicate with the EPC Provisioning Service through local EJB interfaces to avoid communication overheads.

Figure 12D:
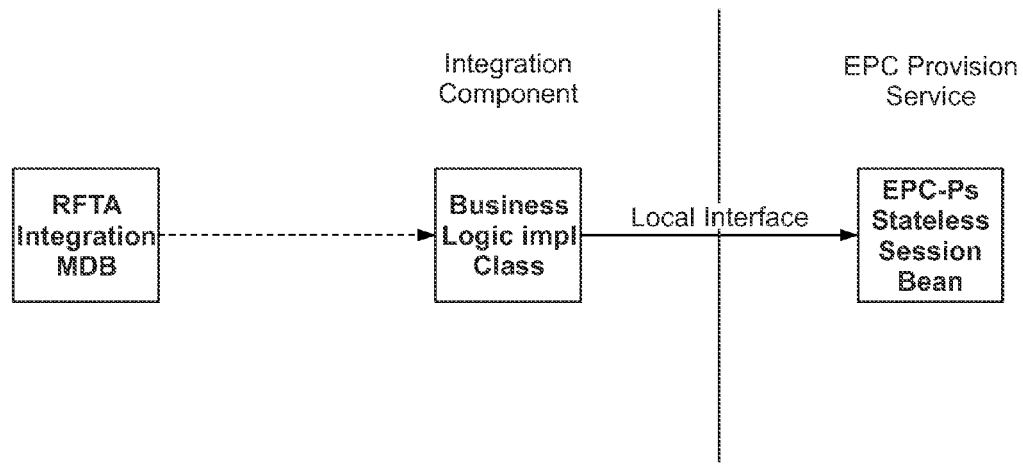

FIG. 12D illustrates an exemplary embodiment of one embodiment.

Figure 12E:
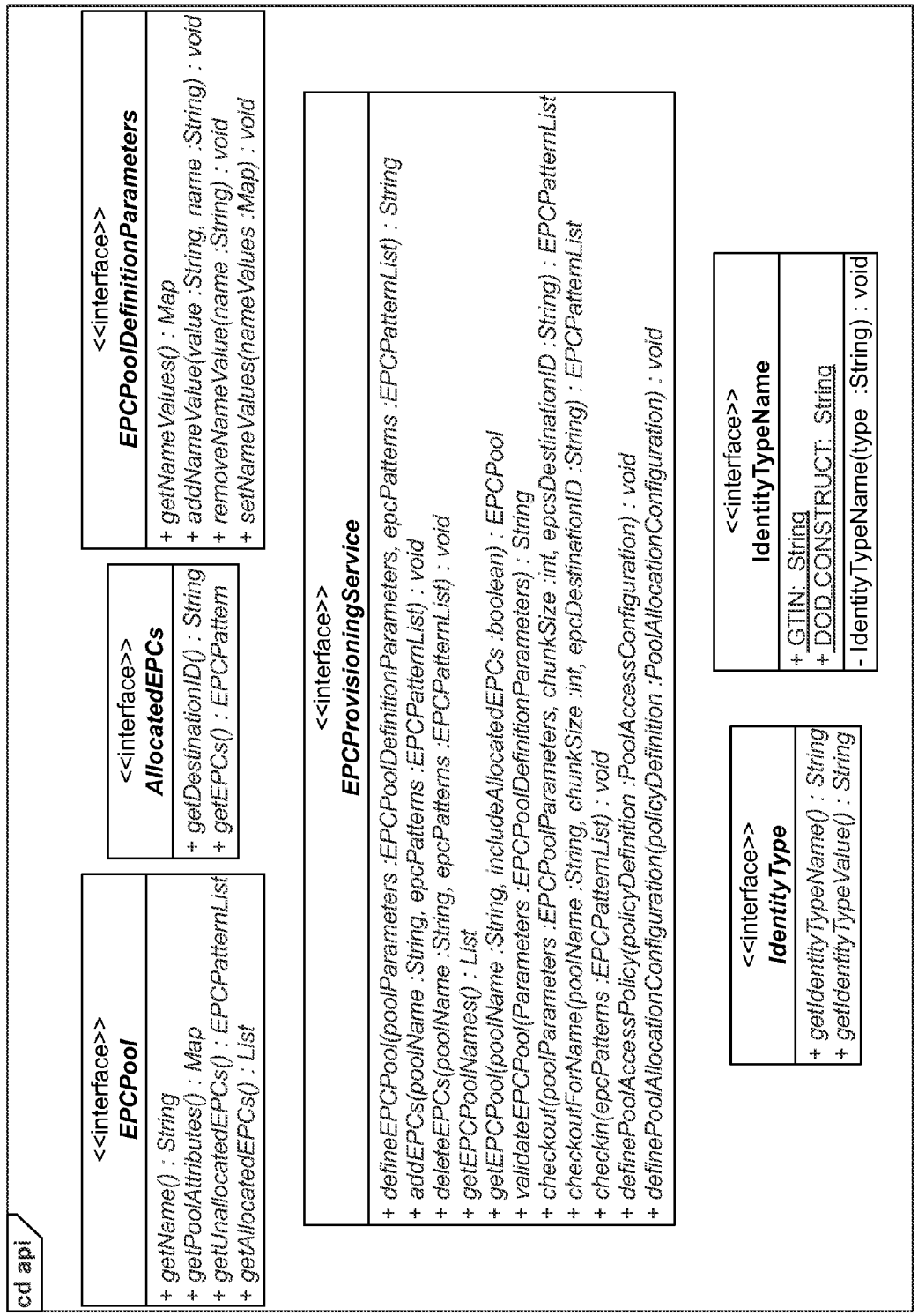

FIG. 12E illustrates an exemplary key classes UML of one embodiment.

Pool attributes can represent attributes like which GTIN this pool was created for ([GTIN, <gtin-value] will be the name-value pair in this case) or what tag-length the pool is for etc. Allocated EPCs can give EPCs that were allocated and opaque id of the destination of the EPCs. In one embodiment, an EPC Pool cannot contain EPCs of more than one tag-type. The EPCs can be stored as pure identities.

Figure 12F:
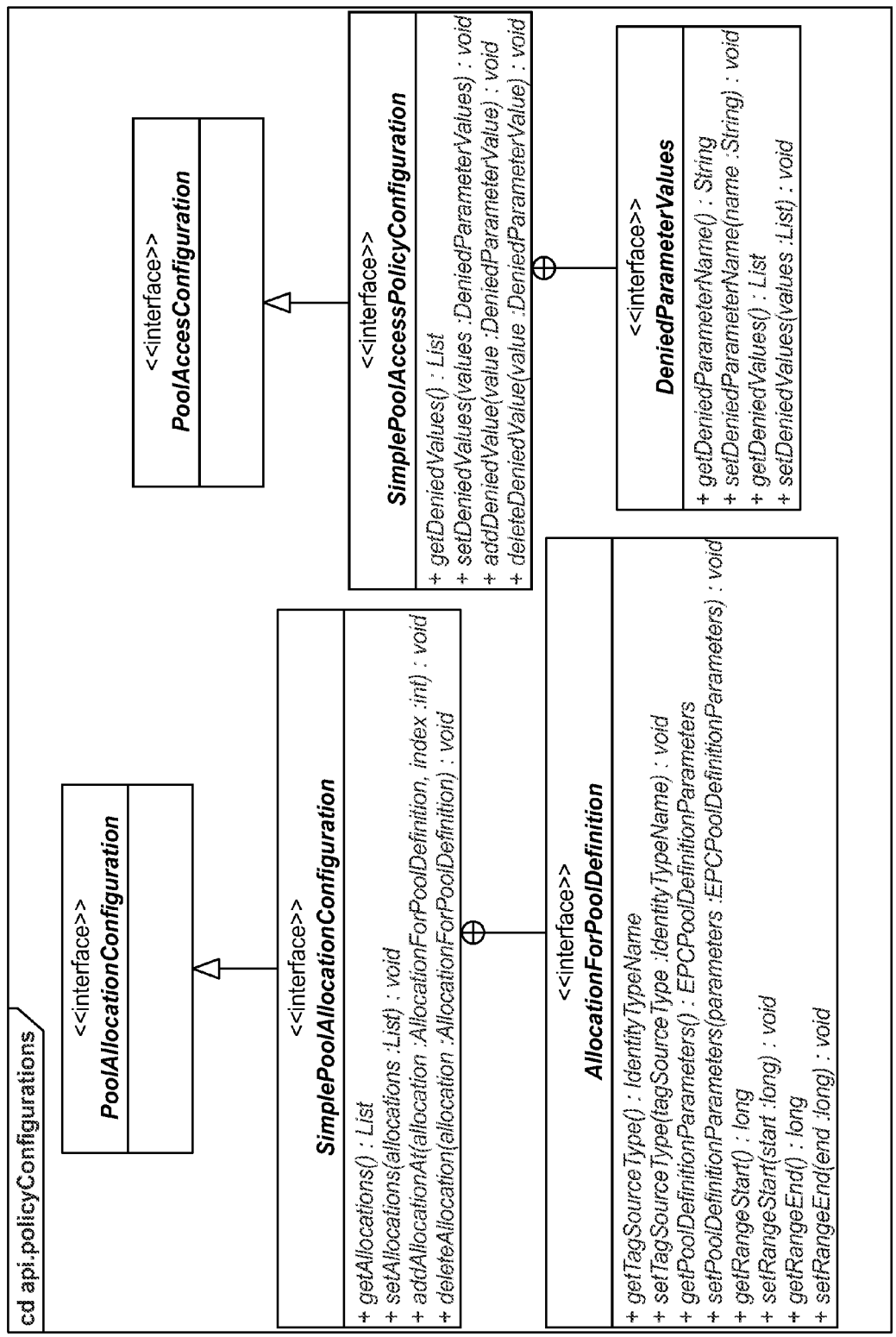

FIG. 12F illustrates exemplary EPC provisioning policy changes of one embodiment.

Com.connecterra.epcps.api.policy-Configuration.PoolAllocationConfiguration Class can serve as the super-type for different pool allocation configurations that may be supported by the provisioning service. Using the pool allocation configuration administrator can define which pool gets allocated for a given set of pool definition parameters and also define how the pool may get populated.

com.connecterra.epcps.api.policy-Configurations.SimplePoolAllocationConfiguration Class can allows you to make associations between an EPCPoolDefinitionParameters, identity type, and a serial number range. This association can define how to select a pool and how the pool gets populated initially. The order of the associations can be maintained and is used when matching an input request with the definitions. On receiving a request for an EPC pool based on an input EPCPoolDefinitionParameters, the first AllocationForPoolDefinition that matches the input EPCPoolDefinitionParameters can be selected. Using this, you can get the pool name and if needed, the initial range for the pool.

com.connecterra.epcps.api.policy-Configurations.PoolAccessConfiguration Class can be a Super-type for different pool access configurations that may be supported by the provisioning service.

com.connecterra.epcps.api.policy-Configurations.SimplePoolAccessConfiguration Class can be an interface lets you disallow access to EPC pools for certain pool definition parameters. This can be a simple configuration where you only configure negative entries. If any of the parameters in an input request matches any of the denied parameters, the request need not be granted access to an EPC pool.

Figure 12G:
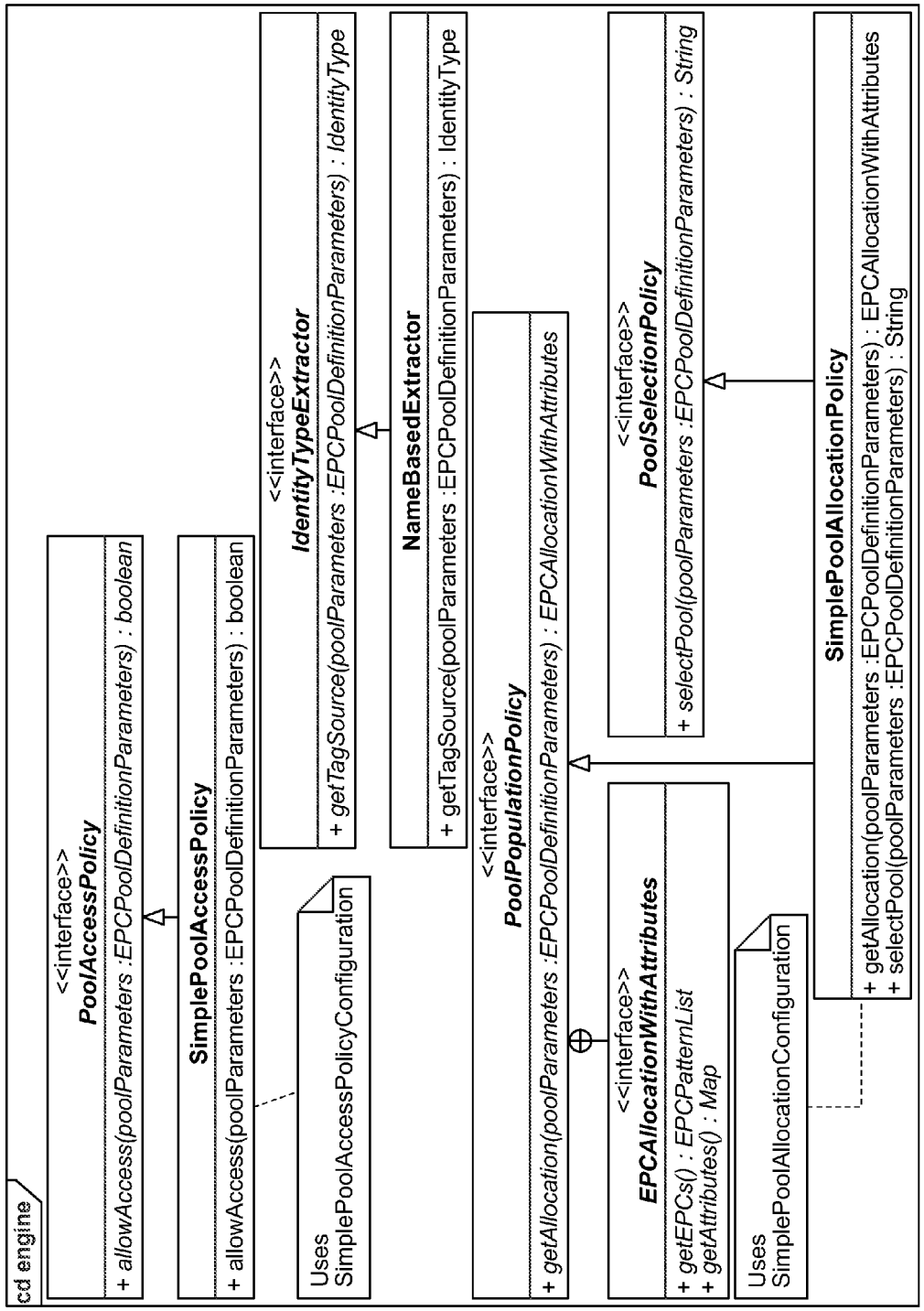

FIG. 12G shows key class UML for an EPC provisioning service engine of one embodiment.

com.connecterra.epcps.engine.PoolAccessPolicy Class can be the contract for pool access policies. com.connecterra.epcps.engine.SimplePoolAccessPolicy Class can be the Class that implements pool access policy using the SimplePoolAccessConfiguration. com.connecterra.epcps.engine.IdentityTypeExtractor can be the Class Interface that lets you get to a IdentityType from a given EPCPoolDefinitionParameters object.com.connecterra.epcps.engine.NameBasedExtractor Class can be the Class that gets a IdentityType by looking for identity type names (defined in IdentityTypeName) in the parameter list. com.connecterra.epcps.engine.PoolSelectionPolicy Class can be the contract for policies that let you select a pool name from a given EPCPoolDefinitionParameter. com.connecterra.epcps.engine.PoolPopulationPolicy Class can be the contract for policies that gives you the range for populating a pool based on an EPCPoolDefinitionParamter. com.connecterra.epcps.engine.SimplePoolAllocationPolicy Class can implement PoolSelectionPolicy and PoolPopulationPolicy. It can use the SimplePoolAllocationConfiguration that may be specified by the administrator.

Figure 12H:
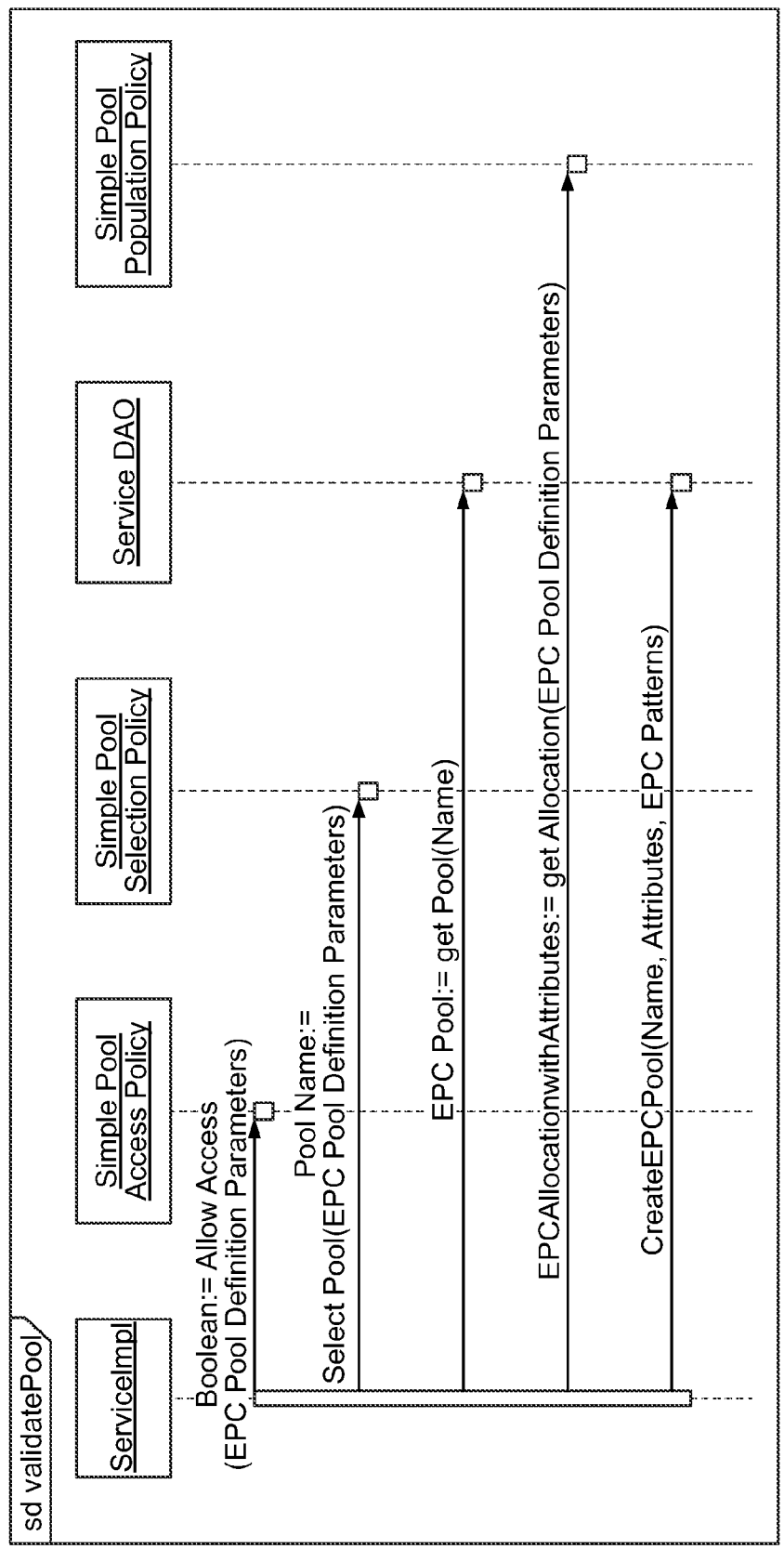

FIG. 12H is a sequence diagram showing how the different classes interact with each other on a validatePool call of one embodiment:

Exemplary EPC provisioning data structure.
EPC Pool

| Column Name | Column Type | Constraints |
|---|---|---|
| pool_id | integer | Primary Key |
| pool_name | varchar2(255) | Unique Index |
| creation_date | date | |
| last_modified_date | date | |

Pool_Attributes

| Column Name | Column Type | Constraints |
|---|---|---|
| attr_row_id | Integer | Primary Key |
| pool_id | integer | Indexed |
| attr_name | varchar2(255) | Indexed |
| attr_value | varchar2(255) | Indexed |

Separate tables can be used for allocated and unallocated EPCs in a pool. This can be done so that searches on the unallocated EPC pattern list will not be slowed down because of all the allocated EPCs. The allocated EPC pattern list can be assumed to grow very long.

Similarly, different tables can be used to store different types of tag, instead of one table storing the EPC pattern string. This way searching on individual fields in the pattern in the database can be efficient. We can search on the individual fields when assigning EPCs to a pool, allocating EPCs to a client, checking in EPCs etc.

Exemplary Tables for allocated and unallocated EPCs for SGTIN patterns are shown below:
SGTIN_Unallocated_Epcs

| Column Name | Column Type | Constraints |
|---|---|---|
| Unallocated_epcs_id | integer | Primary Key |
| pool_id | integer | Indexed |
| company_prefix | varchar2(12) | Indexed |
| item_ref_and_ind | varchar2(7) | Indexed |
| serial_range_start | long | Indexed |
| serial_range_end | long | Indexed |
| creation_date | date | |

SGTIN_Allocations

| Column Name | Column Type | Constraints |
|---|---|---|
| allocation_id | integer | Primary Key |
| pool_id | integer | Indexed |
| company_prefix | varchar2(12) | Indexed |
| item_ref_and_ind | varchar2(7) | Indexed |
| serial_range_start | long | Indexed |
| serial_range_end | long | Indexed |

SGTIN Allocation Details

| Column Name | Column Type | Constraints |
|---|---|---|
| allocation_details_id | integer | Primary Key |
| allocation_id | integer | Indexed |
| Destination_id | varchar2(255) | Indexed |
| serial_range_start | long | Indexed |
| serial_range_end | long | Indexed |
| allocation_date | date | |

Exemplary Pool Access Policy Configuration
Access_Parameters

| Column Name | Column Type | Constraints |
|---|---|---|
| parameter_name | varchar2(255) | Primary Key |

Access_Parameter_Values

| Column Name | Column Type | Constraints |
| --- | --- | --- |
| row_id | integer | Primary Key |
| parameter_name | varchar2(255) | Indexed |
| parameter_value | varchar2(255) | |

Exemplary Pool Allocation Policy Configuration
Pool_Allocation_Configuration

| Column Name | Column Type | Constraints |
| --- | --- | --- |
| config_row_id | integer | Primary Key |
| identity_type_name | varchar2(255) | Indexed |
| range_start | long | |
| range_end | long | |
| Ordinal | int | |

Pool_Allocation_Parameters

| Column Name | Column Type | Constraints |
| --- | --- | --- |
| row_id | integer | Primary Key |
| config_row_id | integer | Indexed |
| parameter_name | varchar2(255) | Indexed |
| parameter_value | varchar2(255) | Indexed |

Figure 12I:
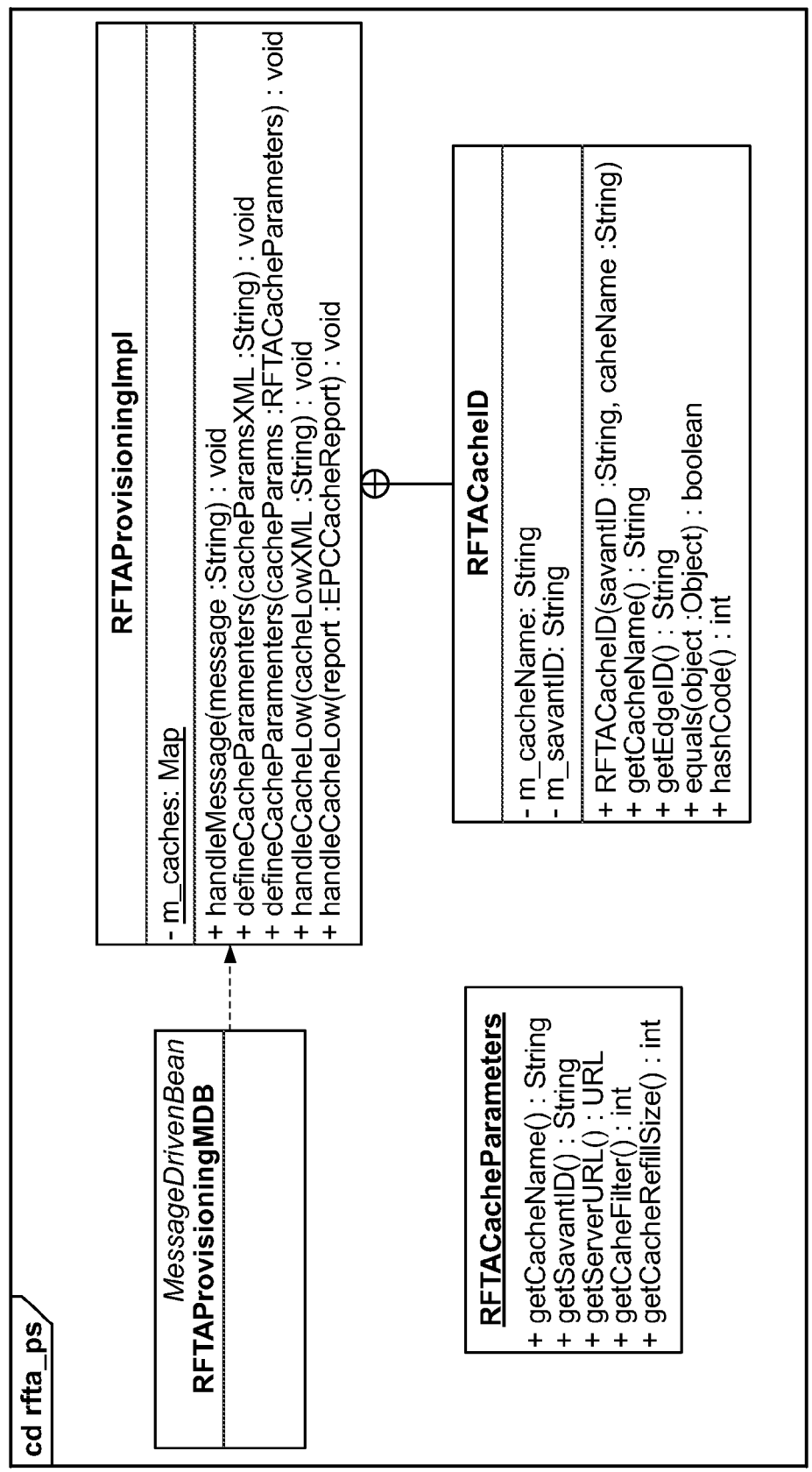

FIG. 12I shows an exemplary integration component of one embodiment.

Admin application can provide the following functionality:

Defining EPC pool configurations—"Define Pool Configuration" screen

Viewing and editing existing pool configurations—"View Pool Configurations" screen Viewing details of existing EPC pools—"View Pools" screen Admin application can be implemented as a Web Application deployable into any Application Server (JBoss, WebLogic, etc.) as a WAR file. Main implementation technologies can be JSP and JSF (JAVA Server Faces).

Figures 13A, 13B:
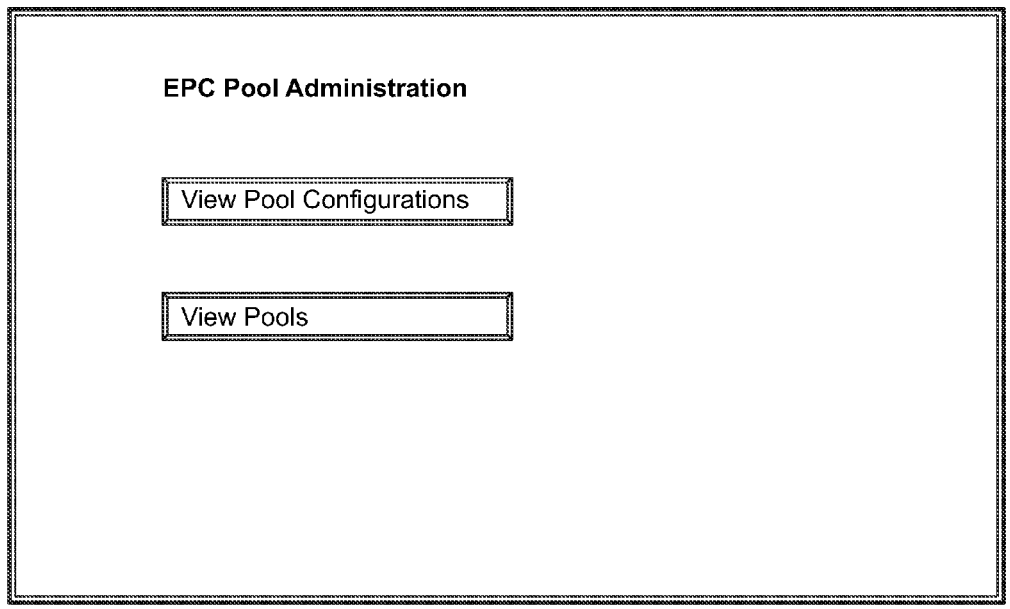

FIG. 13A shows an exemplary EPC pool page of one embodiment.

FIG. 13B provides detailed information about existing pool configurations. Pool configurations can be represented in a table format in the correct order of one embodiment. The rows of the table (individual pool configurations) can be:

deleted by checking the check-box in the leftmost column and clicking the "Delete" button located underneath the table re-ordered by using "Up" and "Down" buttons associated with the rows edited by clicking "Edit" buttons associated with the rows. This action will bring up a pop-up window with the "Define Pool Configuration" screen defined in the next section populated with the data of the selected pool configuration A new pool configuration can be created by clicking on the "Create New Configuration" button. This can open a new screen, "Define Pool Configuration".

This screen can be used by an administrator to define parameters of a new pool configuration. The same screen is used for editing parameters of an existing pool configuration. The following pool configuration options can be set here:

Identity Type—a pull-down menu with pre-defined supported identity types (GTIN or SSCC, for example)

Pool Parameters—Name/Value pairs of pool parameters (for example, location id). Represented in a table format. Table rows can be added or deleted.

EPC Pool range start and end values—range of EPCs allowed in this pool

FIG. 13C shows a draft representation of a screen of one embodiment.

FIG. 13D shows a screen containing information about existing EPC pools of one embodiment. The screen can be divided into two parts. The upper half can contain a table with the list of existing pools and some brief information about the pools.

Each row (pool) can have an associated "View" button. Clicking on the view button can brings up detailed information about selected pool into the table in the lower half of the screen.

Figure 13E:
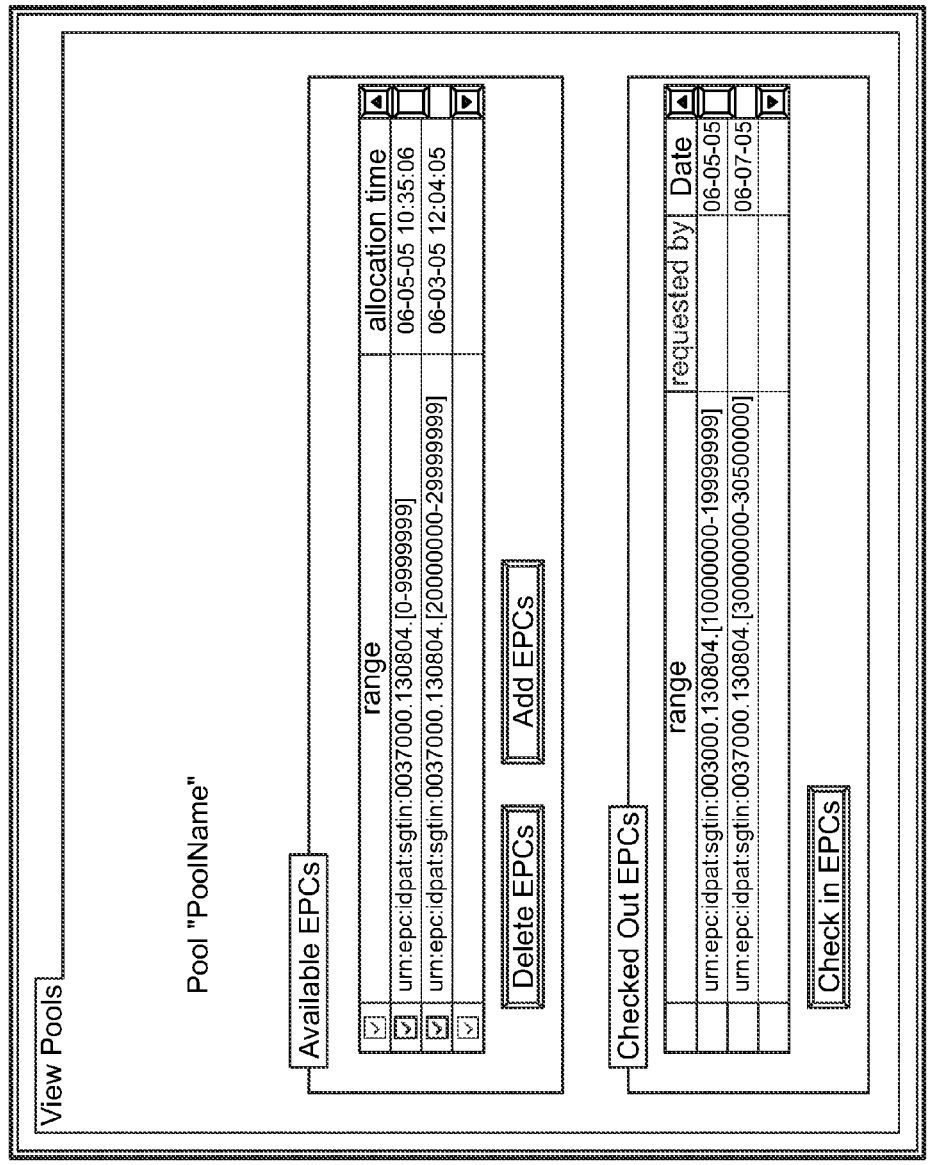

FIG. 13E shows checked out EPCS of one embodiment.

Available EPCs can be deleted from the pool by checking the check boxes of the corresponding table rows and clicking on the "Delete EPCs" button. More EPCs can be added to the pool by clicking on the "Add EPCs" button. As a result, a pop-up window can appear where a range of EPCs to be added can be specified.

FIG. 13F illustrates a screen for adding EPCs.

FIG. 13G illustrates a screen for checking in EPCs.

Checked out EPCs can be checked back into the pool by clicking the "Check In" button.

One embodiment may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present discloser, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, Rams, EPROMs, EEPROMs, Drams, Rams, flash memory of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. An electronic product code (EPC) provisioning system comprising:
    a central electronic product code (EPC) server that executes on one or more microprocessor and creates and maintains a pool of electronic product codes, wherein the pool of electronic product codes is divided into a plurality of EPC code blocks, each EPC code block adapted to be associated with a different product, and wherein the central EPC server assigns said plurality of EPC code blocks to multiple client sites according to a set of rules, and distributes the plurality of EPC code blocks to said multiple client sites;
    a plurality of radio frequency identification (RFID) edge servers being located at said multiple client sites, wherein each said RFID edge server includes a cache to store the plurality of EPC code blocks and is in communication with one or more RFID readers;
    wherein each RFID edge server reads a metadata-based description of a configuration of at least one of the one or more RFID readers, and wherein each of the one or more RFID readers has a configuration arrangement associated therewith that is defined in the metadata-based description, and wherein each of the one or more RFID readers uses a different metadata-based description;
    a console that includes a graphical user interface to manage the pool of electronic product codes and the one or more RFID readers;
    a local workflow at each client site, wherein when the local workflow detects a new product at a particular client site, the local workflow
        associates the new product with the cache of one of the one or more of said RFID edge servers,
        submits a checkout request to the central EPC server requesting one or more of the plurality of EPC code blocks for the new product, and
        wherein upon receiving the checkout request at the central EPC server, the central EPC server communicates the one or more of the plurality of EPC code blocks requested from the EPC server to the local workflow according to the set of rules; and
    wherein, based on the metadata-based description read by at least one RFID edge server, the graphical user interface is employed to update the configuration of at least one of the one or more RFID readers to receive data from the at least one RFID reader to the at least one RFID edge server without interruption to the at least one RFID edge server.

2. The system of claim 1, wherein the client sites use the EPC codes for RFID tags to maintain information regarding said product.

3. The system of claim 2, wherein the EPC code blocks are assigned by the central EPC server to indicate a lot number associated with the product.

4. The system of claim 3, wherein the EPC code blocks are assigned so as to indicate location.

5. The system of claim 1, wherein the RFID edge servers at the client sites request the electronic product codes from the central EPC server.

6. The system of claim 1, wherein the local workflow, at each client site, returns unused EPC code blocks to the central EPC server.

7. The system of claim 1, further including a console to manage the pool of electronic product codes, said console including a graphical interface used to divide the pool of electronic product code blocks, add EPC code blocks, delete EPC code blocks and check-in unused EPC code blocks.

8. The system of claim 7, wherein the graphical interface is used to view configuration information about the pool of electronic product codes.

9. The system of claim 7, wherein the console is implemented as a web application.

10. A computer implemented method comprising:
    creating a pool of electronic product codes for a product by a central electronic product code (EPC) server that executes on one or more microprocessor, wherein the pool of electronic product codes is divided into a plurality of EPC code blocks, each EPC code block adapted to be associated with a different product;
    assigning the plurality of EPC code blocks to multiple client sites according to a set of rules;
    distributing the plurality of EPC code blocks from the central EPC server to a plurality of radio frequency identification (RFID) edge servers located at the multiple client sites, wherein each said RFID edge server includes a cache to store the plurality of EPC code blocks and is in communication with one or more RFID readers;
    reading a metadata-based description of a configuration of at least one of the one or more RFID readers by each RFID edge server, wherein each of the one or more RFID readers has a configuration arrangement associated therewith that is defined in the metadata-based description, and wherein each of the one or more RFID readers uses a different metadata-based description;
    providing a console that includes a graphical user interface to manage the pool of electronic product codes and the one or more RFID readers;
    detecting, at each client site by a local workflow at that client site, that a new product has been encountered, wherein when the local workflow detects the new product, the local workflow
        associates the new product with the cache of one of the one or more of said RFID edge servers,
        submits a checkout request to the central EPC server requesting one or more of the plurality of EPC code blocks for the new product, and
        wherein upon receiving the checkout request at the central EPC server, the central EPC server communicates the one or more of the plurality of EPC code blocks requested from the EPC server to the local workflow according to the set of rules; and
    wherein, based on the metadata-based description read by at least one RFID edge server, employing the graphical user interface to update the configuration of at least one of the one or more RFID readers to receive data from the at least one RFID reader to the at least one RFID edge server without interruption to the at least one RFID edge server.

11. The computer implemented method of claim 10, wherein the client sites use the EPC codes for RFID tags to maintain information regarding said product.

12. The computer implemented method of claim 11, wherein the EPC code blocks are assigned by the central EPC server to indicate a lot number associated with the product.

13. The computer implemented method of claim 11, wherein the EPC codes are assigned so as to indicate location.

14. The computer implemented method of claim 10, wherein RFID edge servers at the client sites request the EPC code blocks from the central EPC server.

15. The method of claim 10, further comprising:
returning, by the local workflow at each client site, unused EPC code blocks to the central EPC server.

16. A non-transitory computer readable storage medium storing one or more sequences of instructions, said instructions, when executed by one or more microprocessors, causing the one or more microprocessors to perform the steps of:
creating a pool of electronic product codes for a product by a central electronic product code (EPC) server, wherein the pool of electronic product codes is divided into a plurality of EPC code blocks, each EPC code block adapted to be associated with a different product;
assigning the plurality of EPC code blocks to multiple client sites according to a set of rules;
distributing the plurality of EPC code blocks from the central EPC server to a plurality of radio frequency identification (RFID) edge servers located at the multiple client sites, wherein each said RFID edge server includes a cache to store the plurality of EPC code blocks and is in communication with one or more RFID readers;
reading a metadata-based description of a configuration of at least one of the one or more RFID readers by each RFID edge server, wherein each of the one or more RFID readers has a configuration arrangement associated therewith that is defined in the metadata-based description, and wherein each of the one or more RFID readers uses a different metadata-based description;
providing a console that includes a graphical user interface to manage the pool of electronic product codes and the one or more RFID readers;
detecting, at each client site by a local workflow at that client site, that a new product has been encountered, wherein when the local workflow detects the new product, the local workflow
associates the new product with the cache of one of the one or more of said RFID edge servers,
submits a checkout request to the central EPC server requesting one or more of the plurality of EPC code blocks for the new product, and
wherein upon receiving the checkout request at the central EPC server, the central EPC server communicates the one or more of the plurality of EPC code blocks requested from the EPC server to the local workflow according to the set of rules; and
wherein, based on the metadata-based description read by at least one RFID edge server, employing the graphical user interface to update the configuration of at least one of the one or more RFID readers to receive data from the at least one RFID reader to the at least one RFID edge server without interruption to the at least one RFID edge server.

17. The computer readable medium of claim 16, wherein the client sites use the EPC codes for RFID tags to maintain information regarding said product.

18. The computer readable medium of claim 17, wherein the EPC code blocks are assigned by the central EPC server to indicate a lot number associated with the product.

19. The computer readable medium of claim 17, wherein the EPC electronic product codes are assigned so as to indicate location.

20. The non-transitory computer readable storage medium of claim 16, further comprising:
returning, by the local workflow at each client site, unused EPC code blocks to the central EPC server.

\* \* \* \* \*

UNITED STATES PATENT AND TRADEMARK OFFICE
CERTIFICATE OF CORRECTION

| | | |
|---|---|---|
| PATENT NO. | : 8,373,545 B2 | |
| APPLICATION NO. | : 11/668389 | |
| DATED | : February 12, 2013 | |
| INVENTOR(S) | : Traub et al. | |

It is certified that error appears in the above-identified patent and that said Letters Patent is hereby corrected as shown below:

In the Drawings:

On sheet 44 of 60, in FIG. 11M, line 9, delete "Delitions" and insert -- Deletions --, therefor.

In the Specifications:

In column 7, line 14, delete "Plug-i Meta" and insert -- Plug-in Meta --, therefor.

In column 7, line 14, delete "Plug-i" and insert -- Plug-in --, therefor.

In column 8, line 17, delete "uniuqe" and insert -- unique --, therefor.

In column 8, line 41, delete "<PluginParamameterMeta>" and insert -- <PluginParameterMeta> --, therefor.

In column 8, line 53, delete "contstraints." and insert -- constraints. --, therefor.

In column 10, line 15, delete "Plugic" and insert -- Plugin --, therefor.

In column 10, line 49, delete "dentify" and insert -- identify --, therefor.

In column 10, line 52, delete "he" and insert -- the --, therefor.

In column 10, line 62, delete "Configuration" and insert -- Configuration. --, therefor.

In column 11, line 13, delete "void ," and insert -- void, --, therefor.

In column 11, line 63, delete "void ," and insert -- void, --, therefor.

In column 13, line 37, delete "uhfl" and inserl -- uhfl --, therefor.

In column 14, line 59, delete "PluginParameterConstratintRegEx" and insert -- PluginParameterConstraintRegEx --, therefor.

In column 15, line 5, delete "PluginParameterConstratintRegEx" and insert -- PluginParameterConstraintRegEx --, therefor.

In column 15, line 26, before "JAVA" delete "a".

In column 20, line 41, delete "placholder" and insert -- placeholder --, therefor.

Signed and Sealed this
Fourth Day of June, 2013

Teresa Stanek Rea
*Acting Director of the United States Patent and Trademark Office*

CERTIFICATE OF CORRECTION (continued)
U.S. Pat. No. 8,373,545 B2

In column 26, line 49, delete "frame The" and insert -- frame. The --, therefor.

In column 28, line 37, delete "future)" and insert -- future). --, therefor.

In column 32, line 26, delete "appropriate" and insert -- appropriate. --, therefor.

In column 32, line 34, delete "UT" and insert -- UI --, therefor.

In column 33, line 7, delete "Config Model" and insert -- ConfigModel --, therefor.

In column 34, line 33, delete "only)" and insert -- only). --, therefor.

In column 37, line 47, delete "EPCPoolDefinitionParamter." and insert
-- EPCPoolDefinitionParameter. --, therefor.

In the Claims:

In column 41, line 66, in Claim 4, delete "claim 3," and insert -- claim 2, --, therefor.